United States Patent
Hayama

(10) Patent No.: US 11,345,341 B2
(45) Date of Patent: May 31, 2022

(54) INFORMATION PROCESSING APPARATUS, INFORMATION PROCESSING METHOD AND COMPUTER READABLE RECORDING MEDIUM FOR RECORDING INFORMATION PROCESSING PROGRAM FOR PROVIDING AUTONOMOUS MOVEMENT OF STATIONARY VEHICLES

(71) Applicant: Panasonic Intellectual Property Management Co. Ltd., Osaka (JP)

(72) Inventor: Satoru Hayama, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 269 days.

(21) Appl. No.: 16/514,083

(22) Filed: Jul. 17, 2019

(65) Prior Publication Data
US 2020/0023841 A1    Jan. 23, 2020

(30) Foreign Application Priority Data

Jul. 18, 2018 (JP) .............................. JP2018-135157
Jul. 18, 2018 (JP) .............................. JP2018-135158
Feb. 20, 2019 (JP) .............................. JP2019-028512

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *G06V 20/58* (2022.01);
(Continued)

(58) Field of Classification Search
None
See application file for complete search history.

(56) References Cited

U.S. PATENT DOCUMENTS 7,301,464 B2    11/2007 Coulter
9,254,842 B2 *   2/2016 Ishida ............... B60W 30/0956
(Continued)

FOREIGN PATENT DOCUMENTS

CA            3012102        7/2017
JP         2012-048563        3/2012
(Continued)

OTHER PUBLICATIONS

Extended European Search Report issued in Application No. 19186734.0-1003 dated Dec. 16, 2019.

*Primary Examiner* — Navid Z. Mehdizadeh
(74) *Attorney, Agent, or Firm* — Greenblum & Bernstein, P.L.C.

(57) ABSTRACT

An information processing apparatus of a moving body includes: a sensing information acquisition part which acquires sensing information indicative of a situation of the outside of the moving body by a sensor mounted on the moving body for detecting an object; a traveling obstruction determination part which determines a mode of other moving body which travels near the moving body using the sensing information; and a movement request generation part which controls a movement request transmitted to the moving body using a determination result of the mode of the other moving body.

15 Claims, 21 Drawing Sheets

(51) Int. Cl.
*G08G 1/16* (2006.01)
*G06V 20/58* (2022.01)
*G06V 40/16* (2022.01)

(52) U.S. Cl.
CPC ........... *G06V 40/174* (2022.01); *G08G 1/166* (2013.01); *B60W 2420/42* (2013.01); *B60W 2540/22* (2013.01); *B60W 2554/4041* (2020.02); *B60W 2554/801* (2020.02); *B60W 2554/804* (2020.02)

(56) References Cited

U.S. PATENT DOCUMENTS

| | | | |
|---|---|---|---|
| 2006/0267781 A1 | 11/2006 | Coulter | |
| 2013/0024103 A1* | 1/2013 | Schneider | B60W 40/04 701/301 |
| 2015/0019119 A1* | 1/2015 | Shin | G01S 17/931 701/300 |
| 2015/0039156 A1* | 2/2015 | Shibata | B60W 30/0953 701/1 |
| 2017/0314957 A1 | 11/2017 | Mimura et al. | |
| 2018/0299884 A1* | 10/2018 | Morita | G07C 5/0816 |
| 2019/0027036 A1 | 1/2019 | Mishina et al. | |
| 2019/0367020 A1* | 12/2019 | Yan | G05D 1/0088 |

FOREIGN PATENT DOCUMENTS

| | | |
|---|---|---|
| JP | 2015-018396 | 1/2015 |
| JP | 2017-207820 | 11/2017 |

\* cited by examiner

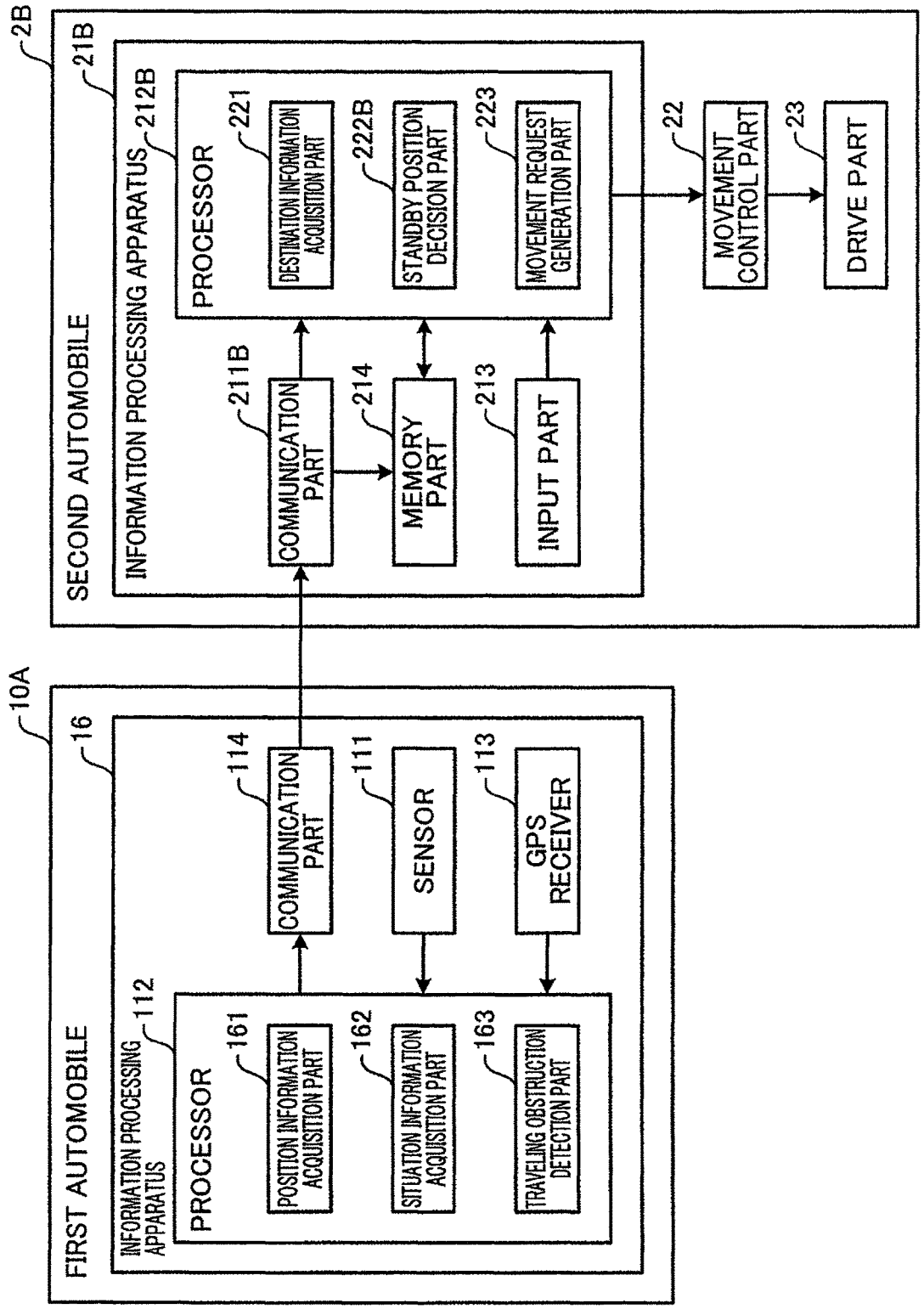

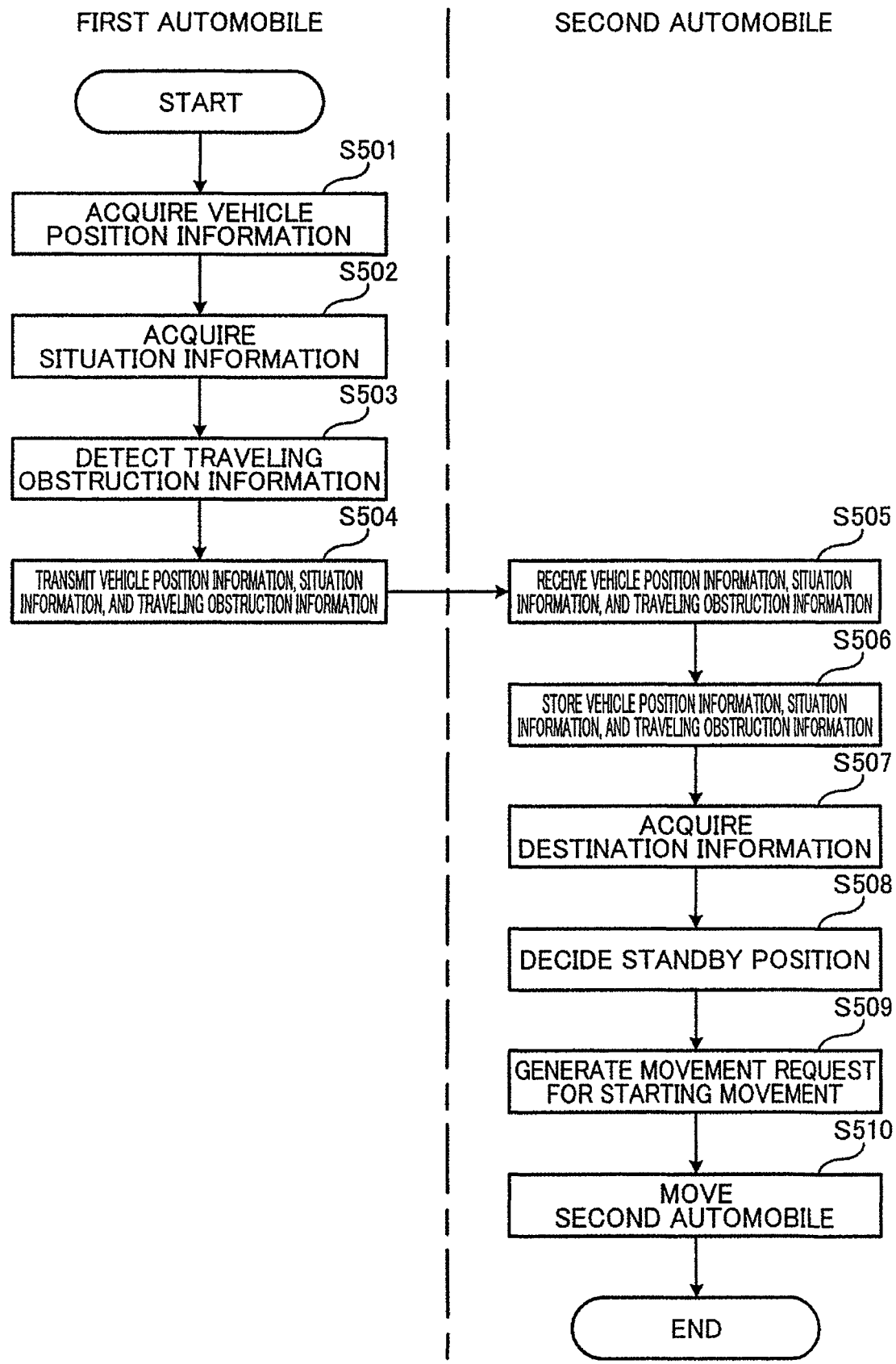

INFORMATION PROCESSING APPARATUS, INFORMATION PROCESSING METHOD AND COMPUTER READABLE RECORDING MEDIUM FOR RECORDING INFORMATION PROCESSING PROGRAM FOR PROVIDING AUTONOMOUS MOVEMENT OF STATIONARY VEHICLES

FIELD OF THE INVENTION

This disclosure relates to an information processing apparatus, information processing method and non-transitory computer readable recording medium for recording information processing program which control movement of a moving body.

BACKGROUND ART

There has been known a prior art where a self-driving vehicle is moved when the self-driving vehicle in a parking state obstructs traveling of other vehicles. For example, JP 2017-207820 A discloses the following technique. A vehicle-mounted terminal apparatus is mounted on both of a self-driving vehicle in a parking state and other vehicle which passes near the self-driving vehicle. The vehicle-mounted terminal apparatus of other vehicle acquires position information of the self-driving vehicle from the vehicle-mounted terminal apparatus of the self-driving vehicle in a parking state through communication, and determines whether or not the self-driving vehicle is in front of the own vehicle in an advancing direction and the self-driving vehicle (stopped vehicle) obstructs traveling of an own vehicle (traveling vehicle) based on position information of the own vehicle, position information of the self-driving vehicle acquired from the self-driving vehicle and map information, transmits a movement request message to the vehicle-mounted terminal apparatus of the parking vehicle when the parking vehicle obstructs traveling of the own vehicle, and the vehicle-mounted terminal apparatus of the self-driving vehicle performs self-driving upon receiving the movement request message such that the self-driving vehicle starts driving, and travels on a proper road and returns to an initial parking position for allowing passing of the traveling vehicle.

On the other hand, there has been known a prior art where a self-driving vehicle is temporarily moved for a retracting purpose without receiving an instruction from a human. For example, JP 2012-048563 A discloses the following technique. An automatic operation control system retrieves a time and a place at which a user is scheduled to use the self-driving vehicle next (referred to as "next time use scheduled time", "next time use scheduled place") based on schedule information starting from a present time. The automatic operation control system retrieves a parking place when it is determined that a time elapsed from the present time to a next time use scheduled time is a time T or more, determines whether or not a parking place having a vacant space exists within X meters from the next time use scheduled place. When it is determined that the parking place having the vacant space exists within X meters from the next time use scheduled place, the automatic operation control system sets the parking place as a destination of self-driving. JP 2012-048563 A also discloses a technique which controls a self-driving vehicle where the automatic operation control system sets the next time use scheduled place as the destination of the self-driving when the time from the present time to the next time use scheduled time is shorter than the time T, and the self-driving vehicle turns around an area near the next-time-use scheduled place when the self-driving vehicle cannot park in the next time use scheduled place by the next time use scheduled time.

However, in the above-mentioned prior art, when a moving body obstructs passing of other moving body, the moving body cannot be autonomously moved without providing equipment to other moving body and hence, there is still room for further improvement.

SUMMARY OF THE INVENTION

It is an object of this disclosure to provide an information processing apparatus, an information processing method and a non-transitory computer readable recording medium which records an information processing program where when a moving body obstructs passing of other moving body, the moving body can be autonomously moved without providing equipment to other moving body.

According to an aspect of this disclosure, there is provided an information processing apparatus is configured to: acquire sensing information indicative of a situation outside a moving body by a sensor mounted on the moving body for detecting an object; determine a mode of other moving body which travels near the moving body using the sensing information; and control a movement request transmitted to the moving body using a determination result of the mode of other moving body.

BRIEF DESCRIPTION OF THE DRAWINGS

FIG. 20 is a block diagram showing configurations of a first automobile and a second automobile according to the embodiment 8 of this disclosure; and FIG. 21 is a flowchart for describing an operation of a control of an automobile control system according to the embodiment 8 of this disclosure.

DESCRIPTION OF EMBODIMENTS (Finding which Forms a Basis of this Disclosure)

A technique which offers a predetermined service to a user inside or outside a self-driving vehicle has been proposed. For example, a service which enables viewing of a visual content in a self-driving vehicle is offered to a user. Further, for example, a home visiting care service is provided to a care receiver (user) where a self-driving vehicle in which a care giver rides travels to a home of a care receiver having no parking place, and the care giver who gets off the self-driving vehicle performs a home visiting care at the home of the care receiver. In such services, the service is provided to the user in a state where the self-driving vehicle is stopped or in a state where the self-driving vehicle is moved at a low speed. In such a case, there is a concern that the self-driving vehicle in a stopped state or during low speed moving obstructs traveling of other vehicle.

Figure 1:
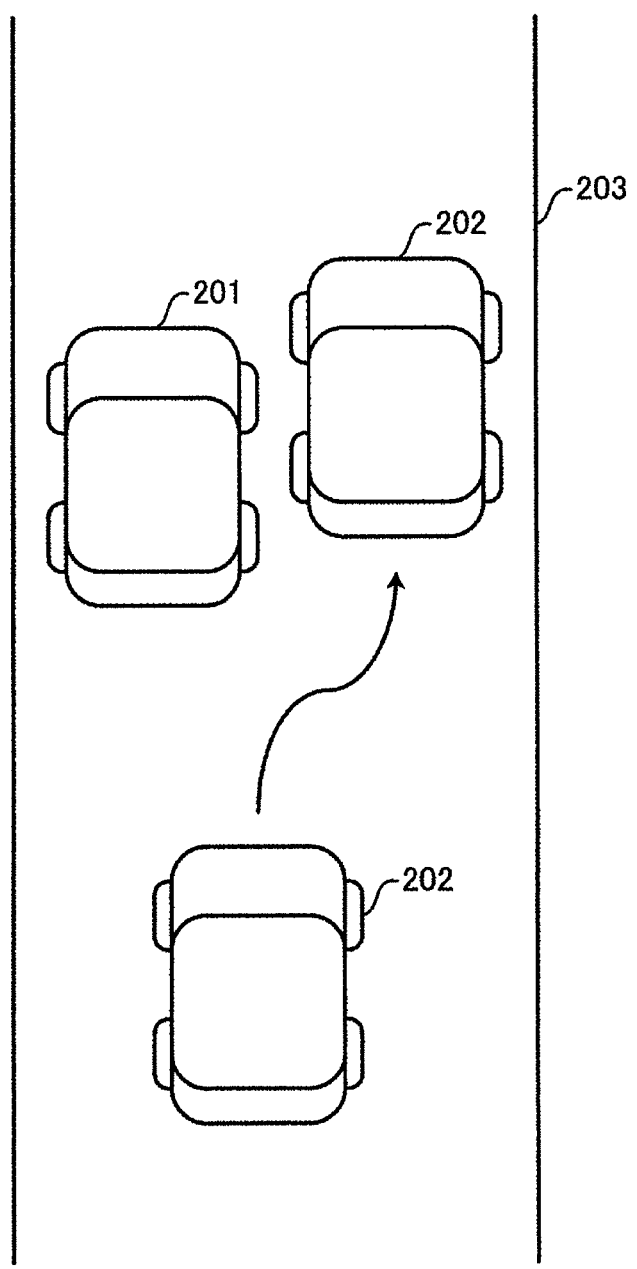
FIG. 1 is a view for describing an example where a user receives a predetermined service in a self-driving vehicle.

FIG. 1 is a view for describing an example where a user receives a predetermined service in a self-driving vehicle.

In FIG. 1, the user is receiving the predetermined service in the self-driving vehicle 201, and the self-driving vehicle 201 is stopped on a road 203. A width of the road 203 is just a length which allows two vehicles to travel side by side. On the road 203, when other vehicle 202 which comes from behind the self-driving vehicle 201 passes the self-driving vehicle 201, it is necessary for other vehicle 202 to decrease a speed and to change an advancing direction just behind the self-driving vehicle 201 in a stopped state, and to travel at a low speed near the self-driving vehicle 201 in a stopped state. In this manner, there is a case that the self-driving vehicle 201 in a stopped state for offering the service obstructs traveling of other vehicle 202.

In view of the above-mentioned circumstance, as described in the previously-mentioned JP 2017-207820 A, there has been proposed the prior art where the self-driving vehicle is moved when the self-driving vehicle in a stopped state obstructs traveling of other vehicle.

However, with the configuration disclosed in the prior art, when a vehicle-mounted terminal apparatus is not mounted in other vehicle which travels near the self-driving vehicle, there exists a drawback that the self-driving vehicle in a stopped state cannot be moved.

Further, as described in the previously-mentioned JP 2012-048563 A, there has been also proposed the prior art where the self-driving vehicle is temporarily moved for a retracting purpose without receiving an instruction from a human.

However, in the configurations disclosed in the previously-mentioned prior art, even when the self-driving vehicle does not obstruct a traffic in an actual situation, it is necessary to move the vehicle to a parking place or to make the vehicle turned around the parking place and hence, there is a concern that an unnecessary cost is incurred.

To overcome the above-mentioned drawbacks, an information processing apparatus according to an aspect of this disclosure is configured to: acquire sensing information indicative of a situation outside a moving body by a sensor mounted on the moving body for detecting an object; determine a mode of other moving body which travels near the moving body using the sensing information; and control a movement request transmitted to the moving body using a determination result of the mode of other moving body.

With such a configuration, when the moving body obstructs traveling of other moving body, the moving body can be autonomously moved without providing equipment to other moving body.

In the information processing apparatus, the information processing apparatus may detect a width of a space which allows traveling of other moving body when other moving body travels near the moving body and a width of other moving body, and may determine the width of other moving body with respect to the width of the space which allows traveling of other moving body as a mode of other moving body.

With such a configuration, by determining whether or not the width of other moving body is the width which allows traveling of other moving body near the moving body, the information processing apparatus can accurately determine whether or not other moving body can travel near the moving body. The meaning of "allows traveling" includes a case where other moving body can easily travel because a traveling width has a tolerance or the like.

In the above-mentioned information processing apparatus, the information processing apparatus may determine whether or not the width of the space which allows traveling of other moving body is shorter than the width of other moving body, and the information processing apparatus may generate a movement request for moving the moving body when the information processing apparatus determines that the width of the space which allows traveling of other moving body is shorter than the width of other moving body.

With such a configuration, the information processing apparatus can more accurately determine whether or not other moving body can travel near the moving body by comparing the width of the space which allows traveling of other moving body with the width of other moving body.

In the above-mentioned information processing apparatus, the information processing apparatus may detect the width of the space which allows traveling of other moving body using the sensing information. With such a configuration, the information processing apparatus can detect the actual width of the space which allows traveling of other moving body and hence, the information processing apparatus can more accurately determine whether or not other moving body can travel near the moving body.

The above-mentioned information processing apparatus may be further configured to: acquire present position information indicative of a present position of the moving body, and acquire map information including the present position of the moving body, and the information processing apparatus may detect the width of the space which allows traveling of other moving body using the map information and the sensing information.

With such a configuration, the width of the space which allows traveling of other moving body can be detected using map information and sensing information and hence, the information processing apparatus can detect the more accurate width of the space which allows traveling of other vehicle whereby the information processing apparatus can more accurately determine whether or not other moving body can travel near the moving body.

In the above-mentioned information processing apparatus, the sensor may include an optical sensor. With such a configuration, the sensor can detect a situation outside the moving body and hence, the information processing apparatus can more accurately determine whether or not other moving body can travel near the moving body.

In the above-mentioned information processing apparatus, the sensor may include an image sensor, and the information processing apparatus may determine an operation of other moving body as a mode of other moving body by processing image information obtained by the image sensor.

With such a configuration, the information processing apparatus can accurately determine whether or not the moving body obstructs traveling of other moving body by determining an operation of other moving body.

In the above-mentioned information processing apparatus, the information processing apparatus may determine whether or not the operation of other moving body is an operation for avoiding the moving body, and the information processing apparatus may generate a movement request for moving the moving body when the information processing apparatus determines that the operation of other moving body is the operation for avoiding the moving body.

With such a configuration, by determining whether or not the operation of other moving body is the operation for avoiding the moving body, the information processing apparatus can more accurately determine whether or not the moving body obstructs traveling of other moving body.

In the above-mentioned information processing apparatus, the information processing apparatus may determine an operation of other moving body or a change in the operation when other moving body travels near the moving body as a mode of other moving body.

With such a configuration, the information processing apparatus can more accurately determine whether or not the moving body obstructs traveling of other moving body. That is, an operation of other moving body or a change in the operation when other moving body travels near the moving body is generated due to a fact that the moving body obstructs traveling of other moving body, the moving body can be moved and hence, it is possible to more effectively prevent the moving body from obstructing traveling of other moving body.

In the above-mentioned information processing apparatus, the sensing information may include at least one of a position, a speed, an acceleration and an advancing direction of other moving body, and the information processing apparatus may determine whether or not other moving body performs any one of operations consisting of deceleration, stopping, and changing of an advancing path, and the information processing apparatus may generate a movement request for moving the moving body when the information processing apparatus determines that other moving body performs any one of the operations consisting of the deceleration, the stopping, and the change of the advancing path.

With such a configuration, the information processing apparatus can more accurately determine whether or not the moving body obstructs traveling of other moving body. That is, when other moving body performs any one of operations consisting of deceleration, stopping, and changing of an advancing path, the moving body can be moved so that it is possible to prevent more effectively the moving body from obstructing traveling of other moving body.

In the above-mentioned information processing apparatus, the sensing information may include at least one of a position, a speed, an acceleration, and an advancing direction of other moving body, the information processing apparatus determines whether or not at least one of a change amount of the speed, a change amount of the acceleration, and a change amount of an angle of the advancing direction is equal to or more than a predetermined threshold value, and the information processing apparatus may generate a movement request for moving the moving body when the information processing apparatus determines that at least one of the change amount of the speed, the change amount of the acceleration, and the change amount of the angle of the advancing direction is equal to or more than the predetermined threshold value.

With such a configuration, the information processing apparatus can more accurately determine whether or not the moving body obstructs traveling of other moving body. That is, when at least one of the change amount of the speed, the change amount of the acceleration, and the change amount of the angle of the advancing direction of other moving body is equal to or more than a predetermined threshold value, the moving body can be moved so that it is possible to more effectively prevent the moving body from obstructing traveling of other moving body.

In the above-mentioned information processing apparatus, the sensor may include an image sensor, and the information processing apparatus may determine a mode of an operator who operates other moving body as a mode of other moving body by processing an image obtained by the image sensor.

With such a configuration, by determining a mode of an operator who operates other moving body, it is possible to more accurately determine whether or not the moving body obstructs traveling of other moving body.

In the above-mentioned information processing apparatus, the information processing apparatus may determine whether or not a facial expression of the operator is a facial expression which expresses a predetermined feeling which is preliminarily stored, and the information processing apparatus may generate a movement request for moving the moving body when the information processing apparatus determines that the facial expression of the operator is the facial expression which expresses the predetermined feeling which is preliminarily stored.

With such a configuration, the information processing apparatus can more accurately determine whether or not the moving body obstructs traveling of other moving body. That is, when the facial expression of the operator is a facial expression which expresses a predetermined feeling which is preliminarily stored, the moving body can be moved so that it is possible to more effectively prevent the moving body from obstructing traveling of other moving body.

In the above-mentioned information processing apparatus, the information processing apparatus may detect a distance from the moving body to an edge of a road on which the moving body is positioned, as the width of the space which allows traveling of other moving body.

With such a configuration, by determining the width of other moving body with respect to the distance from the moving body to the edge of the road, the information processing apparatus can accurately determine whether or not other moving body can travel near the moving body.

An information processing method according to another aspect of this disclosure includes causing a computer to perform operations of acquiring sensing information indicative of a situation outside a moving body by a sensor mounted on the moving body for detecting an object, determining a mode of other moving body which travels near the moving body using the sensing information, and controlling a movement request transmitted to the moving body using a determination result of the mode of other moving body.

With such a configuration, when the moving body obstructs traveling of other moving body, the moving body can be autonomously moved without providing equipment to other moving body.

A non-transitory computer readable recording medium which records an information processing program according to another aspect of this disclosure enables a computer to execute processing of acquiring sensing information indicative of a situation outside a moving body by a sensor mounted on the moving body for detecting an object, determining a mode of other moving body which travels near the moving body using the sensing information, and controlling a movement request transmitted to the moving body using a determination result of the mode of other moving body.

With such a configuration, when the moving body obstructs traveling of other moving body, the moving body can be autonomously moved without providing equipment to other moving body.

All embodiments described hereinafter describe one specific example of this disclosure. Numerical values, shapes, constitutional elements, steps, orders of steps and the like described in the following embodiments form one example, and do not intend to limit this disclosure. Further, among constitutional elements of the following embodiments, the constitutional elements which are not described in independent claims which describe an uppermost concept are described as arbitrary constitutional elements. Further, respective contents of all embodiments can be combined with each other.

Embodiment 1

Hereinafter, a functional configuration and the whole manner of operation of the self-driving vehicle are described in detail.

Figure 2:
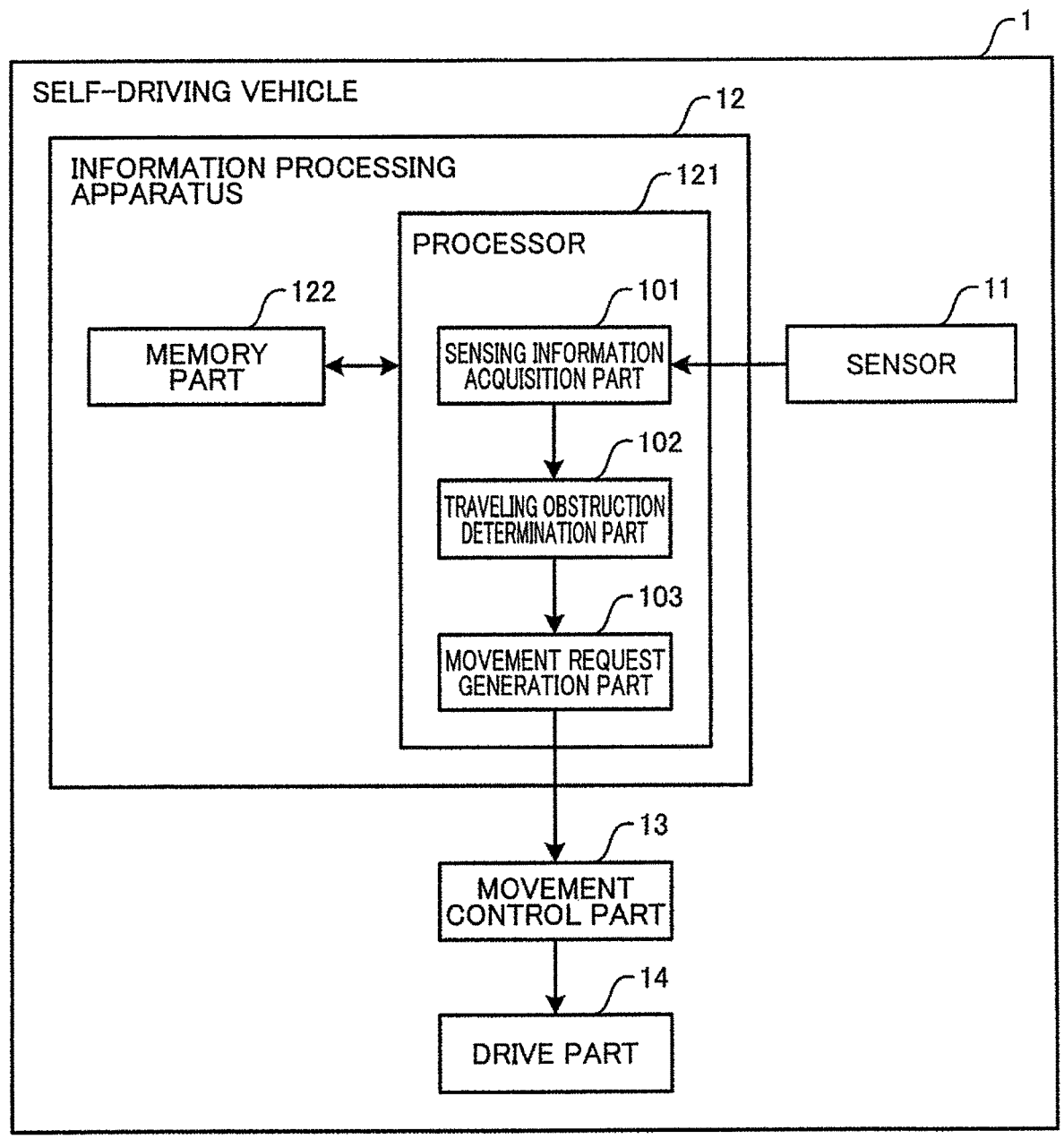
FIG. 2 is a block diagram showing a configuration of the self-driving vehicle according to an embodiment 1 of this disclosure.

FIG. 2 is a block diagram showing a configuration of a self-driving vehicle according to an embodiment 1 of this disclosure.

As shown in FIG. 2, the self-driving vehicle 1 includes: a sensor 11; an information processing apparatus 12; a movement control part 13; and a drive part 14. The information processing apparatus 12 includes a processor 121 and a memory part 122. The processor 121 includes a sensing information acquisition part 101, a traveling obstruction determination part 102, and a movement request generation part 103.

The sensor 11 detects objects around the self-driving vehicle 1. For example, the sensor 11 includes an optical sensor which acquires position information around the self-driving vehicle 1. The sensor 11 outputs position information around the self-driving vehicle 1 to the sensing information acquisition part 101 as sensing information.

The sensor 11 is an LIDAR (Light Detection and Ranging) or a millimeter wave radar, for example. The LIDAR detects distances to objects around the self-driving vehicle 1 and shapes of objects around the self-driving vehicle 1 by irradiating an infrared laser beam to the objects and by measuring times from a point of time that an infrared laser beam is irradiated from the LIDAR to a point of time that the infrared laser beam is reflected on the object and returns to the LIDAR. With such an operation, the self-driving vehicle 1 can read a three-dimensional structure of peripheral environment. On the other hand, the millimeter wave radar performs substantially the same measurement as the LIDAR. However, the millimeter wave radar does not use an infrared ray but uses a radio wave, and measures times from a point of time that a radio wave is irradiated from the millimeter wave radar to a point of time that the radio wave is reflected on objects and returns to the millimeter wave radar. Although the LIDAR which uses an infrared ray can be used even at night, the LIDAR has a characteristic that a performance of the LIDAR is lowered in bad weather. Although a millimeter wave radar which uses a radio wave is inferior to the LIDAR in resolution, the millimeter wave radar has a characteristic that the millimeter wave radar can perform detection irrespective of weather. Accordingly, by using both the LIDAR and the millimeter wave radar in combination instead of using the LIDAR or the millimeter wave radar singly, the demerits which the respective sensors have can be compensated.

The sensing information acquisition part 101 acquires sensing information indicative of a situation outside the self-driving vehicle 1 by the sensor 11 mounted on the self-driving vehicle 1 and used for detecting an object.

The traveling obstruction determination part 102 determines a mode of other vehicle traveling near the self-driving vehicle 1 using the sensing information. The traveling obstruction determination part 102 determines whether or not the self-driving vehicle 1 obstructs traveling of other vehicle based on position information around the self-driving vehicle 1 acquired by the sensing information acquisition part 101.

In the embodiment 1, it is not always necessary for the traveling obstruction determination part 102 to perform such a determination only when other vehicle travels near the self-driving vehicle 1. That is, the traveling obstruction determination part 102 may perform such a determination also in a case where other vehicle attempts to travel near the self-driving vehicle 1. The traveling obstruction determination part 102 may also determine a mode of other vehicle which travels very near a side surface of the self-driving vehicle 1 using sensing information. "Other vehicle travels very near a side surface of the self-driving vehicle 1" means that other vehicle travels in a state where a distance between the side surface of the self-driving vehicle 1 and other vehicle is equal to or less than a predetermined distance.

The traveling obstruction determination part 102 detects a width of a space which allows traveling of other vehicle when other vehicle travels near the self-driving vehicle 1 and a width of other vehicle, and determines the width of other vehicle with respect to the width of the space which allows traveling of other vehicle as a mode of other vehicle. That is, the traveling obstruction determination part 102 determines whether or not the width of the space which allows traveling of other vehicle is shorter than the width of other vehicle. The traveling obstruction determination part 102 detects the width of the space which allows traveling of other vehicle using sensing information.

The traveling obstruction determination part 102 may detect a distance between the self-driving vehicle 1 and an object on a right side or on a left side of the self-driving vehicle 1 as a width of the space which allows traveling of other vehicle, may detect a width of other vehicle, and may determine the width of other vehicle with respect to the width of the space which allows traveling of other vehicle as a mode of other vehicle. That is, the traveling obstruction determination part 102 may determine whether or not a distance between the self-driving vehicle 1 and an object on a right side or on a left side of the self-driving vehicle 1 is shorter than the width of other vehicle. With respect to the distance between the self-driving vehicle 1 and the object on a right side of the self-driving vehicle 1 and the distance between the self-driving vehicle 1 and the object on a left side of the self-driving vehicle 1, the traveling obstruction determination part 102 may detect the larger distance as the width of the space which allows traveling of other vehicle.

In the embodiment 1, a width of a space which allows traveling of other vehicle and a width of other vehicle are detected using position information (distance information) measured by an optical sensor.

For allowing other vehicle to travel on a side of the self-driving vehicle 1 with a sufficient distance therebetween, it is preferable that the traveling obstruction determination part 102 determine whether or not a width of a space which allows traveling of other vehicle around the self-driving vehicle 1 is shorter than a length obtained by adding a predetermined length to the width of other vehicle.

The memory part 122 is a semiconductor memory, for example, and preliminarily stores a predetermined length used in the traveling obstruction determination part 102 at the time of determining whether or not the self-driving vehicle 1 obstructs traveling of other vehicle. The memory part 122 also preliminarily stores a width of the self-driving vehicle 1.

The movement request generation part 103 controls a movement request to be transmitted to the self-driving vehicle 1 using a determination result of a mode of other vehicle. The movement request generation part 103 generates a movement request for starting movement of the self-driving vehicle 1 when the traveling obstruction determination part 102 determines that the self-driving vehicle 1 obstructs traveling of other vehicle and outputs the movement request to the movement control part 13. That is, the movement request generation part 103 generates a movement request for moving the self-driving vehicle 1 when the traveling obstruction determination part 102 determines that a width of a space which allows traveling of other vehicle around the self-driving vehicle 1 is shorter than a width of other vehicle. The movement request generation part 103 also generates a movement request for moving the self-driving vehicle 1 when the traveling obstruction determination part 102 determines that the width of the space which allows traveling of other vehicle around the self-driving vehicle 1 is shorter than a length obtained by adding a predetermined length to the width of other vehicle.

The movement control part 13 starts movement of the self-driving vehicle 1 by controlling the drive part 14 when the movement control part 13 receives a movement request for starting the movement of the self-driving vehicle 1 from the movement request generation part 103.

The drive part 14 moves the self-driving vehicle 1 in accordance with a control by the movement control part 13. In the case where the self-driving vehicle 1 is an engine vehicle, the drive part 14 is formed of an engine and a transmission, for example. In the case where the self-driving vehicle 1 is an electric automobile (battery vehicle), the drive part 14 is formed of a traveling motor and a transmission, for example. Both the engine and the traveling motor are started and stopped by way of an ignition switch.

Figure 3:
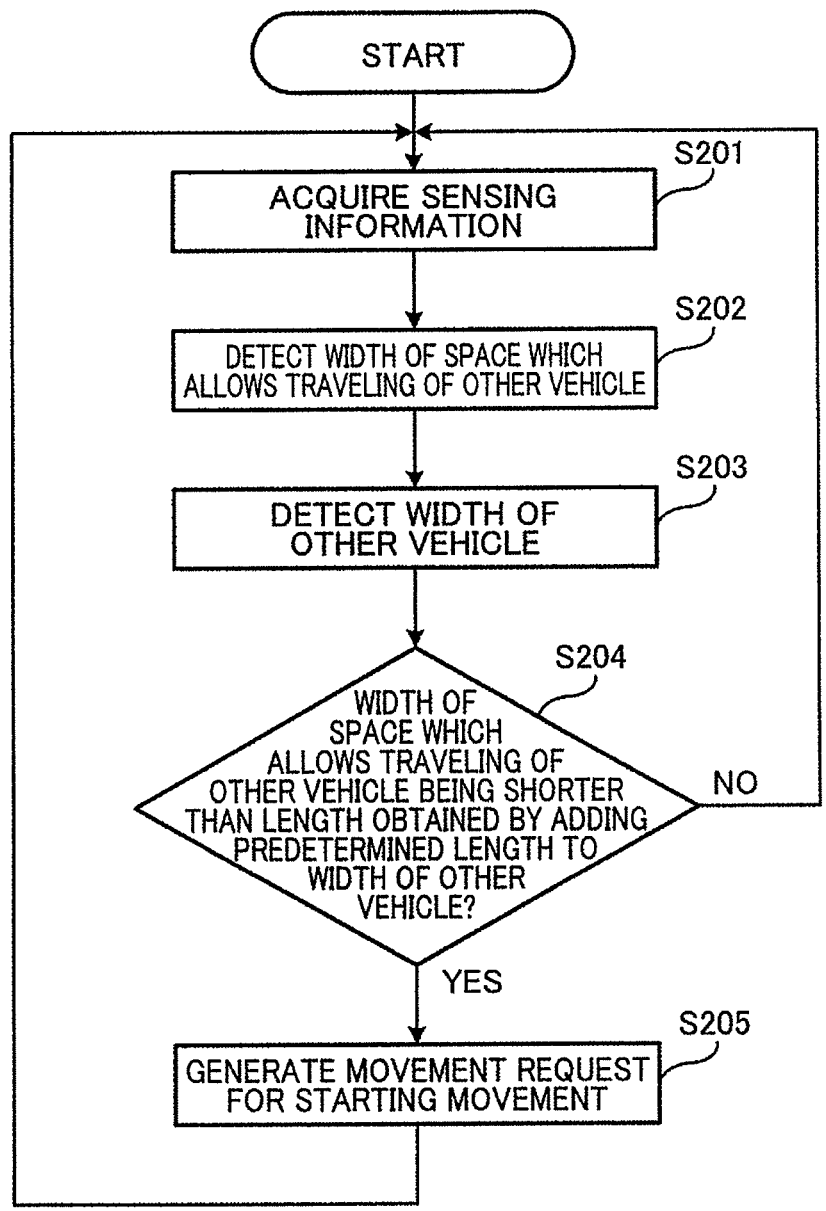
FIG. 3 is a flowchart for describing an operation of a moving control of the self-driving vehicle according to the embodiment 1 of this disclosure.

FIG. 3 is a flowchart for describing the manner of operation of a movement control of the self-driving vehicle according to the embodiment 1 of this disclosure.

First, the sensing information acquisition part 101 of the self-driving vehicle 1 acquires sensing information by the sensor 11 (step S201). The sensor 11 measures position information indicative of a distance from the self-driving vehicle 1 to an object around the self-driving vehicle 1, and outputs the measured position information to the sensing information acquisition part 101 as sensing information.

In this embodiment 1, the sensor 11 is an LIDAR or a millimeter wave radar, and the sensor 11 measures position information. However, this disclosure is not particularly limited to such a configuration, and the self-driving vehicle 1 may include a communication part which receives sensing information measured by other vehicle via wireless communication.

Processing in step S201 may be executed during a period where the self-driving vehicle 1 is stopped, during a period where the self-driving vehicle 1 advances slowly, or during a period where the self-driving vehicle 1 travels. A typical situation where processing in step S201 is executed is a situation where the self-driving vehicle 1 is stopped. However, the above-mentioned situation is not intended to limit this disclosure.

Next, the traveling obstruction determination part 102 detects a width of a space which allows traveling of other vehicle by analyzing sensing information (position information) acquired by the sensing information acquisition part 101 (step S202).

"Space which allows traveling of other vehicle" may be a road or may be a place other than the road. The space which allows traveling of other vehicle indicates a distance from the self-driving vehicle 1 to an object on a side where other vehicle travels as viewed from the self-driving vehicle 1, for example. Further, the space which allows traveling of other vehicle is, typically, a space obtained by excluding a space occupied due to stopping of the self-driving vehicle 1 from a space in a width direction on a road where the self-driving vehicle 1 is stopped. Alternatively, the space which allows traveling of other vehicle is a space obtained by excluding a space occupied due to stopping of the self-driving vehicle 1 and a space occupied due to stopping or traveling of other vehicle from a space in the width direction on a road where the self-driving vehicle 1 is stopped or the like. These spaces which allow traveling of other vehicle are exemplified merely as an example, and are not intended to limit this disclosure.

For example, the traveling obstruction determination part 102 may detect a length obtained by subtracting a width of the self-driving vehicle 1 from a width of a road where the self-driving vehicle 1 is stopped as a width of a space which allows traveling of other vehicle. In this case, sensing information includes position information indicative of a distance from the self-driving vehicle 1 to an object around the self-driving vehicle 1. Accordingly, the traveling obstruction determination part 102 calculates a distance obtained by adding a distance from the self-driving vehicle 1 to an object on a right side of the self-driving vehicle 1 to a distance from the self-driving vehicle 1 to an object on a left side of the self-driving vehicle 1 as a width of a road. The width of the self-driving vehicle 1 is preliminarily stored in the memory part 122 and hence, the traveling obstruction determination part 102 reads the width of the self-driving vehicle 1 from the memory part 122.

Next, the traveling obstruction determination part 102 detects a width of other vehicle by analyzing sensing information (position information) acquired by the sensing information acquisition part 101 (step S203).

In this embodiment 1, the sensor 11 irradiates an infrared laser beam over 360 degrees around the self-driving vehicle 1 and hence, the sensor 11 can detect not only a distance from the self-driving vehicle 1 to an object existing around the self-driving vehicle 1 but also a shape of such an object existing around the self-driving vehicle 1. Accordingly, for example, the sensor 11 can detect a shape of a front portion of other vehicle approaching the self-driving vehicle 1 from behind, and the traveling obstruction determination part 102 can detect a length in a width direction of the front portion of other vehicle.

In this embodiment 1, the traveling obstruction determination part 102 detects a width of other vehicle. However, this disclosure is not limited to such a configuration, and the traveling obstruction determination part 102 may detect a width of a human or an animal walking or running near the self-driving vehicle 1. Although an object to be detected is typically other vehicle, other vehicle is only an example, and this is not intended to limit this disclosure. Further, the traveling obstruction determination part 102 may detect a distance from the self-driving vehicle 1 to an edge of a road where the self-driving vehicle 1 is positioned and a width of other vehicle. That is, the traveling obstruction determination part 102 may detect the distance from the self-driving vehicle 1 to the edge of the road where the self-driving vehicle 1 is positioned as a width of a space which allows traveling of other vehicle.

Next, the traveling obstruction determination part 102 acquires a predetermined length from the memory part 122, and determines whether or not a width of a space which allows traveling of other vehicle is shorter than a length obtained by adding the predetermined length to a width of other vehicle (step S204). The traveling obstruction determination part 102 may compare the above-mentioned distance from the self-driving vehicle 1 to the edge of the road and the width of other vehicle with each other.

When the traveling obstruction determination part 102 determines that the width of the space which allows traveling of other vehicle is shorter than the length obtained by adding the predetermined length to the width of other vehicle (YES in step S204), the movement request generation part 103 generates a movement request for starting movement of the self-driving vehicle 1 (step S205). The movement request generation part 103 outputs the generated movement request to the movement control part 13. The movement control part 13 which receives the movement request performs a movement control for starting movement of the self-driving vehicle 1 thus allowing the drive part 14 to start movement of the self-driving vehicle 1. Then, processing returns to step S201.

The movement request generation part 103 may decide a specified destination such as other place on a road, a parking place or a garage at the time of starting movement of the self-driving vehicle 1, and may move the self-driving vehicle 1 to the decided destination. Alternatively, the movement request generation part 103 may generate a movement request by which the self-driving vehicle 1 continues slow moving or traveling on a road without deciding a specified destination at the time of starting movement of the self-driving vehicle 1. Still alternatively, the movement request generation part 103 may decides a route along which the self-driving vehicle 1 travels and may generate a movement request by which the self-driving vehicle 1 continues traveling on the decided route at the time of starting the movement of the self-driving vehicle 1. These movement controls of the self-driving vehicle 1 are exemplified merely as an example, and are not intended to limit this disclosure.

The movement request generation part 103 performs the movement control, and processing returns to step S201 after the movement of the self-driving vehicle 1 is started. However, a timing at which processing in step S201 is executed next may be immediately after starting the movement of the self-driving vehicle 1 or may be after finishing the movement of the self-driving vehicle 1. The timing at which processing in step S201 is executed after starting the movement of the self-driving vehicle 1 is exemplified merely as an example, and is not intended to limit this disclosure.

On the other hand, when the traveling obstruction determination part 102 determines that the width of the space which allows traveling of other vehicle is larger than the length obtained by adding a predetermined length to the width of other vehicle (NO in step S204), processing returns to step S201.

In this embodiment 1, the description has been made with respect to the case where the traveling obstruction determination part 102 detects a width of a space which allows traveling of other vehicle around the self-driving vehicle 1 and a width of other vehicle from position information acquired by the sensor 11, and determines that the self-driving vehicle 1 obstructs traveling of other vehicle when the width of the space which allows traveling of other vehicle is shorter than the length obtained by adding the predetermined length to the width of other vehicle. However, the traveling obstruction determination part 102 may detect other determination condition based on the position information. For example, the traveling obstruction determination part 102 may determine that the self-driving vehicle 1 obstructs traveling of other vehicle when a distance between the self-driving vehicle 1 and other vehicle is equal to or less than a predetermined distance. In this manner, the traveling obstruction determination part 102 can detect various determination conditions based on position information. However, these determination conditions are exemplified merely as an example, and are not intended to limit this disclosure.

Embodiment 2

Figure 4:
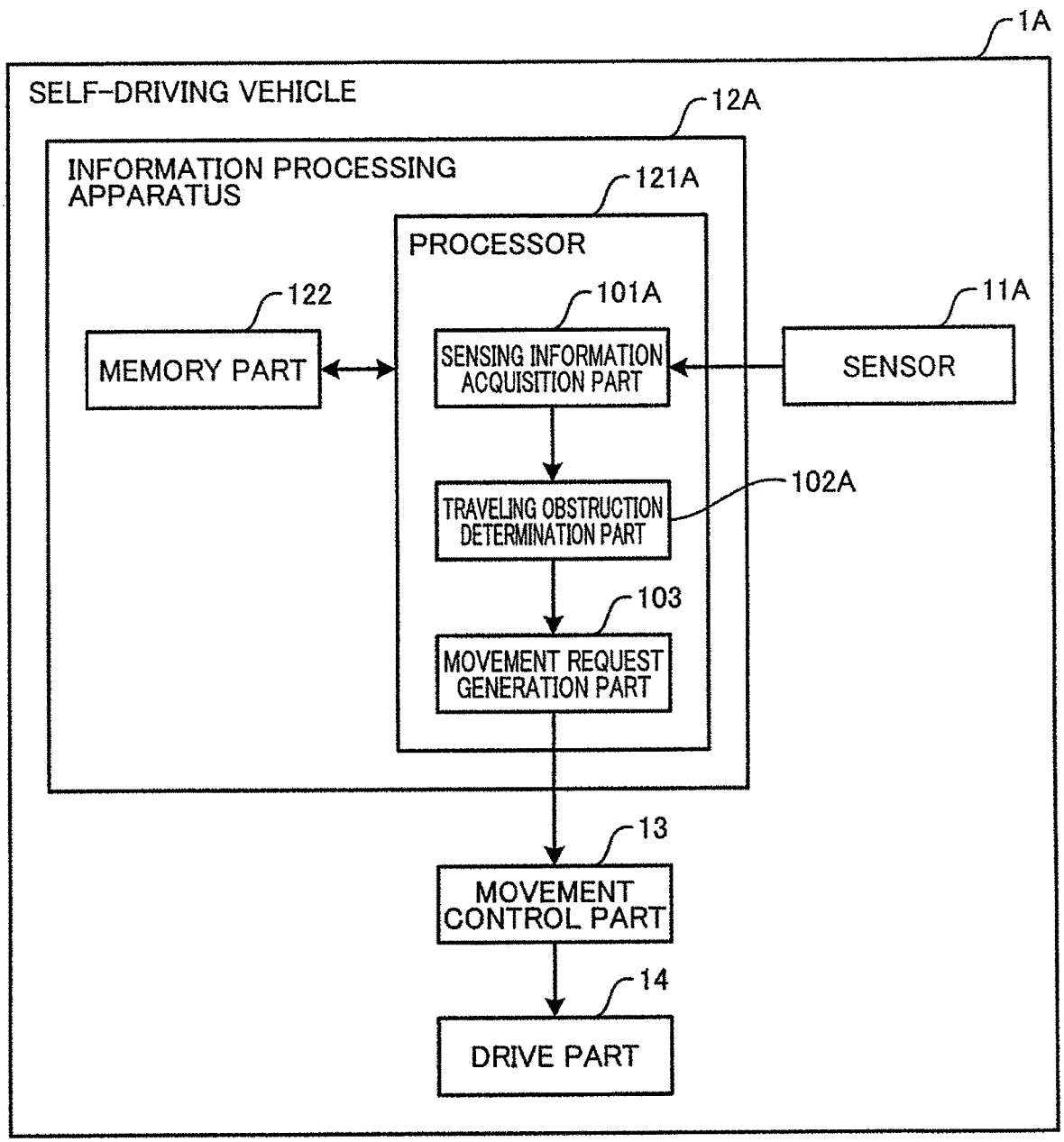
FIG. 4 is a block diagram showing a configuration of a self-driving vehicle according to an embodiment 2 of this disclosure.

FIG. 4 is a block diagram showing a configuration of a self-driving vehicle according to an embodiment 2 of this disclosure. A self-driving vehicle 1A shown in FIG. 4 includes: a sensor 11A; an information processing apparatus 12A; a movement control part 13; and a drive part 14. The information processing apparatus 12A includes a processor 121A, and a memory part 122. The processor 121A includes a sensing information acquisition part 101A, a traveling obstruction determination part 102A, and a movement request generation part 103. In the self-driving vehicle 1A of the embodiment 2, constitutional elements having functions identical with the functions of the constitutional elements in the embodiment 1 are given the same symbols, and the description of these constitutional elements is omitted.

The sensor 11A detects an object around the self-driving vehicle 1A. The sensor 11A is an image sensor, for example, and acquires image information around the self-driving vehicle 1A. The sensor 11A outputs sensing information indicative of a situation outside the self-driving vehicle 1A to the sensing information acquisition part 101A. The sensor 11A acquires an image around the self-driving vehicle 1A as a surrounding situation.

The sensing information acquisition part 101A acquires sensing information indicative of a situation outside the self-driving vehicle 1A by the sensor 11A mounted on the self-driving vehicle 1A and used for detecting an object.

The traveling obstruction determination part 102A determines a mode of other vehicle traveling near the self-driving vehicle 1A using the sensing information. The traveling obstruction determination part 102A determines whether or not the self-driving vehicle 1A obstructs traveling of other vehicle based on an image around the self-driving vehicle 1A acquired by the sensing information acquisition part 101A.

The traveling obstruction determination part 102A detects a width of a space which allows traveling of other vehicle when other vehicle travels near the self-driving vehicle 1A and a width of other vehicle, and determines the width of other vehicle with respect to the width of the space which allows traveling of other vehicle as a mode of other vehicle. That is, the traveling obstruction determination part 102A determines whether or not the width of the space which allows traveling of other vehicle is shorter than the width of other vehicle. The traveling obstruction determination part 102A detects the width of the space which allows traveling of other vehicle using sensing information.

The traveling obstruction determination part 102A may detect a distance between the self-driving vehicle 1A and an object on a right side or a left side of the self-driving vehicle 1A as the width of the space which allows traveling of other vehicle, may detect a width of other vehicle, and may determine the width of other vehicle with respect to the width of the space which allows traveling of other vehicle as a mode of other vehicle. That is, the traveling obstruction determination part 102A may determine whether or not a distance between the self-driving vehicle 1A and an object on a right side or a left side of the self-driving vehicle 1A is shorter than the width of other vehicle. With respect to the distance between the self-driving vehicle 1A and an object on a right side of the self-driving vehicle 1A and the distance between the self-driving vehicle 1A and an object on a left side of the self-driving vehicle 1A, the traveling obstruction determination part 102A may detect the larger distance as the width of the space which allows traveling of other vehicle.

The traveling obstruction determination part 102A may detect a width of a road where other vehicle travels near the self-driving vehicle 1, a width of the self-driving vehicle 1A, and a width of other vehicle, and may determine the width of other vehicle as a mode of other vehicle. That is, the traveling obstruction determination part 102A determines whether or not a length obtained by subtracting the width of the self-driving vehicle 1A from the width of the road is shorter than the width of other vehicle. The traveling obstruction determination part 102A detects the width of the road using sensing information.

In this embodiment 2, a width of a space which allows traveling of other vehicle and a width of other vehicle are detected using image information acquired by the image sensor.

The traveling obstruction determination part 102A detects a width of a space which allows traveling of other vehicle by recognizing an edge of a road from image information and by recognizing an apparent size of an object which exists near the edge of the road and whose actual size is known (for example, a road sign or the like), for example. Further, the traveling obstruction determination part 102A detects a width of other vehicle by recognizing other vehicle from image information and by recognizing an apparent size of an object which exists near other vehicle and whose size is known (for example, a road sign or the like), for example.

Figure 5:
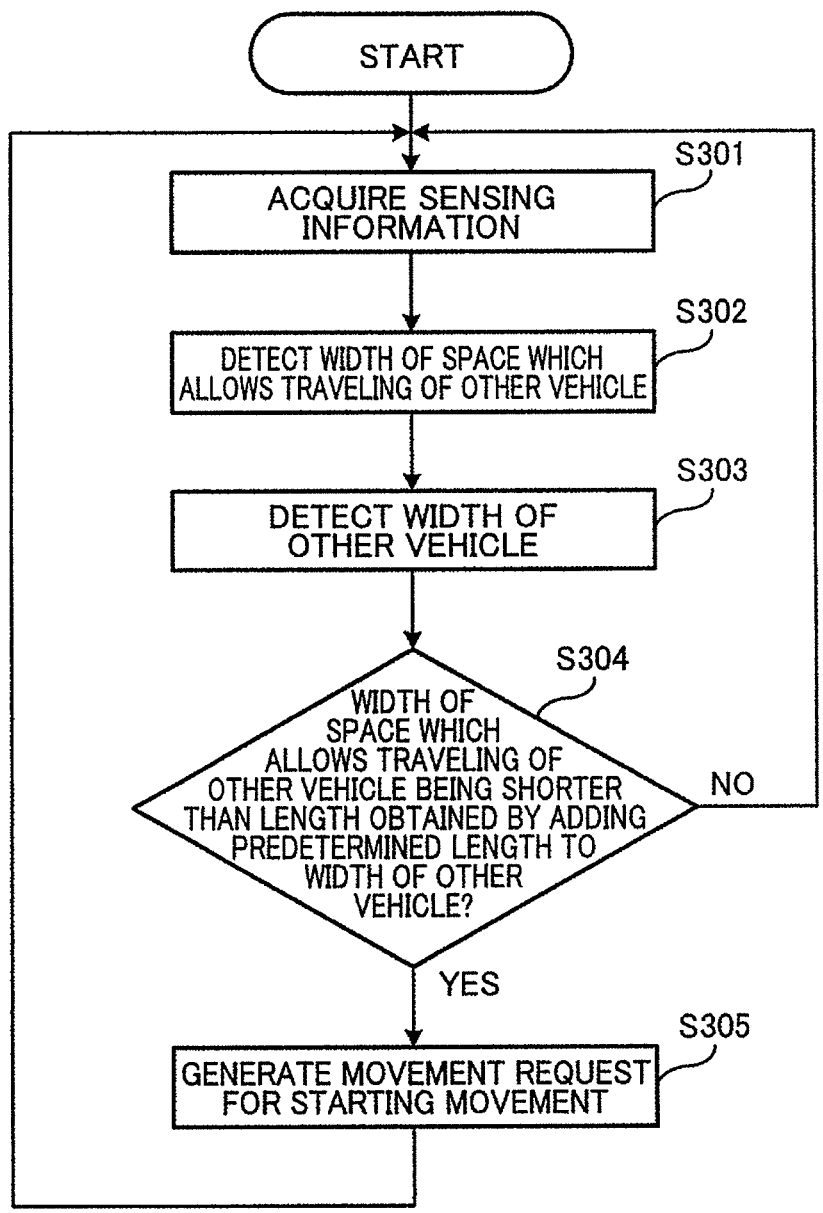
FIG. 5 is a flowchart for describing an operation of a moving control of the self-driving vehicle according to the embodiment 2 of this disclosure.

FIG. 5 is a flowchart for describing the manner of operation of the movement control of the self-driving vehicle according to the embodiment 2.

First, the sensing information acquisition part 101A of the self-driving vehicle 1A acquires sensing information by the sensor 11A (step S301). The sensor 11A acquires image information around the self-driving vehicle 1A, and outputs the acquired image information to the sensing information acquisition part 101A as sensing information.

In this embodiment 2, the sensor 11A is an image sensor, and the sensor 11A images the surrounding of the self-driving vehicle 1A. However, this disclosure is not limited to such a configuration, and the self-driving vehicle 1A may include a communication part which receives image information imaged by an external device via a wireless communication. The external device may be a monitoring camera provided to other vehicle or on a road, for example.

Processing in step S301 may be executed during a period where the self-driving vehicle 1A is stopped, during a period where the self-driving vehicle 1A advances slowly, or during a period where the self-driving vehicle 1A travels. A typical situation where processing in step S301 is executed is a situation where the self-driving vehicle 1A is stopped. However, the above-mentioned situation is not intended to limit this disclosure.

Next, the traveling obstruction determination part 102A detects a width of a space which allows traveling of other vehicle by analyzing sensing information (image information) acquired by the sensing information acquisition part 101A (step S302).

The traveling obstruction determination part 102A estimates a distance from the self-driving vehicle 1A to an edge of a road by recognizing the edge of the road from image information and by recognizing an apparent size of an object which exists near the edge of the road and whose actual size is known (for example, a road sign or the like), for example. The above-mentioned method of detecting a width of a road is exemplified merely as an example, and is not intended to limit this disclosure.

"Space which allows traveling of other vehicle" may be a road or may be a place other than the road. The space which allows traveling of other vehicle indicates a distance from the self-driving vehicle 1A to an object on a side where other vehicle travels as viewed from the self-driving vehicle 1A, for example. Further, the space which allows traveling of other vehicle is, typically, a space obtained by excluding a space occupied due to stopping of the self-driving vehicle 1A from a space in a width direction on a road where the self-driving vehicle 1A is stopped. Alternatively, the space which allows traveling of other vehicle is a space obtained by excluding a space which is occupied due to stopping of the self-driving vehicle 1A and a space which is occupied due to stopping or traveling of other vehicle from the space in the width direction on the road where the self-driving vehicle 1A is stopped or the like. These spaces which allow traveling of other vehicle are exemplified merely as an example, and are not intended to limit this disclosure.

For example, the traveling obstruction determination part 102A may detect a length obtained by subtracting a width of the self-driving vehicle 1A from a width of a road where the self-driving vehicle 1A is stopped as a width of a space which allows traveling of other vehicle. In this case, sensing information includes image information acquired by imaging the surrounding of the self-driving vehicle 1A. Accordingly, the traveling obstruction determination part 102A recognizes an object on a right side of the self-driving vehicle 1A and an object on a left side of the self-driving vehicle 1A. The traveling obstruction determination part 102A calculates a distance obtained by adding a distance from the self-driving vehicle 1A to the object on the right side of the self-driving vehicle 1A to a distance from the self-driving vehicle 1A to the object on the left side of the self-driving vehicle 1A as a width of a road. Further, the width of the self-driving vehicle 1A is preliminarily stored in the memory part 122. Accordingly, the traveling obstruction determination part 102A reads the width of the self-driving vehicle 1A from the memory part 122.

Next, the traveling obstruction determination part 102A detects a width of other vehicle by analyzing sensing information (image information) acquired by the sensing information acquisition part 101A (step S303).

The traveling obstruction determination part 102A estimates a width of other vehicle by recognizing other vehicle from image information and by recognizing an apparent size of an object which exists near other vehicle and whose actual size is known (for example, a road sign or the like), for example. The above-mentioned method of detecting other vehicle is exemplified merely as an example, and is not intended to limit this disclosure.

In this embodiment 2, the traveling obstruction determination part 102A detects a width of other vehicle. However, this disclosure is not particularly limited to such a configuration, and the traveling obstruction determination part 102A may detect a width of a human or an animal walking or running near the self-driving vehicle 1A. Although an object to be detected is typically other vehicle, other vehicle is exemplified merely as an example, and this is not intended to limit this disclosure. Further, the traveling obstruction determination part 102A may detect a distance from the self-driving vehicle 1A to an edge of a road where the self-driving vehicle 1A is positioned and a width of other vehicle. That is, the traveling obstruction determination part 102A may detect a distance from the self-driving vehicle 1A to the edge of the road where the self-driving vehicle 1A is positioned as a width of a space which allows traveling of other vehicle.

Next, the traveling obstruction determination part 102A acquires a predetermined length from the memory part 122, and determines whether or not a width of a space which allows traveling of other vehicle is shorter than a length obtained by adding the predetermined length to the width of other vehicle (step S304). The traveling obstruction determination part 102A may compare the above-mentioned distance from the self-driving vehicle 1A to the edge of the road and the width of other vehicle with each other.

When the traveling obstruction determination part 102A determines that the width of the space which allows traveling of other vehicle is shorter than the length obtained by adding the predetermined length to the width of other vehicle (YES in step S304), the movement request generation part 103 generates a movement request for starting movement of the self-driving vehicle 1A (step S305). The movement request generation part 103 outputs the generated movement request to the movement control part 13. The movement control part 13 which receives the movement request performs a movement control for starting movement of the self-driving vehicle 1A thus allowing the drive part 14 to start movement of the self-driving vehicle 1A. Then, processing returns to step S301.

The movement request generation part 103 may decide a specified destination such as other place on a road, a parking place or a garage at the time of starting movement of the self-driving vehicle 1A, and may move the self-driving vehicle 1A to the decided destination. Alternatively, the movement request generation part 103 may generate a movement request by which the self-driving vehicle 1A continues slow moving or traveling on a road without deciding a specified destination at the time of starting movement of the self-driving vehicle 1A. Still alternatively, the movement request generation part 103 may decide a route along which the self-driving vehicle 1A travels and may generate a movement request by which the self-driving vehicle 1A continues traveling on the decided route at the time of starting the movement of the self-driving vehicle 1A. These movement controls of the self-driving vehicle 1A are exemplified merely as an example, and are not intended to limit this disclosure.

The movement request generation part 103 performs the movement control, and processing returns to step S301 after the movement of the self-driving vehicle 1A is started. However, a timing at which processing in step S301 is executed next may be immediately after starting the movement of the self-driving vehicle 1A or may be after finishing the movement of the self-driving vehicle 1A. A timing at which processing in step S301 is executed after starting the movement of the self-driving vehicle 1A is one example, and is exemplified merely as an example, and is not intended to limit this disclosure.

On the other hand, when the traveling obstruction determination part 102A determines that the width of the space which allows traveling of other vehicle is larger than the length obtained by adding a predetermined length to the width of other vehicle (NO in step S304), processing returns to step S301.

In this embodiment 2, the description is made by taking a case, as an example, where the traveling obstruction determination part 102A detects a width of a space which allows traveling of other vehicle around the self-driving vehicle 1A and a width of other vehicle from image information acquired by the sensor 11, and determines that the self-driving vehicle 1A obstructs traveling of other vehicle when the width of the space which allows traveling of other vehicle is shorter than the length obtained by adding the predetermined length to the width of other vehicle, However, the traveling obstruction determination part 102A may detect other determination condition based on the image information. For example, the traveling obstruction determination part 102A may determine that the self-driving vehicle 1A obstructs traveling of other vehicle when the traveling obstruction determination part 102A recognizes other vehicle in the image. Further, the traveling obstruction determination part 102A may determine that the self-driving vehicle 1A obstructs traveling of other vehicle when the traveling obstruction determination part 102A recognizes a preset operation image such as a changing in an advancing direction, a sudden stopping, a passing of a light, a changing in facial expression of a driver, and the like in the image.

In this case, the traveling obstruction determination part 102A determines the manner of operation of other vehicle as a mode of other vehicle by processing image information acquired by the sensor 11A. The traveling obstruction determination part 102A determines whether or not the self-driving vehicle 1A obstructs traveling of other vehicle based on an image around the self-driving vehicle 1A acquired by the sensing information acquisition part 101A. The traveling obstruction determination part 102A determines whether or not an operation of other vehicle is an operation for avoiding the self-driving vehicle 1A. The memory part 122 stores an operation of other vehicle to be used when the traveling obstruction determination part 102A determines that the self-driving vehicle 1A obstructs traveling of other vehicle. The movement request generation part 103 may generate a movement request for moving the self-driving vehicle 1A when the traveling obstruction determination part 102A determines that the operation of other vehicle is the operation for avoiding the self-driving vehicle 1A.

The traveling obstruction determination part 102A may determine a mode of an operator who operates other vehicle as a mode of other vehicle by processing an image acquired by the sensor 11A. The traveling obstruction determination part 102A determines whether or not a facial expression of an operator is a facial expression which expresses a predetermined feeling which is preliminarily stored in the memory part 122. The predetermined feeling means an anger feeling, a perplexed feeling or the like, for example. The traveling obstruction determination part 102A analyzes an image, and recognizes a facial expression of an operator. The traveling obstruction determination part 102A determines whether or not the recognized facial expression of the operator is a facial expression expressing a predetermined feeling. The movement request generation part 103 generates a movement request for moving the self-driving vehicle 1A when the traveling obstruction determination part 102A determines that the facial expression of the operator is a facial expression expressing a preliminarily-stored predetermined feeling.

The traveling obstruction determination part 102A may determine whether or not a facial expression of an operator is changed. The movement request generation part 103 may generate a movement request for moving the self-driving vehicle 1A when the traveling obstruction determination part 102A determines that the facial expression of the operator is changed.

In this manner, although the traveling obstruction determination part 102A can detect various determination conditions based on image information, these determination conditions are exemplified merely as an example, and are not intended to limit this disclosure.

Embodiment 3

In the embodiment 1, a width of other vehicle is determined by detecting a width of a space which allows traveling of other vehicle when other vehicle travels near the self-driving vehicle 1 and the width of other vehicle. On the other hand, in the embodiment 3, an operation of other vehicle or a change in the operation when other vehicle travels near a self-driving vehicle 1 is determined.

Figure 6:
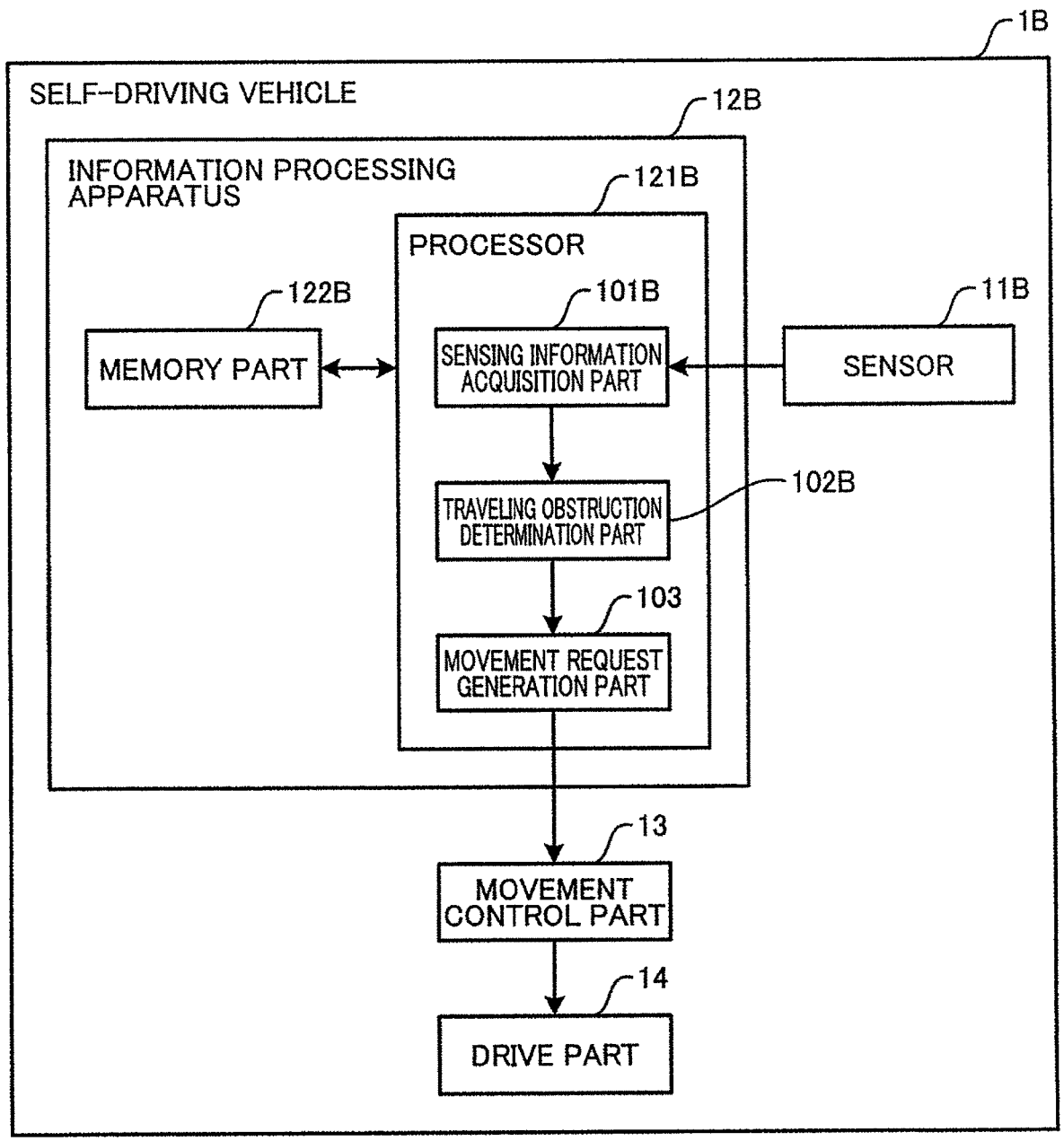
FIG. 6 is a block diagram showing a configuration of a self-driving vehicle according to an embodiment 3 of this disclosure.

FIG. 6 is a block diagram showing a configuration of a self-driving vehicle according to the embodiment 3 of this disclosure. A self-driving vehicle 1B shown in FIG. 6 includes: a sensor 11B; an information processing apparatus 12B; a movement control part 13; and a drive part 14. The information processing apparatus 12B includes a processor 121B, and a memory part 122B. The processor 121B includes a sensing information acquisition part 101B, a traveling obstruction determination part 102B, and the movement request generation part 103. In the self-driving vehicle 1B of the embodiment 3, constitutional elements having functions identical with functions of constitutional elements in the embodiment 1 are given the same symbols, and the description of these constitutional elements is omitted.

The sensor 11B detects an object around the self-driving vehicle 1B. The sensor 11B is an optical sensor, for example, and acquires a position, a speed, an acceleration and an advancing direction of other vehicle which travels near the self-driving vehicle 1B as sensing information. The sensor 11B outputs sensing information indicative of a situation outside the self-driving vehicle 1B to the sensing information acquisition part 101B. The sensor 11B is an LIDAR (Light Detection and Ranging) or a millimeter-wave radar, for example. The sensor 11B may acquire at least one of a position, a speed, an acceleration, and an advancing direction of other vehicle as sensing information.

The sensing information acquisition part 101B acquires sensing information indicative of a situation outside the self-driving vehicle 1B by the sensor 11B mounted on the self-driving vehicle 1B used for detecting an object.

The traveling obstruction determination part 102B determines a change in operation of other vehicle when other vehicle travels near the self-driving vehicle 1B as a mode of other vehicle. The traveling obstruction determination part 102B determines whether or not the self-driving vehicle 1B obstructs traveling of other vehicle based on a position, a speed, an acceleration, and an advancing direction (including a retracting direction) of other vehicle acquired by the sensing information acquisition part 101B.

The traveling obstruction determination part 102B determines whether or not at least one of a change amount of the speed, a change amount of the acceleration, and a change amount of the angle of the advancing direction is equal to or more than a predetermined threshold value.

The memory part 122B is a semiconductor memory, for example, and preliminarily stores predetermined threshold values used in the traveling obstruction determination part 102B at the time of determining whether or not the self-driving vehicle 1B obstructs traveling of other vehicle. The memory part 122B preliminarily stores a threshold value to be compared with a change amount of a speed, a threshold value to be compared with a change amount of an acceleration, and a threshold value to be compared with a change amount of an angle of the advancing direction.

The movement request generation part 103 generates a movement request for moving the self-driving vehicle 1B when the traveling obstruction determination part 102B determines that at least one of a change amount of a speed, a change amount of an acceleration, and a change amount of an angle of the advancing direction is equal to or more than a predetermined threshold value.

Figure 7:
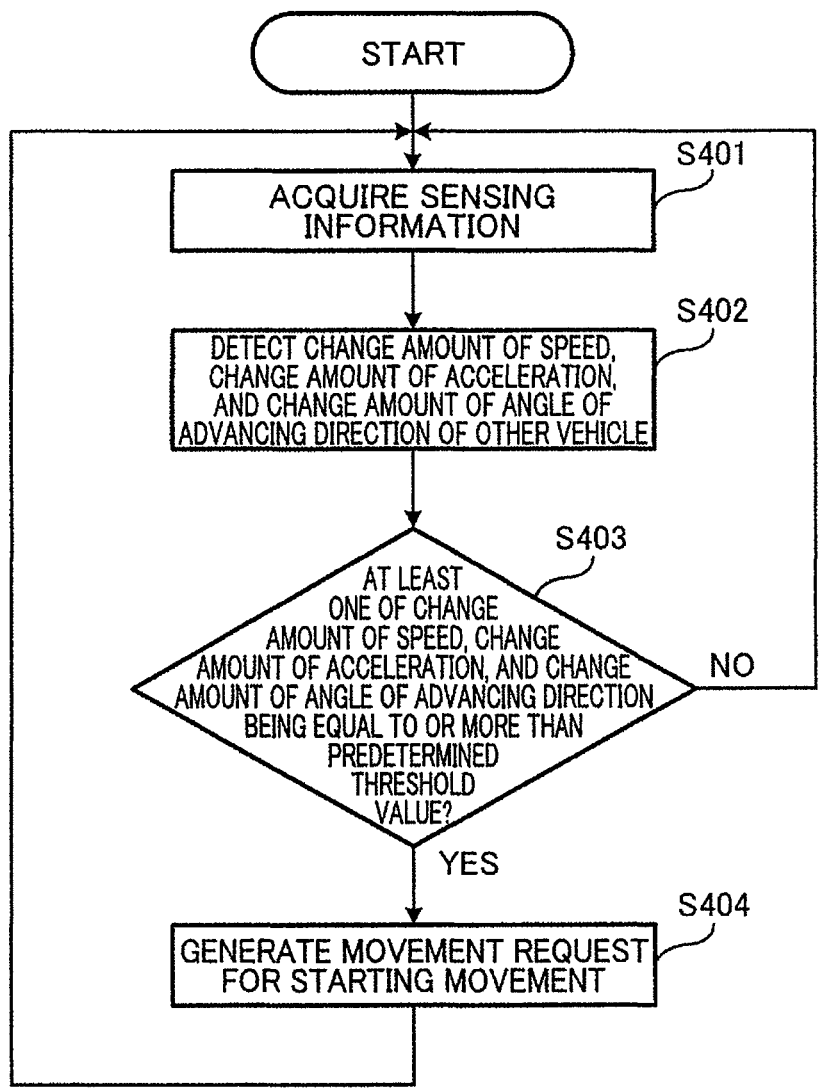
FIG. 7 is a flowchart for describing an operation of a moving control of the self-driving vehicle according to the embodiment 3 of this disclosure.

FIG. 7 is a flowchart for describing the manner of operation of the movement control of the self-driving vehicle according to the embodiment 3 of this disclosure.

First, the sensing information acquisition part 101B of the self-driving vehicle 1B acquires sensing information by the sensor 11B (step S401). The sensor 11B acquires a position, a speed, an acceleration, and an advancing direction of other vehicle which travels near the self-driving vehicle 1B, and outputs the acquired position, speed, the acquired acceleration and the acquired advancing direction to the sensing information acquisition part 101B as sensing information.

In this embodiment 3, the sensor 11B is an LIDAR or a millimeter-wave radar, and the sensor 11B acquires a position, a speed, an acceleration, and an advancing direction of other vehicle. However, this disclosure is not particularly limited to such a configuration, and the self-driving vehicle 1B may include a communication part which receives sensing information acquired by other vehicle via wireless communication. Other vehicle may acquire an own position, an own speed, an own acceleration, and an own advancing direction relative to the self-driving vehicle 1B, and may transmit such data to the self-driving vehicle 1B. The method of acquiring the position, the speed, the acceleration, and the advancing direction of other vehicle is exemplified merely as an example, and is not intended to limit this disclosure.

In this embodiment 3, the sensing information acquisition part 101B acquires a position, a speed, an acceleration and an advancing direction of other vehicle. However, this disclosure is not particularly limited to such a configuration, and the sensing information acquisition part 101B may acquire a position, a speed, an acceleration and an advancing direction of a human or an animal walking or running near the self-driving vehicle 1B. An object to be subjected to data acquisition is, typically, other vehicle. However, other vehicle is exemplified merely as an example, and is not intended to limit this disclosure.

In this embodiment 3, the sensing information acquisition part 101B acquires a position, a speed, an acceleration and an advancing direction of an object. However, the sensing information acquisition part 101B may acquire a sound generated by an object. For example, the sensor 11B includes a microphone, and the sensing information acquisition part 101B acquires a sound by the sensor 11B. The traveling obstruction determination part 102B determines whether or not the self-driving vehicle 1B obstructs traveling of other vehicle based on a sound acquired by the sensing information acquisition part 101B. Specifically, the traveling obstruction determination part 102B determines whether or not the acquired sound is an alarm sound of a horn or an outcry of a human.

Here, processing in step S401 may be executed during a period where the self-driving vehicle 1B is stopped, during a period where the self-driving vehicle 1B advances slowly, or during a period where the self-driving vehicle 1B travels. A typical situation where processing in step S401 is executed is a situation where the self-driving vehicle 1B is stopped. However, the above-mentioned situation is not intended to limit this disclosure.

Next, the traveling obstruction determination part 102B detects a change amount of a speed, a change amount of an acceleration, and a change amount of an angle of an advancing direction of other vehicle by analyzing the sensing information (a position, a speed, an acceleration, and an advancing direction of other vehicle) acquired by the sensing information acquisition part 101B (step S402).

The traveling obstruction determination part 102B can detect a fact that other vehicle is decelerated or is stopped by detecting a change amount of a speed of other vehicle. Further, the traveling obstruction determination part 102B can detect a fact that other vehicle is stopped suddenly by detecting a change amount of an acceleration of other vehicle. The traveling obstruction determination part 102B also can detect a fact that other vehicle changes an advancing path thereof by detecting a change amount of an angle of an advancing direction of other vehicle. In this manner, there is a high probability that a deceleration, stopping, sudden stopping, and changing of an advancing path of other vehicle become operations for allowing other vehicle to avoid the self-driving vehicle 1B which obstructs traveling of other vehicle. Accordingly, when other vehicle performs a deceleration, stopping, sudden stopping, or changing of an advancing path, the self-driving vehicle 1B starts to move.

Next, the traveling obstruction determination part 102B acquires predetermined threshold values from the memory part 122B, and determines whether or not at least one of a change amount of a speed, a change amount of an acceleration, and a change amount of an angle of an advancing direction of other vehicle is equal to or more than a predetermined threshold value (step S403).

In this stage of processing, when the traveling obstruction determination part 102B determines that at least one of a change amount of a speed, a change amount of an acceleration and a change amount of an angle of an advancing direction of other vehicle is equal to or more than a predetermined threshold value (YES in step S403), the movement request generation part 103 generates a movement request for starting movement of the self-driving vehicle 1B (step S404). The movement request generation part 103 outputs the generated movement request to the movement control part 13. The movement control part 13 which receives the movement request performs a movement control for starting the movement of the self-driving vehicle 1B, and allows the drive part 14 to start movement of the self-driving vehicle 1B. Then, processing returns to step S401.

The movement request generation part 103 may decide a specified destination such as other place on a road, a parking place or a garage at the time of starting movement of the self-driving vehicle 1B, and may move the self-driving vehicle 1B to the decided destination. Alternatively, the movement request generation part 103 may generate a movement request by which the self-driving vehicle 1B continues slow moving or traveling on a road without deciding a specified destination at the time of starting movement of the self-driving vehicle 1B. Still alternatively, the movement request generation part 103 may decide a route along which the self-driving vehicle 1B travels and may generate a movement request by which the self-driving vehicle 1B continues traveling on the decided route at the time of starting the movement of the self-driving vehicle 1B. These movement controls of the self-driving vehicle 1B are exemplified merely as an example, and are not intended to limit this disclosure.

The movement request generation part 103 performs the movement control, and returns to step S401 after the movement of the self-driving vehicle 1B is started. However, a timing at which processing in step S401 is executed next may be a timing immediately after starting the movement of the self-driving vehicle 1B or may be a timing after the movement of the self-driving vehicle 1B is finished. A timing where processing in step S401 is executed after starting the movement of the self-driving vehicle 1B is exemplified merely as an example, and is not intended to limit this disclosure.

On the other hand, when the traveling obstruction determination part 102B determines that all of a change amount of a speed, a change amount of an acceleration, and a change amount of the angle of an advancing direction of other vehicle are lower than respective predetermined threshold values (NO in step S403), processing returns to step S401.

In this embodiment 3, the description is made by taking a case, as an example, where the traveling obstruction determination part 102B detects a change amount of a speed, a change amount of an acceleration, and a change amount of an angle of an advancing direction of other vehicle based on a position, an acceleration, and an advancing direction of other vehicle which are acquired by the sensor 11B, and the traveling obstruction determination part 102B determines that the self-driving vehicle 1B obstructs traveling of other vehicle when at least one of the change amount of the speed, the change amount of the acceleration, and the change amount of the angle of the advancing direction of other vehicle is equal to or more than the predetermined threshold value. However, the traveling obstruction determination part 102B may detect other determination condition from an image. For example, the traveling obstruction determination part 102B may determine that the self-driving vehicle 1B obstructs traveling of other vehicle when the traveling obstruction determination part 102B detects a preliminarily determined operation such as a deceleration, stopping, changing in an advancing path or the like of other vehicle. Further, the traveling obstruction determination part 102B may determine that the self-driving vehicle 1B obstructs traveling of other vehicle when a speed of other vehicle is equal to or lower than a predetermined threshold value.

In this case, the traveling obstruction determination part 102B determines an operation of other vehicle which travels near the self-driving vehicle 1B as a mode of other vehicle. The sensor 11B may acquire at least one of a position, a speed, an acceleration, and an advancing direction of other vehicle as sensing information. The traveling obstruction determination part 102B determines whether or not other vehicle has performed any one of operations consisting of a deceleration, stopping, and changing in an advancing path. The movement request generation part 103 generates a movement request for moving the self-driving vehicle 1B when the traveling obstruction determination part 102B determines that other vehicle performs any one of operations consisting of a deceleration, stopping, and changing in an advancing path.

In this manner, the traveling obstruction determination part 102B can detect various determination conditions based on image information. However, these determination conditions are exemplified merely as an example, and are not intended to limit this disclosure.

Embodiment 4

In the embodiment 1, the width of the space which allows traveling of other vehicle is detected from the sensing information. On the other hand, in the embodiment 4, a width of a space which allows traveling of other vehicle is detected from map information.

Figure 8:
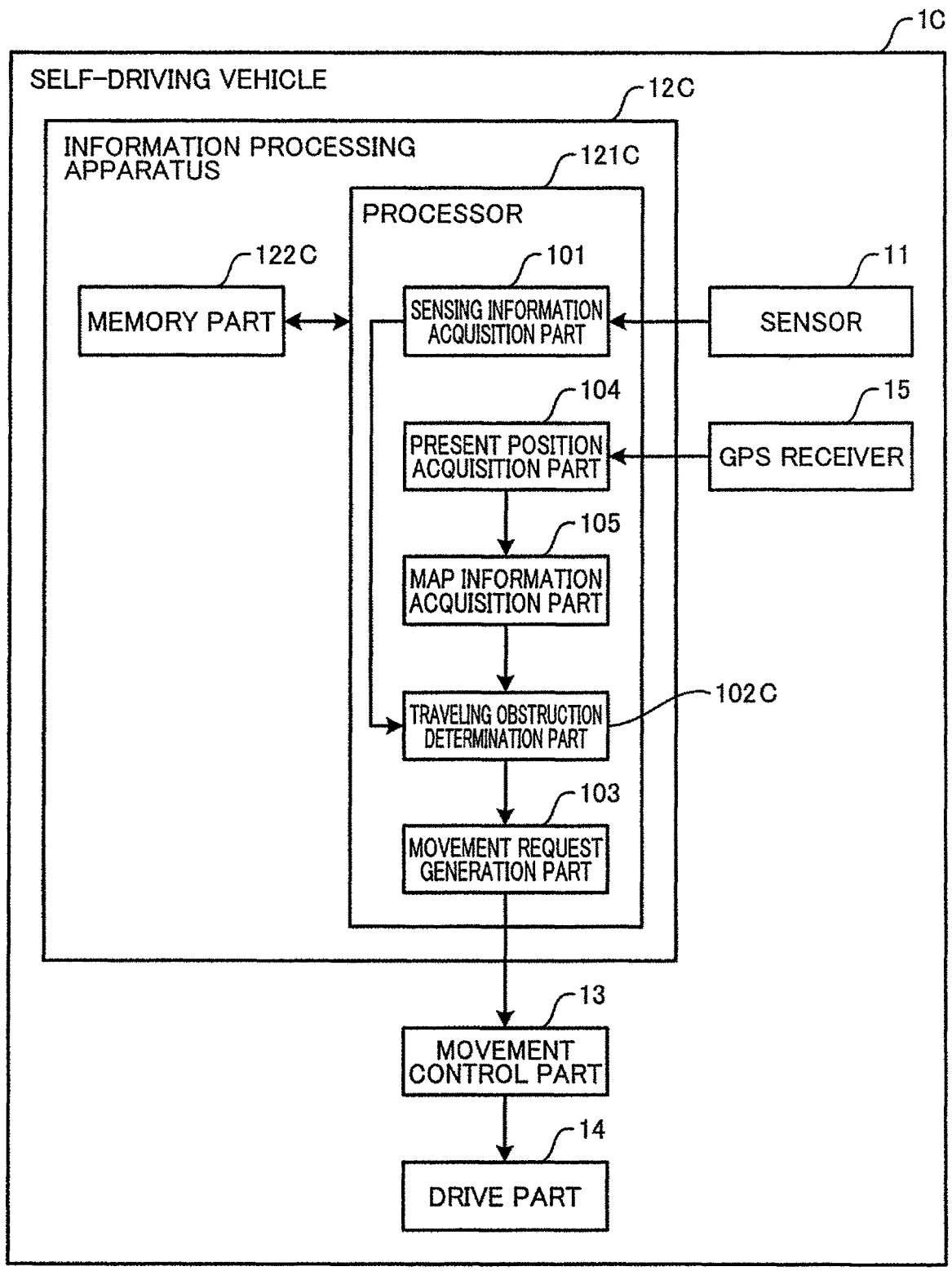
FIG. 8 is a block diagram showing a configuration of a self-driving vehicle according to an embodiment 4 of this disclosure.

FIG. 8 is a block diagram showing a configuration of a self-driving vehicle according to the embodiment 4 of this disclosure. A self-driving vehicle 1C shown in FIG. 8 includes: a sensor 11; an information processing apparatus 12C; a movement control part 13; a drive part 14; and a GPS (Global Positioning System) receiver 15. The information processing apparatus 12C includes a processor 121C, and a memory part 122C. The processor 121C includes a sensing information acquisition part 101, a traveling obstruction determination part 102C, a movement request generation part 103, a present position acquisition part 104, and a map information acquisition part 105. In the self-driving vehicle 1C of the embodiment 4, constitutional elements having functions identical with functions of constitutional elements in the embodiment 1 are given the same symbols, and the description of these constitutional elements is omitted.

The GPS receiver 15 acquires present position information indicative of a present position of the self-driving vehicle 1C. The present position information is expressed by a latitude and a longitude. The GPS receiver 15 outputs the acquired present position information to the present position acquisition part 104.

The present position acquisition part 104 acquires the present position information indicative of the present position of the self-driving vehicle 1C from the GPS receiver 15.

The memory part 122C is a semiconductor memory, for example, and preliminarily stores a predetermined length used in the traveling obstruction determination part 102C at the time of determining whether or not the self-driving vehicle 1C obstructs traveling of other vehicle. The memory part 122C preliminarily stores a width of the self-driving vehicle 1C. The memory part 122C also preliminarily stores map information.

The map information acquisition part 105 acquires map information including the present position of the self-driving vehicle 1C.

The traveling obstruction determination part 102C determines a mode of other vehicle which travels near the self-driving vehicle 1C using sensing information. The traveling obstruction determination part 102C determines whether or not the self-driving vehicle 1C obstructs traveling of other vehicle based on position information around the self-driving vehicle 1C which the sensor 11 acquires and map information which the map information acquisition part 105 acquires.

The traveling obstruction determination part 102C detects a width of a space which allows traveling of other vehicle when other vehicle travels near the self-driving vehicle 1C and a width of other vehicle, and determines the width of other vehicle with respect to the width of the space which allows traveling of other vehicle as a mode of other vehicle. That is, the traveling obstruction determination part 102C determines whether or not a length obtained by subtracting the width of the self-driving vehicle 1C from the width of the space which allows traveling of other vehicle when other vehicle travels near the self-driving vehicle 1C is shorter than the width of other vehicle.

For example, the traveling obstruction determination part 102C may detect a width of a road where other vehicle travels near the self-driving vehicle 1C, a width of the self-driving vehicle 1C, and a width of other vehicle, and may determine the width of other vehicle as a mode of other vehicle. That is, the traveling obstruction determination part 102C determines whether or not a length obtained by subtracting the width of the self-driving vehicle 1C from the width of the road is shorter than the width of other vehicle. The traveling obstruction determination part 102C detects the width of the road using map information and present position information.

Figure 9:
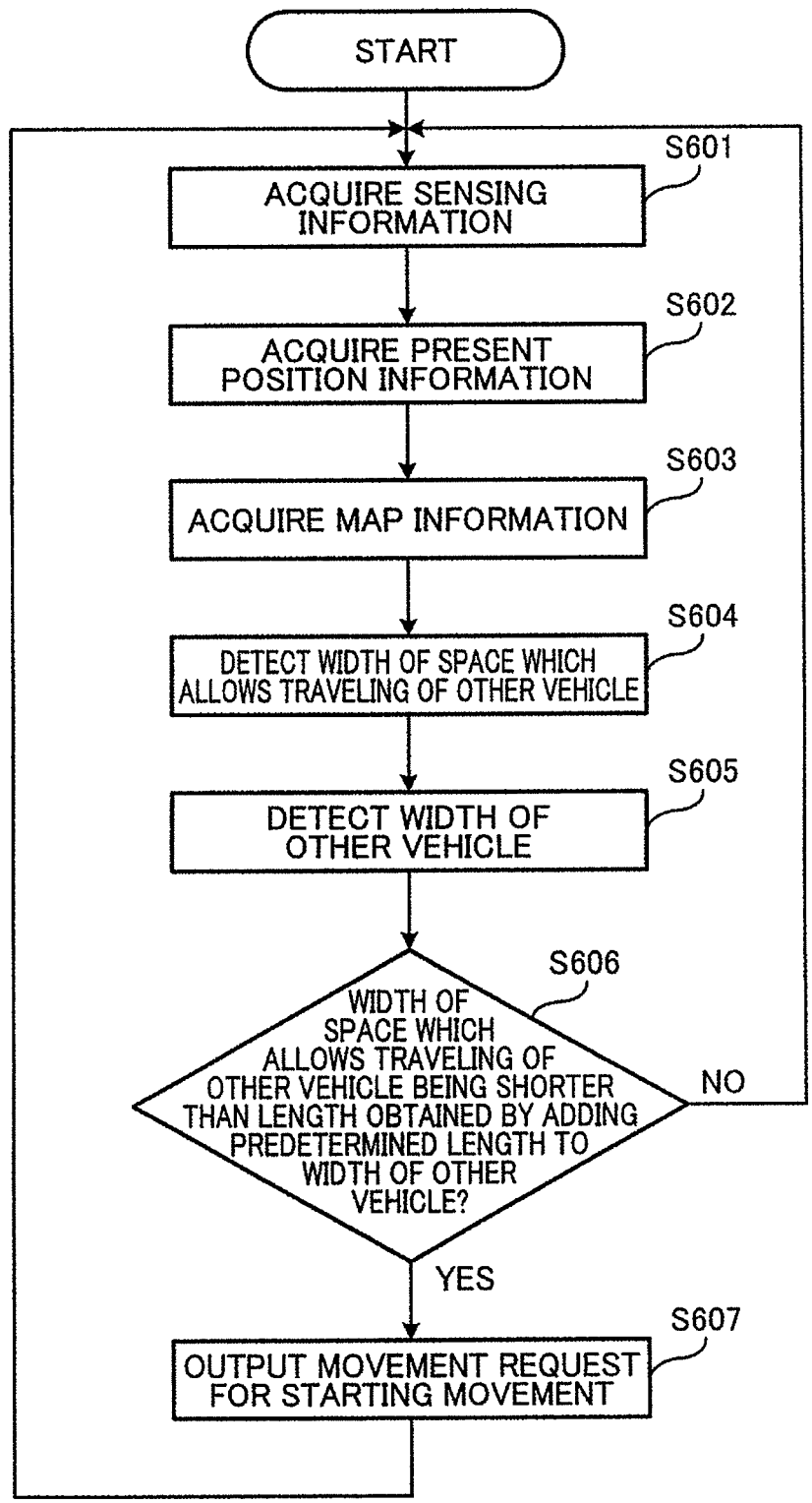
FIG. 9 is a flowchart for describing an operation of a moving control of the self-driving vehicle according to the embodiment 4 of this disclosure.

FIG. 9 is a flowchart for describing the manner of operation of a movement control of the self-driving vehicle according to the embodiment 4 of this disclosure.

First, the sensing information acquisition part 101 of the self-driving vehicle 1C acquires sensing information by the sensor 11 (step S601). The sensor 11 measures position information indicative of a distance from the self-driving vehicle 1C to an object around the self-driving vehicle 1C, and outputs the measured position information to the sensing information acquisition part 101 as sensing information.

In this embodiment 4, the sensor 11 is an LIDAR or a millimeter wave radar, and the sensor 11 measures position information. However, this disclosure is not particularly limited to such a configuration, and the self-driving vehicle 1C may include a communication part which receives sensing information measured by other vehicle via wireless communication.

Further, processing in step S601 may be executed during a period where the self-driving vehicle 1C is stopped, during a period where the self-driving vehicle 1C advances slowly, or during a period where the self-driving vehicle 1C travels. A typical situation where processing in step S601 is executed is a situation where the self-driving vehicle 1C is stopped. However, the above-mentioned situation is not intended to limit this disclosure.

Next, the present position acquisition part 104 acquires present position information indicative of the present position of the self-driving vehicle 1C from the GPS receiver 15 (step S602).

In this embodiment 4, the present position acquisition part 104 acquires present position information from the GPS receiver 15. However, this disclosure is not particularly limited to such a configuration, and the self-driving vehicle 1C may include a communication part which receives present position information from an external device via wireless communication. The external device is other vehicle traveling near the self-driving vehicle 1C, or a wireless communication base station disposed near the self-driving vehicle 1C, for example. The above-mentioned method of acquiring present position information of the self-driving vehicle 1C is exemplified merely as an example, and is not intended to limit this disclosure.

Next, the map information acquisition part 105 acquires map information within a predetermined range including the present position indicated by present position information acquired by the present position acquisition part 104 from the memory part 122C (step S603). For example, the map information acquisition part 105 acquires map information within a radius of 1 km about the present position from the memory part 122C.

In this embodiment 4, the map information acquisition part 105 reads map information preliminarily stored in the memory part 122C. However, this disclosure is not limited to such a configuration, and the map information acquisition part 105 may acquire map information from the outside via wireless communication. The above-mentioned method of acquiring map information is exemplified merely as an example, and is not intended to limit this disclosure.

Next, the traveling obstruction determination part 102C detects a width of a space which allows traveling of other vehicle by analyzing sensing information (position information) acquired by the sensor 11 and map information acquired by the map information acquisition part 105 (step S604).

For example, when the sensor 11 is an LIDAR or a millimeter-wave radar, there may be the case where a part of a space which the sensor 11 recognizes as the space which allows traveling of other vehicle is actually a sidewalk or is other lane where passing of other vehicle is inhibited so that the part of the space is a space where other vehicle cannot travel. Also in such a case, it is understood from map information which the map information acquisition part 105 acquires that a part of a space which the sensor 11 recognizes as the space which allows traveling of other vehicle is a space where other vehicle cannot travel. Accordingly, the traveling obstruction determination part 102C can detect the width of the space which actually allows traveling of other vehicle from sensing information (position information) acquired by the sensor 11 and map information which the map information acquisition part 105 acquires. For example, with respect to a width of the space which allows traveling of other vehicle detected from position information acquired by the sensor 11 and a width of the space which allows traveling of other vehicle detected from map information acquired by the map information acquisition part 105, the traveling obstruction determination part 102C detects the narrower width as the actual width of the space which allows traveling of other vehicle. The above-mentioned method is exemplified as an example of the method of detecting the actual width of the space which allows traveling of other vehicle from position information acquired by the sensor 11 and map information acquired by the map information acquisition part 105, and is not intended to limit this disclosure.

"Space which allows traveling of other vehicle" may be a road or may be a place other than the road. The space which allows traveling of other vehicle indicates a distance from the self-driving vehicle 1C to an object on a side where other vehicle travels as viewed from the self-driving vehicle 1C, for example. Further, the space which allows traveling of other vehicle is, typically, a space obtained by excluding a space occupied due to stopping of the self-driving vehicle 1C from a space in a width direction on a road where the self-driving vehicle 1C is stopped. Alternatively, the space which allows traveling of other vehicle is a space obtained by excluding a space which is occupied due to stopping of the self-driving vehicle 1C and a space which is occupied due to stopping or traveling of other vehicle from the space in the width direction on the road where the self-driving vehicle 1C is stopped or the like. These spaces which allow traveling of other vehicle are exemplified merely as an example, and are not intended to limit this disclosure.

For example, the traveling obstruction determination part 102C may detect a length obtained by subtracting a width of the self-driving vehicle 1C from a width of a road where the self-driving vehicle 1C is stopped as a width of a space which allows traveling of other vehicle. Further, the width of the self-driving vehicle 1C is preliminarily stored in the memory part 122C. Accordingly, the traveling obstruction determination part 102C reads the width of the self-driving vehicle 1C from the memory part 122C.

In this case, sensing information includes position information indicative of a distance from the self-driving vehicle 1C to an object around the self-driving vehicle 1C. Accordingly, the traveling obstruction determination part 102C calculates a distance obtained by adding a distance from the self-driving vehicle 1C to an object on a right side of the self-driving vehicle 1C to a distance from the self-driving vehicle 1C to an object on a left side of the self-driving vehicle 1C as a width of a road, and detects a length obtained by subtracting a width of the self-driving vehicle 1C from the calculated road width as a first width of a space which allows traveling of other vehicle.

Map information includes a width of a road where the self-driving vehicle 1C is stopped. Accordingly, traveling obstruction determination part 102C specifies a width of a road where the self-driving vehicle 1C is stopped from map information, and detects a length obtained by subtracting the width of the self-driving vehicle 1C from the specified width of the road as a second width of a space which allows traveling of other vehicle.

Then, the traveling obstruction determination part 102C determines the narrower width out of the detected first width and the detected second width as the actual width of the space which allows traveling of other vehicle.

In this embodiment 4, the traveling obstruction determination part 102C detects a width of a space which allows traveling of other vehicle by using sensing information (position information) acquired by the sensor 11 and map information acquired by the map information acquisition part 105. However, this disclosure is not limited to such a configuration, and the traveling obstruction determination part 102C may detect a width of a space which allows traveling of other vehicle using only map information acquired by the map information acquisition part 105.

Next, the traveling obstruction determination part 102C detects a width of other vehicle by analyzing sensing information (position information) acquired by the sensing information acquisition part 101 (step S605).

In this embodiment 4, the traveling obstruction determination part 102C detects a width of other vehicle. However, this disclosure is not particularly limited to such a configuration, and the traveling obstruction determination part 102C may detect a width of a human or an animal walking or running near the self-driving vehicle 1C. Although an object to be detected is, typically, other vehicle, such a configuration is exemplified merely as one example, and is not intended to limit this disclosure. Further, the traveling obstruction determination part 102C may detect a distance from the self-driving vehicle 1C to an edge of a road where the self-driving vehicle 1C is positioned and a width of other vehicle. That is, the traveling obstruction determination part 102C may detect a distance from the self-driving vehicle 1C to the edge of the road where the self-driving vehicle 1C is positioned as a width of a space which allows traveling of other vehicle.

Next, the traveling obstruction determination part 102C acquires a predetermined length from the memory part 122C, and determines whether or not a width of a space which allows traveling of other vehicle is shorter than a length obtained by adding the predetermined length to the width of other vehicle (step S606). The traveling obstruction determination part 102C may compare the above-mentioned distance from the self-driving vehicle 1C to the edge of the road and the width of other vehicle with each other.

When the traveling obstruction determination part 102C determines that the width of the space which allows traveling of other vehicle is shorter than the length obtained by adding the predetermined length to the width of other vehicle (YES in step S606), the movement request generation part 103 generates a movement request for starting movement of the self-driving vehicle 1C (step S607). The movement request generation part 103 outputs the generated movement request to the movement control part 13. The movement control part 13 which receives the movement request performs a movement control for starting movement of the self-driving vehicle 1C thus allowing the drive part 14 to start movement of the self-driving vehicle 1C. Then, processing returns to step S601.

The movement request generation part 103 may decide a specified destination such as other place on a road, a parking place, or a garage at the time of starting movement of the self-driving vehicle 1C, and may move the self-driving vehicle 1C to the decided destination. Alternatively, the movement request generation part 103 may generate a movement request by which the self-driving vehicle 1C continues slow moving or traveling on a road without deciding a specified destination at the time of starting movement of the self-driving vehicle 1C. Still alternatively, the movement request generation part 103 may decide a route along which the self-driving vehicle 1C travels and may generate a movement request by which the self-driving vehicle 1C continues traveling on the decided route at the time of starting the movement of the self-driving vehicle 1C.

These movement controls of the self-driving vehicle 1C are exemplified merely as an example, and are not intended to limit this disclosure.

The movement request generation part 103 performs the movement control so that the movement of the self-driving vehicle 1C is started and, thereafter, processing returns to step S601. However, a timing at which processing in step S601 is executed next may be a timing immediately after starting the movement of the self-driving vehicle 1C or may be a timing after the movement of the self-driving vehicle 1C is finished. A timing where processing in step S601 is executed after starting the movement of the self-driving vehicle 1C is one example, and is not intended to limit this disclosure.

On the other hand, when the traveling obstruction determination part 102C determines that a width of the space which allows traveling of other vehicle is larger than a length obtained by adding the predetermined length to a width of other vehicle (NO in step S606), processing returns to step S601.

Processing performed by the traveling obstruction determination part 102 may use machine learning. As machine learning, for example, supervised learning, unsupervised learning, semi-supervised learning, reinforcement learning and the like are named. In the supervised learning, a relationship between an input and an output is learned using supervised data to which a label (output information) is given in response to input information. In the unsupervised learning, the structure of data is constructed based on only unlabeled input. In the semi-supervised learning, both a labeled input and an unlabeled input are treated. In the reinforcement learning, a feedback (reward) is obtained for a behavior selected from an observation result of a state, and continuous behaviors by which the largest reward can be obtained are learned. As a specific technique of machine learning, a neural network (including deep learning which uses a multilayered neural network), genetic programming, a decision tree, a Bayesian network, a support vector machine (SVM) are known. In this disclosure, any one of the above-mentioned specific examples may be used.

(Finding which Forms Basis of this Disclosure)

Conventionally, there has been known a technique which detects probability of a traffic jam based on sensing information which vehicles collect (see JP 2015-18396 A, for example).

In JP 2015-18396 A, vehicle mounted equipment mounted on each vehicle acquires a limit speed by recognizing a speed limiting pattern from an imaged road, and transmits a differential between the acquired limit speed and a present vehicle speed of an own vehicle and a present position of the own vehicle to a server. Then, the server grasps probability of a traffic jam based on the differential of the vehicle speed received from each vehicle, detects a traffic jam when a low speed state continues for a fixed time, identifies a traffic jam zone of the road based on the position of the vehicle and a road map, and notifies the traffic jam zone to each vehicle or instructs changing of a route to each vehicle.

However, in the above-mentioned prior art, there is a concern that a moving body which moved for avoiding a traffic jam obstructs traveling of other moving body at the moved place and hence, the prior art still has room for improvement.

A technique which offers a predetermined service to a user inside or outside an automobile has been proposed. For example, a service which enables viewing of a visual content in the automobile is offered to a user. Further, for example, a home visiting care service is provided to a care receiver (user) where an automobile in which a care giver rides travels to a home of a care receiver having no parking place, and the care giver who gets off the automobile performs a home visiting care at the home of the care receiver. In such a service, the service is provided to the user in a state where the automobile is in a standby state. In such a case, there is a concern that the automobile in a standby state obstructs traveling of other vehicle.

FIG. 1 is a view for describing an example where a user receives a predetermined service in a self-driving vehicle.

In FIG. 1, the user is receiving the predetermined service in the self-driving vehicle 201, and the self-driving vehicle 201 is stopped on a road 203. A width of the road 203 is just a length which allows two vehicles to travel side by side. On the road 203, when other vehicle 202 which approaches from behind the self-driving vehicle 201 passes the self-driving vehicle 201, it is necessary for other vehicle 202 to decrease a speed and to change an advancing direction just behind the self-driving vehicle 201 in a stopped state, and to pass near the self-driving vehicle 201 in a stopped state at a low speed. In this manner, there is a case that the self-driving vehicle 201 in a stopped state for offering the service obstructs traveling of other vehicle 202.

In the above-mentioned prior art, there has been disclosed a technique which detects a probability of the occurrence of traffic jam based on sensing information which a vehicle collects.

However, in the technique which has been disclosed in the above-mentioned prior art, although it is possible to estimate a probability of the occurrence of traffic jam, it is difficult to detect whether or not the traffic jam actually occurs. Accordingly, there is a concern that a moving body which moves to a standby position obstructs traveling of other moving body at the standby position.

To overcome the above-mentioned drawbacks, an information processing method according to an aspect of this disclosure includes causing the computer to perform operations of: acquiring respective determination results where a mode of other moving body passing near one or more first moving bodies is determined based on respective sensing information indicative of the situation outside the one or more first moving bodies which the sensors mounted on the one or more first moving bodies and used for detecting the objects output; acquiring respective moving body position information indicative of positions of the one or more first moving bodies; acquiring reference position information indicative of a reference position with respect to a second moving body which differs from the one or more first moving bodies; deciding a second position at which the second moving body is made to stand by in response to a first position specified using the respective determination results and the respective moving body position information and the reference position indicated by the reference position information; and outputting a movement request for moving the second moving body to the second position to the second moving body.

With such a configuration, the second position at which the second moving body is made to stand by is determined in response to the first position specified using the respective determination results where a mode of other moving body which travels near the one or more first moving bodies and the respective moving body position information indicative of positions of the one or more first moving bodies, and the reference position. In such decision of the second position, among the positions where the one or more first moving bodies are present, the position which does not obstruct traveling of the other moving body or the position which least obstructs such traveling of other moving body can be determined as the second position at which the second moving body is made to stand by. Accordingly, it is possible to prevent the moving body moved to the second position from obstructing traveling of other moving body at the second position.

In the above-mentioned information processing method may further include acquiring the sensing information from the one or more first moving bodies respectively, and determining a mode of other moving body by using the respective sensing information.

The computer having such a configuration can acquire the sensing information from one or more first moving bodies respectively, and can determine a mode of other moving body using the respective sensing information.

In the above-mentioned information processing method, the determination results may be determination results as to whether or not the first moving body obstructs traveling of other moving body. The first position may include a third position which is decided based on the respective determination results, and at which the first moving body obstructs traveling of other moving body out of the positions which the respective moving body position information indicate. The decision of the second position may be performed such that the position which is a position other than the third position and falls within a predetermined range from the reference position may be decided as the second position.

With such a configuration, the position other than the third position at which the first moving body obstructs traveling of other moving body and falls within a predetermined range from the reference position is decided as the second position where the second moving body is made to stand by. Accordingly, the second moving body can be made to standby at the position at which the first moving body does not obstruct traveling of the other moving body and falls within the predetermined range from the reference position.

In the above-mentioned information processing method, the determination results may be determination results as to whether or not the first moving body obstructs traveling of other moving body. The first position may include a fourth position which is decided based on the respective determination results, and at which the first moving body dose not obstruct traveling of other moving body out of the positions which the respective moving body position information indicate. The decision of the second position may be performed such that the position which is the fourth position and falls within a predetermined range from the reference position may be decided as the second position.

With such a configuration, the position which is the fourth position at which the first moving body does not obstruct traveling of other moving body and falls within a predetermined range from the reference position is decided as the second position where the second moving body is made to stand by. Accordingly, the second moving body can be made to standby at the position at which the first moving body does not obstruct traveling of the other moving body and falls within the predetermined range from the reference position.

The above-mentioned information processing method may further include acquiring a time necessary for the second moving body to reach the reference position. The predetermined range may be a range which allows the second moving body to move from the second position to the reference position within the time necessary for arrival or a range which allows the second moving body to move from a present position of the second moving body to the reference position via the second position within the time necessary for arrival.

With such a configuration, it is possible to make the second moving body standby within the range which allows the second moving body to move from the second position to the reference position within the time necessary for arrival or the range which allows the second moving body to move from the present position of the second moving body to the reference position via the second position within the time necessary for arrival.

In the above-mentioned information processing method, in deciding the second position, the position which the moving body position information indicates may be specified as the first position based on a degree that the first moving body obstructs traveling of other moving body.

With such a configuration, the position which the moving body position information indicates is specified as the first position based on a degree that the first moving body obstructs traveling of other moving body and hence, the degree that the first moving body obstructs traveling of other moving body can be indicated by a numerical value and hence, it is possible to easily identify the position where the traveling of other moving body is least obstructed by the first moving body.

In the above-mentioned information processing method, the decision of the second position may be performed based on the number of moving bodies existing within a predetermined range from the position which the moving body position information indicates.

With such a configuration, the second position can be decided based on the number of moving bodies existing within the predetermined range from the position which the moving body position information indicates. Accordingly, it is possible to prevent the occurrence of a state where the plurality of moving bodies gather near a standby position and the plurality of moving bodies obstruct other moving body.

In the above-mentioned information processing method, in deciding the second position, the second position may be decided corresponding to the past first position which is specified using the respective past determination results and the past respective moving body position information, the first position, and the reference position.

With such a configuration, the second position which is more optimal for making the second moving body standby can be decided corresponding to not only the present first position specified using the respective present determination results and the respective present moving body position information but also the past first position specified using the respective past determination results and the respective past moving body position information.

The information processing apparatus according to another aspect of this disclosure includes a determination result acquisition part which acquires respective determination results where a mode of other moving body passing near one or more first moving bodies is determined based on respective sensing information indicative of the situation outside the one or more first moving bodies which the sensors mounted on the one or more first moving bodies and used for detecting the objects outputs, a moving body position information acquisition part which acquires respective moving body position information indicative of positions of the one or more first moving bodies, a reference position information acquisition part which acquires reference position information indicative of a reference position with respect to a second moving body which differs from the one or more first moving bodies, a decision part which decides a second position at which the second moving body is made to stand by in response to a first position specified using the respective determination results and the respective moving body position information and the reference position which the reference position information indicates, and an output part which outputs a movement request for moving the second moving body to the second position to the second moving body.

With such a configuration, the second position at which the second moving body is made to stand by is determined in response to the first position specified using the respective determination results where a mode of other moving body which travels near the one or more first moving bodies and the respective moving body position information indicative of positions of the one or more first moving bodies, and the reference position. In such decision of the second position, among the positions where the one or more first moving bodies are present, the position which does not obstruct traveling of the other moving body or the position which least obstructs such traveling of other moving body can be determined as the second position at which the second moving body is made to stand by. Accordingly, it is possible to prevent the moving body moved to the second position from obstructing traveling of other moving body at the second position.

All embodiments described hereinafter describe one specific example of this disclosure. Numerical values, shapes, constitutional elements, steps, orders of steps and the like described in the following embodiments form one example, and do not intend to limit this disclosure. Further, among constitutional elements of the following embodiments, the constitutional elements which are not described in independent claims which describe an uppermost concept are described as arbitrary constitutional elements. Further, respective contents of all embodiments can be combined with each other.

Embodiment 5

Hereinafter, the whole configuration and the whole operation of an automobile control system according to an embodiment 5 of this disclosure are described in detail.

Figure 10:
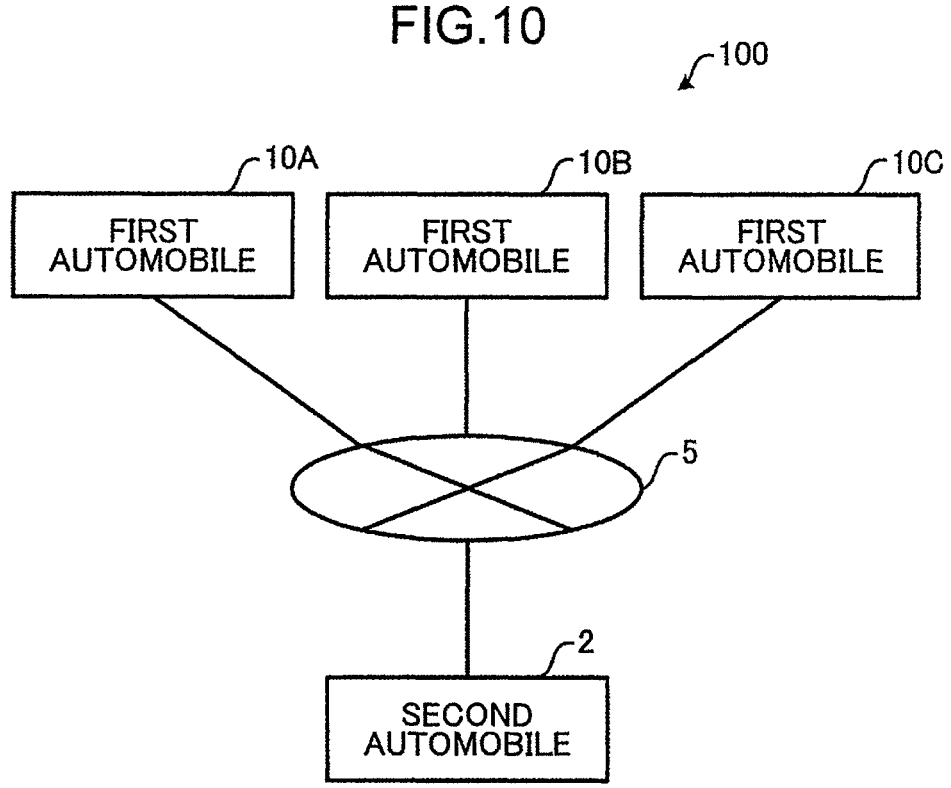
FIG. 10 is a view showing a whole configuration of an automobile control system according to an embodiment 5 of this disclosure.

FIG. 10 is a block diagram showing a configuration of the automobile control system according to the embodiment 5 of this disclosure.

An automobile control system 100 shown in FIG. 10 includes first automobiles 10A, 10B, 10C and a second automobile 2. The second automobile 2 is connected with the first automobiles 10A, 10B, 10C in a communicable manner via a network 5. The network 5 is an internet, for example.

A sensor used for detecting an object is mounted on the respective first automobiles 10A, 10B, 10C. The first automobiles 10A, 10B, 10C respectively transmit a determination result obtained by determining a mode of other vehicle passing near the first automobiles 10A, 10B, 10C to the second automobile 2 using respective sensing information indicative of situations of the outside of the first automobiles 10A, 10B, 10C which the respective sensors output. On the other hand, the first automobiles 10A, 10B, 10C respectively transmit vehicle position information (moving body position information) indicative of the positions of the first automobiles 10A, 10B, 10C to the second automobile 2.

The second automobile 2 offers a predetermined service to a user. The predetermined service is a service which enables a user to view a visual content in the second automobile 2, for example.

The second automobile 2 acquires the determination results obtained by determining a mode of other vehicle passing near the first automobiles 10A, 10B, 10C respectively, acquires vehicle position information indicative of the positions of the first automobiles 10A, 10B, 10C respectively, and acquires reference position information indicative of the reference position of the second automobile 2. The reference position is the destination of the second automobile 2. The second automobile 2 decides the second position where the second automobile 2 is made to stand by corresponding to the first position specified using the respective determination results and the respective moving body position information and the reference position which the reference position information indicates. The second automobile 2 also generates a movement request for moving the second automobile 2 to the second position.

In this embodiment 5, the automobile control system 100 includes three first automobiles 10A, 10B, 10C. However, this disclosure is not particularly limited to such a configuration. The automobile control system 100 may include two or less first automobiles, or may include four or more first automobiles.

The first automobiles 10A, 10B, 10C and the second automobile 2 may be driven by a human, or may be self-driving vehicles which are not driven by a human.

Figure 11:
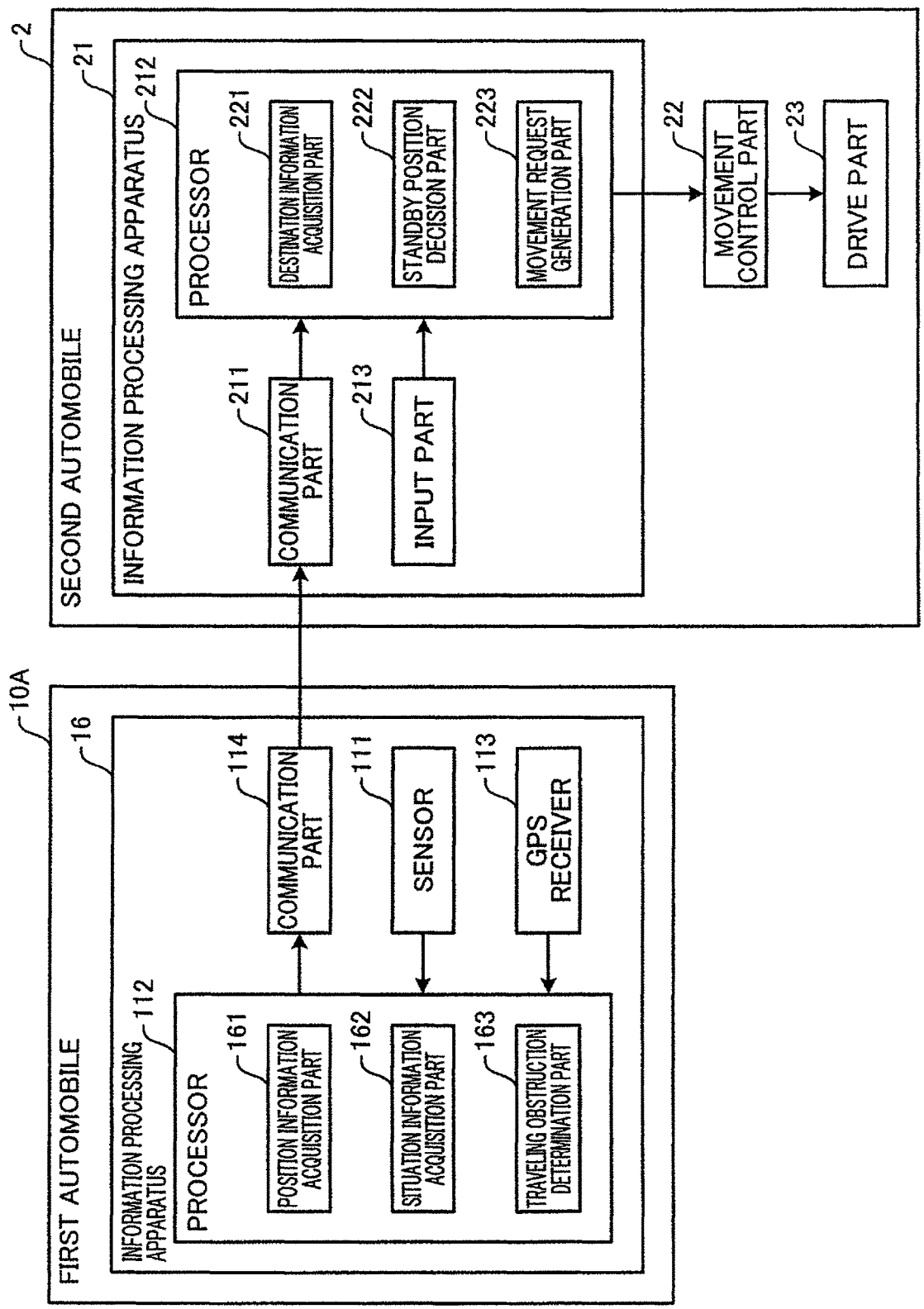
FIG. 11 is a block diagram showing configurations of a first automobile and a second automobile according to the embodiment 5 of this disclosure.

FIG. 11 is a block diagram showing a configuration of the first automobile and the second automobile according to the embodiment 5 of this disclosure.

As shown in FIG. 11, the first automobile 10A includes an information processing apparatus 16. The information processing apparatus 16 includes a sensor 111, a processor 112, a GPS (Global Positioning System) receiver 113, and a communication part 114. The processor 112 includes a position information acquisition part 161, a situation information acquisition part 162, and a traveling obstruction detection part 163. The configurations of the first automobiles 10B, 10C are equal to the configuration of the first automobile 10A.

The GPS receiver 113 acquires vehicle position information indicative of the present vehicle position of the first automobile 10A. The vehicle position information is expressed by latitude and longitude. The GPS receiver 113 outputs the acquired vehicle position information to the position information acquisition part 161.

The position information acquisition part 161 acquires vehicle position information indicative of the present vehicle position of the first automobile 10A from the GPS receiver 113.

The sensor 111 detects an object around the first automobile 10A. The sensor 111 is an image sensor, for example, and acquires image information around the first automobile 10A. The sensor 111 outputs situation information (sensing information) indicative of a situation outside the first automobile 10A to the situation information acquisition part 162.

The situation information acquisition part 162 acquires situation information (sensing information) indicative of the situation outside the first automobile 10A at the present position of the first automobile 10A acquired by the position information acquisition part 161 by the sensor 111.

The situation information may be: an image around the first automobile 10A; the number of vehicles being stopped near the first automobile 10A; a volume of traffic on a road where the first automobile 10A exists; the number of lanes on the road where the first automobile 10A exists; a width of a space which allows traveling of other vehicle which passes near the first automobile 10A; a width of other vehicle passing near the first automobile 10A; a position of other vehicle passing near the first automobile 10A; a speed of other vehicle passing near the first automobile 10A; an acceleration of other vehicle traveling near the first automobile 10A; an advancing direction of other vehicle passing near the first automobile 10A or the like. However, these information are exemplified merely as an example, and are not intended to limit this disclosure.

"A volume of traffic" indicates the number of vehicles, humans, automobiles, bicycles, and motorcycles moving near the first automobile 10A, for example.

"Space which allows traveling of other vehicle" may be a road or may be a place other than the road. The space which allows traveling of other vehicle is typically: a space obtained by excluding a space where the first automobile 10A is being stopped from a space in a width direction on a road where the first automobile 10A is being stopped; a space obtained by excluding a space where the first automobile 10A is being stopped and a space where other vehicle is being stopped or is traveling from the space in the width direction on the road where the first automobile 10A is being stopped or the like. Accordingly, a width of the space which allows traveling of other vehicle indicates a length obtained by subtracting a length of the first automobile 10A in a width direction from a length of a road where the first automobile 10A is being stopped in a width direction, for example. These spaces which allow traveling of other vehicle are exemplified merely as an example, and are not intended to limit this disclosure.

In this embodiment 5, the situation information acquisition part 162 acquires a width of other vehicle. However, this disclosure is not particularly limited to such a configuration. The situation information acquisition part 162 may acquire a width of human or an animal passing near the first automobile 10A. Although an object to be subjected to information acquisition is other vehicle, typically, other vehicle is exemplified merely as an example, and is not intended to limit this disclosure.

The traveling obstruction detection part 163 determines a mode of other vehicle passing near the first automobile 10A using situation information (sensing information). Specifically, the traveling obstruction detection part 163 determines whether or not the first automobile 10A obstructs traveling of other vehicle based on situation information around the first automobile 10A acquired by the situation information acquisition part 162. For example, the traveling obstruction detection part 163 detects traveling obstruction information relating to whether or not the first automobile 10A obstructs traveling of other vehicle based on situation information acquired by the situation information acquisition part 162.

The traveling obstruction information is the presence or non-presence of traveling obstruction, the number of times of occurrences of traveling obstruction, a time interval from a point of time that the traveling obstruction occurs last time to a present time, an average of time intervals where traveling obstruction does not occur or the like. However, these information are exemplified merely as an example, and are not intended to limit this disclosure. When traveling obstruction information includes information generated by making use of the past history such as the number of times of occurrence of traveling obstruction, a time interval from a point of time that the traveling obstruction occurs last time to a present time, an average of time intervals where traveling obstruction does not occur, it is necessary for the information processing apparatus 16 to have a memory part for storing the past history. When the traveling obstruction information includes information generated by making use of a time such as a time interval from a point of time that the traveling obstruction occurs last time to a present time, an average of time intervals where traveling obstruction does not occur, it is necessary for the traveling obstruction detection part 163 to have a function of acquiring points of times.

In this embodiment 5, it is not always necessary for the traveling obstruction detection part 163 to perform such a determination when other vehicle passes near the first automobile 10A, and the traveling obstruction detection part 163 may perform the determination when other vehicle attempts to pass near the first automobile 10A. Further, in this embodiment 5, the traveling obstruction detection part 163 may determine a mode of other vehicle passing near a side surface of the first automobile 10A using situation information. "Other vehicle passing near a side surface of the first automobile 10A" means that other vehicle passes near the side surface of the first automobile 10A in a state where a distance between the side surface of the first automobile 10A and other vehicle is set equal to or less than a predetermined distance.

The communication part 114 transmits vehicle position information acquired by the position information acquisition part 161, situation information acquired by the situation information acquisition part 162, and traveling obstruction information detected by the traveling obstruction detection part 163 to the second automobile 2.

The second automobile 2 includes an information processing apparatus 21, a movement control part 22, and a drive part 23. The information processing apparatus 21 includes a communication part 211, a processor 212, and an input part 213. The processor 212 includes a destination information acquisition part 221, a standby position decision part 222, and a movement request generation part 223.

The input part 213 is a touch panel, for example, and receives inputting of a destination of the second automobile 2 and a point of time at which the second automobile 2 arrives at the destination by a user. The input part 213 displays an input column for receiving inputting of an address of the destination, for example. Further, the input part 213 may display the map and receive the selection of destination on the map made by a user, for example.

The destination information acquisition part 221 acquires destination information indicative of a destination position and an arrival time of the second automobile 2 at the destination inputted by the input part 213. The destination position is one example of a reference position with respect to the second automobile 2.

The communication part 211 receives vehicle position information, situation information and traveling obstruction information transmitted by the communication part 114 of the first automobile 10A, 10B, 10C. The communication part 211 receives respective situation information (respective sensing information) indicative of situations of the outside of the first automobiles 10A, 10B, 10C which the sensors 111 mounted on the first automobiles 10A, 10B, 10C and used for detecting an object output. The communication part 211 receives respective traveling obstruction information (respective determination results) where a mode of other vehicle passing near the first automobiles 10A, 10B, 10C is determined using situation information (sensing information) indicative of the situation outside the first automobiles 10A, 10B, 10C which the sensors 111 mounted on the first automobiles 10A, 10B, 10C and used for detecting an object output. Further, the communication part 211 receives respective vehicle position information (respective moving body position information) indicative of positions of the first automobiles 10A, 10B, 10C. The traveling obstruction information (determination results) include determination result as to whether or not the first automobiles obstruct traveling of other vehicle.

The information processing apparatus 21 may include the traveling obstruction detection part 163. In this case, the traveling obstruction detection part 163 of the information processing apparatus 21 may acquire traveling obstruction information by determining a mode of other vehicle using respective situation information received by the communication part 211.

The standby position decision part 222 decides the standby position (the second position) at which the second automobile 2 is made to stand by corresponding to the specified position (first position) which is specified using respective traveling obstruction information (respective determination results) and respective vehicle position information (respective moving body position information) and the destination position which destination information (reference position information) indicates.

That is, the standby position decision part 222 specifies the specified position using the respective traveling obstruction information and the respective vehicle position information. In such processing, the traveling obstruction information includes the determination results whether or not the first automobile obstructs traveling of other vehicle. The standby position decision part 222 specifies the position where the first automobile obstructs traveling of other moving body (third position) out of the positions indicated by respective vehicle position information decided based on respective traveling obstruction information, and decides the position which is other than the position where first automobile obstructs traveling of other moving body (third position) and is disposed within a predetermined range from the destination position as the standby position.

The standby position decision part 222 may specify the position where the first automobile does not obstruct traveling of other moving body (fourth position) out of the positions which respective vehicle position information decided based on the respective traveling obstruction information indicate, and may decide the position (fourth position) at which the first automobile does not obstruct traveling of other moving body and which falls within a predetermined range from the destination position as the standby position.

The standby position decision part 222 acquires a time necessary for the second automobile 2 to reach the destination position. The predetermined range is a range which allows the second automobile 2 to move from the standby position to the destination position within the time necessary for arrival or a range which allows the second automobile 2 to move from the present position of the second automobile 2 to the destination position via the standby position within the time necessary for arrival. Alternatively, the predetermined range may be a range equal to or less than a predetermined distance.

The standby position decision part 222 may specify the position which the vehicle position information indicates as the specified position (first position) based on a degree that the first automobile obstructs traveling of other vehicle.

The standby position decision part 222 may decide the standby position (the second position) based on the number of vehicles (moving bodies) existing within a predetermined range from the position which the vehicle position information (moving body position information) indicates. That is, the standby position decision part 222 may decide the position where the number of vehicles existing within a predetermined range from the position which the vehicle position information indicates is equal to or less than the predetermined number as the standby position. Alternatively, the standby position decision part 222 may decide the position other than the positions where the number of vehicles existing within a predetermined range from the position which the vehicle position information indicates is equal to or more than the predetermined number as the standby position as the standby position. By making such decision, the standby position decision part 222 can prevent the occurrence of a state where a plurality of automobiles gather near the standby position and the plurality of automobiles obstruct other vehicle.

The standby position decision part 222 may decide the positions corresponding to the number of vehicles (moving bodies) existing within a second range from the positions out of the positions other than the specified position (the first position) which are specified using the respective traveling obstruction information (determination results) and the respective vehicle position information (moving body position information) and fall within the first range from the destination position (reference position) as the standby positions (the second positions). The second range is a range which differs from the first range, and the second range may be narrower than the first range. That is, the standby position decision part 222 may decide the position which falls within the second range from the position where the number of vehicles existing in the second range from the position is equal to or less than the predetermined number out of the positions which fall within the first range from the destination position as the standby position. With such decision, the standby position decision part 222 can prevent the occurrence of a state where a plurality of automobiles gather near the standby position and the plurality of automobiles obstruct other vehicle.

The standby position decision part 222 may decide the vehicle position which least obstructs traveling of other vehicle as a standby position based on vehicle position information, situation information, and traveling obstruction information received by the communication part 211 among the vehicle positions existing at the positions which allow the second automobile 2 to reach the destination position acquired by the destination information acquisition part 221 by the arrival time acquired by the destination information acquisition part 221 after other vehicle passes the vehicle position of the first automobile indicated by the vehicle position information received by the communication part 211.

The movement request generation part 223 outputs a movement request for moving the second automobile 2 to a standby position. The movement request generation part 223 generates a movement request for moving the second automobile 2 to the standby position decided by the standby position decision part 222, and outputs the movement request to the movement control part 22.

The movement control part 22 performs a control for moving the second automobile 2 when the movement control part 22 receives a movement request for moving the second automobile 2 from the movement request generation part 223.

The drive part 23 moves the second automobile 2 in accordance with a control by the movement control part 22. In the case where the second automobile 2 is an engine vehicle, the drive part 23 is formed of an engine and a transmission, for example. In the case where the second automobile 2 is an electric automobile (battery vehicle), the drive part 23 is formed of a traveling motor and a transmission, for example. Both the engine and the traveling motor are started and stopped by way of an ignition switch.

Figure 12:
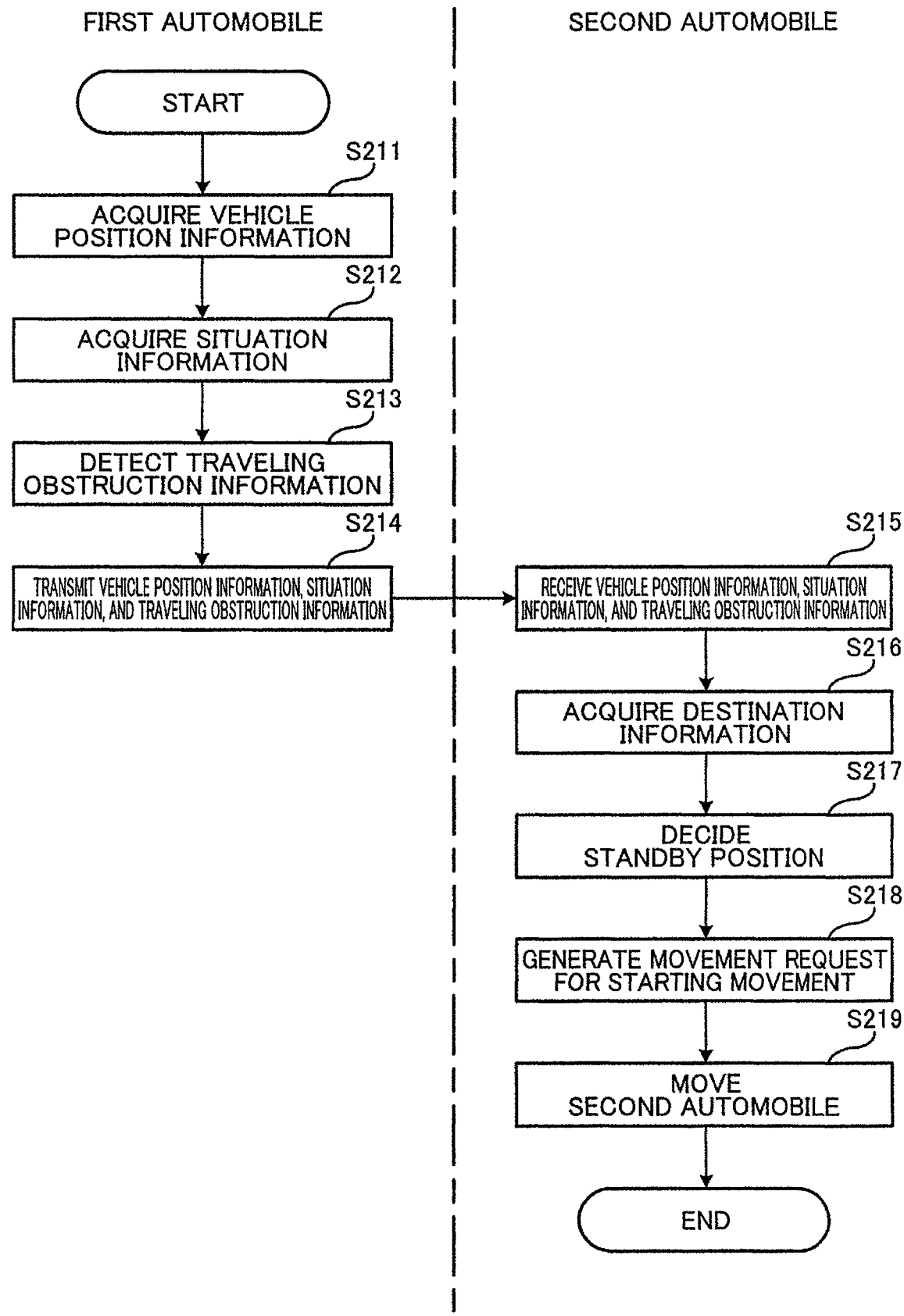
FIG. 12 is a flowchart for describing an operation of a control of an automobile control system according to the embodiment 5 of this disclosure.

FIG. 12 is a flowchart for describing the manner of operation of the control of the automobile control system according to the embodiment 5 of this disclosure. In the description made hereinafter, processing between the first automobile 10A out of the first automobiles 10A, 10B, 10C and the second automobile 2 is described. However, processing between the first automobiles 10B, 10C and the second automobile 2 is also performed in the same manner.

First, the position information acquisition part 161 of the first automobile 10A acquires vehicle position information indicative of the present vehicle position of the first automobile 10A from the GPS receiver 113 (step S211).

In this embodiment 5, the position information acquisition part 161 acquires vehicle position information from the GPS receiver 113. However, this disclosure is not particularly limited to such a configuration, and the communication part 114 may receive position information from an external device via wireless communication. The external device is other vehicle traveling near the first automobile 10A, or a wireless communication base station disposed near the first automobile 10A, for example. The position information acquisition part 161 receives position information indicative of the position where the wireless communication base station is disposed from the wireless communication base station, and acquires position information of the wireless communication base station as position information of the first automobile 10A. The above-mentioned method of acquiring vehicle position information of the first automobile 10A is exemplified merely an example, and is not intended to limit this disclosure.

Then, processing in step S211 may be executed during a period where the first automobile 10A is stopped, during a period where the first automobile 10A advances slowly, or during a period where the first automobile 10A travels. A typical situation where processing in step S211 is executed is a situation where the first automobile 10A is stopped. However, the above-mentioned situation is not intended to limit this disclosure.

Next, the situation information acquisition part 162 acquires situation information at the vehicle position acquired by the position information acquisition part 161 by the sensor 111 (step S212).

The situation information is, for example, an image around the first automobile 10A, the number of vehicles being stopped near the first automobile 10A, a volume of traffic on a road where the first automobile 10A exists, the number of lanes on the road where the first automobile 10A exists, a width of a space which allows traveling of other vehicle which passes near the first automobile 10A, a width of other vehicle, the position of other vehicle, a speed of other vehicle, an acceleration of other vehicle, an advancing direction of other vehicle or the like.

In this embodiment 5, the sensor 111 is an image sensor, and the sensor 111 acquires image information around the first automobile 10A, and generates situation information from the acquired image information. However, this disclosure is not particularly limited to such a configuration, and the communication part 114 may receive situation information generated by an external device via wireless communication. The external device is a monitoring camera disposed on other vehicle or a road, for example, and generates situation information from acquired image information.

Further, the sensor 111 generates the number of vehicles being stopped near the first automobile 10A, a volume of traffic on a road where the first automobile 10A exists, and the number of lanes of the road where the first automobile 10A exists from image information. However, this disclosure is not particularly limited to such a configuration. The communication part 114 may receive the number of vehicles being stopped near the first automobile 10A, and a volume of traffic on the road where the first automobile 10A exists from the outside via wireless communication. The information processing apparatus 16 may include a memory part for preliminarily storing map information, and the situation information acquisition part 162 may acquire the number of lanes on the road where the first automobile 10A exists from map information stored in the memory part. The first automobile 10A may include a car navigation device, and may acquire the number of vehicles being stopped near the first automobile 10A, a volume of traffic on a road where the first automobile 10A exists, and the number of lanes on the road where the first automobile 10A exists from the car navigation device. These specified information acquisition methods are exemplified merely as an example, and are not intended to limit this disclosure.

The sensor 111 estimates the number of stopped vehicles, a volume of traffic, and the number of lanes by recognizing the stopped vehicles, traveling vehicles, and the lanes from an image around the first automobile 10A, for example. However, such estimation method is exemplified merely as an example, and is not intended to limit this disclosure.

The sensor 111 may be an LIDAR (Light Detection and Ranging) or an optical sensor such as a millimeter wave radar, for example. The sensor 111 acquires a width of a space which allows traveling of other vehicle or a width of other vehicle. The LIDAR detects distances to objects around the first automobile 10A and shapes of objects around the first automobile 10A by irradiating an infrared laser beam to the objects and by measuring times from a point of time that an infrared laser beam is irradiated from the LIDAR to a point of time that the infrared laser beam is reflected on the objects and returns to the LIDAR. With such an operation, the first automobile 10A can read the three-dimensional structure of peripheral environment. On the other hand, the millimeter wave radar performs substantially the same measurement as the LIDAR. However, the millimeter wave radar does not use an infrared ray but uses a radio wave, and measures times from a point of time that a radio wave is irradiated from the millimeter wave radar to a point of time that the radio wave is reflected on the objects and returns to the millimeter wave radar. Although the LIDAR which uses infrared rays can be used even at night, the LIDAR has a characteristic that a performance of the LIDAR is lowered in bad weather. Although a millimeter wave radar which uses a radio wave is inferior to the LIDAR in resolution, the millimeter wave radar has a characteristic that the millimeter wave radar can perform detection irrespective of weather. Accordingly, by using both the LIDAR and the millimeter wave radar in combination instead of using the LIDAR or the millimeter wave radar singly, the demerits which the respective sensors have can be compensated.

The sensor 111 may detect a width of a road by recognizing an edge of the road from image information around the first automobile 10A and by recognizing an apparent size of an object which exists near the edge of the road and whose actual size is known (for example, a road sign or the like), for example. Further, the sensor 111 may detect a width of other vehicle by recognizing other vehicle from image information around the first automobile 10A and by recognizing an apparent size of an object which exists near other vehicle and whose size is known (for example, a road sign or the like). The above-mentioned method of detecting a width of a road and a width of other vehicle is exemplified merely as an example, and is not intended to limit this disclosure.

The sensor 111 is an LIDAR or a millimeter-wave radar, for example, and may acquire a position, a speed, an acceleration, and an advancing direction of other vehicle as situation information. The communication part 114 may acquire a position, a speed, an acceleration, and an advancing direction of other vehicle indirectly from other vehicle via wireless communication. Other vehicle may acquire an own position, an own speed, an own acceleration, and an own advancing direction with respect to the first automobile 10A, and may transmit such data to the first automobile 10A. The above-mentioned method of acquiring the position, the speed, the acceleration and the advancing direction of other vehicle is exemplified merely as an example, and is not intended to limit this disclosure.

Next, the traveling obstruction detection part 163 detects traveling obstruction information based on situation information acquired by the situation information acquisition part 162 (step S213).

The traveling obstruction information is the presence or non-presence of traveling obstruction, the number of times of occurrence of traveling obstruction, a time interval from a point of time that the traveling obstruction occurs last time to a present time, an average of time intervals where traveling obstruction does not occur or the like, for example.

The traveling obstruction detection part 163 may determine whether or not a length obtained by subtracting a width of the first automobile 10A from a width of a road is shorter than a width of other vehicle. When the traveling obstruction detection part 163 determines that the length obtained by subtracting the width of the first automobile 10A from the width of the road is shorter than the width of other vehicle, the traveling obstruction detection part 163 may determine that the first automobile 10A obstructs traveling of other vehicle.

The traveling obstruction detection part 163 may determine whether or not a width of a space which allows traveling of other vehicle acquired by the situation information acquisition part 162 is shorter than a length obtained by adding a predetermined length to a width of other vehicle acquired by the situation information acquisition part 162. When the traveling obstruction detection part 163 determines that the width of the space which allows traveling of other vehicle is shorter than the length obtained by adding the predetermined length to the width of other vehicle, the traveling obstruction detection part 163 may determine that the first automobile 10A obstructs traveling of other vehicle.

The traveling obstruction detection part 163 may determine whether or not a distance between a vehicle position of the first automobile 10A acquired by the position information acquisition part 161 and a position of other vehicle acquired by the situation information acquisition part 162 is equal to or less than a predetermined distance. When the traveling obstruction detection part 163 determines that the distance between the vehicle position of the first automobile 10A and the position of other vehicle is equal to or less than the predetermined distance, the traveling obstruction detection part 163 may determine that the first automobile 10A obstructs traveling of other vehicle.

The traveling obstruction detection part 163 may determine whether or not other vehicle is recognized in an image of surrounding of the first automobile 10A acquired by the situation information acquisition part 162. When the traveling obstruction detection part 163 determines that other vehicle is recognized in the image of the surrounding of the first automobile 10A, the traveling obstruction detection part 163 may determine that the first automobile 10A obstructs traveling of other vehicle.

The traveling obstruction detection part 163 may determine whether or not a preset operation image such as changing of an advancing path, sudden stopping, passing of a light, and changing in facial expression of a driver is recognized in an image of the surrounding of the first automobile 10A acquired by the situation information acquisition part 162. When the traveling obstruction detection part 163 determines that a preset operation image is recognized in the image of the surrounding of the first automobile 10A, the traveling obstruction detection part 163 may determine that the first automobile 10A obstructs traveling of other vehicle.

The traveling obstruction detection part 163 may detect a preset operation such as deceleration, stopping, and changing of an advancing path of other vehicle from a position, a speed, an acceleration, and an advancing direction of other vehicle acquired by the situation information acquisition part 162, and may determine whether or not at least one of a change amount of the speed, a change amount of the acceleration, and a change amount of an angle of the advancing direction is equal to or more than a predetermined threshold value. When the traveling obstruction detection part 163 determines that at least one of the change amount of the speed, the change amount of the acceleration, and the change amount of the angle of the advancing direction is equal to or more than the predetermined threshold value, the traveling obstruction detection part 163 may determine that the first automobile 10A obstructs traveling of other vehicle.

The traveling obstruction detection part 163 may determine whether or not a preset operation such as the deceleration, the stopping or the changing in advancing path of other vehicle is detected based on the position, the speed, the acceleration, and the advancing direction of other vehicle acquired by the situation information acquisition part 162. When the traveling obstruction detection part 163 determines that the preset operation such as the deceleration, the stopping or the changing of the advancing path of other vehicle is detected, the traveling obstruction detection part 163 may determine that the first automobile 10A obstructs traveling of other vehicle.

The traveling obstruction detection part 163 may determine whether or not a speed of other vehicle acquired by the situation information acquisition part 162 is equal to or less than a predetermined threshold value. When the traveling obstruction detection part 163 determines that a speed of other vehicle is equal to or less than the predetermined threshold value, the traveling obstruction detection part 163 may determine that the first automobile 10A obstructs traveling of other vehicle.

The above-mentioned traveling obstruction determination method is exemplified merely as an example, and is not intended to limit this disclosure.

Next, the communication part 114 transmits vehicle position information acquired by the position information acquisition part 161, situation information acquired by the situation information acquisition part 162, and traveling obstruction information detected by the traveling obstruction detection part 163 to the second automobile 2 (step S214).

Next, the communication part 211 of the second automobile 2 receives vehicle position information, situation information, and traveling obstruction information transmitted by the communication part 114 of the first automobile 10A (step S215).

Next, the destination information acquisition part 221 acquires destination information indicative of a destination position and an arrival time from the input part 213 (step S216).

In this embodiment 5, the input part 213 is a touch panel, for example, and receives inputting of a destination position and an arrival time. However, this disclosure is not particularly limited to such a configuration, and the communication part 211 may receive destination information from an external device via wireless communication. The external device is a personal computer, a smartphone, or a tablet-type computer, for example. The above-mentioned method of acquiring destination information is exemplified merely as an example, and is not intended to limit this disclosure.

Next, the standby position decision part 222 decides the vehicle position which least obstructs traveling of other vehicle as the standby position based on vehicle position information, situation information, and traveling obstruction information received by the communication part 211 among the vehicle positions of the first automobiles 10A, 10B, 10C existing at the position where the second automobile 2 can reach the destination position acquired by the destination information acquisition part 221 by the arrival time acquired by the destination information acquisition part 221 after passing the vehicle positions of the first automobiles 10A, 10B, 10C received by the communication part 211 (step S217).

In such processing, the standby position decision part 222 acquires an estimated arrival time when the second automobile 2 arrives at the destination position acquired by the destination information acquisition part 221 after passing the vehicle position received by the communication part 211 from the present point using the car navigation system, and selects the vehicle position where the estimated arrival time does not exceed the arrival time as the vehicle position existing at the position where the second automobile 2 can reach the destination within the time necessary for arrival. Further, the standby position decision part 222 may acquire an estimated arrival time when the second automobile 2 arrives at the destination position acquired by the destination information acquisition part 221 after passing the vehicle position received by the communication part 211 from the present position via radio communication from the outside, and may select the vehicle position where the estimated arrival time does not exceed the arrival time as the vehicle position existing at the position where the second automobile 2 can reach the destination within the time necessary for arrival. The above-mentioned method of selecting a vehicle position where the second automobile 2 can reach the destination by the arrival time is exemplified merely as an example, and is not intended to limit this disclosure.

Then, the standby position decision part 222 sequentially retrieves the vehicle positions existing at the position where the second automobile 2 can reach the destination by the arrival time among the vehicle positions received by the communication part 211, and decides the vehicle position where traveling obstruction information received together with the respective vehicle positions indicates that the first automobile does not obstruct traveling of other vehicle as the standby position. Alternatively, the standby position decision part 222 may sequentially retrieve vehicle positions existing at the position where the second automobile 2 can reach the destination by the arrival time among the vehicle positions received by the communication part 211, and may acquire sums by adding numerical values corresponding to degrees that the first automobiles obstruct traveling of other vehicle to the respective situation information and the respective traveling obstruction information received together with the respective vehicle positions by weighting, and may decide the vehicle position having the lowest sum as the standby position. The above-mentioned method of deciding the standby position is exemplified merely as an example, and is not intended to limit this disclosure.

In this embodiment, when the situation information received by the communication part 211 includes the number of vehicles being stopped near the first automobile, the larger the number of vehicles being stopped near the first automobile is, the higher a numerical value corresponding to a degree that the first automobile obstructs traveling of other vehicle becomes. When the situation information received by the communication part 211 includes a volume of traffic of a road where the first automobile exists, the larger a volume of traffic is, the higher a numerical value corresponding to a degree that the first automobile obstructs traveling of other vehicle becomes. When the situation information received by the communication part 211 includes the number of lanes of a road where the first automobile exists, the smaller the number of lanes is, the higher a numerical value corresponding to a degree that the first automobile obstructs traveling of other vehicle becomes. When the situation information received by the communication part 211 includes a width of a space which allows traveling of other vehicle passing near the first automobile, the narrower the width of the space which allows traveling of other vehicle is, the higher a numerical value corresponding to a degree that the first automobile obstructs traveling of other vehicle becomes. Further, when the situation information received by the communication part 211 includes a width of other vehicle passing near the first automobile, the larger a width of other vehicle is, the higher a numerical value corresponding to a degree that the first automobile obstructs traveling of other vehicle becomes.

In this embodiment, when the traveling obstruction information received by the communication part 211 includes the number of times of the occurrence of traveling obstruction, the larger the number of times of the occurrence of traveling obstruction is, the higher a numerical value corresponding to a degree that the first automobile obstructs traveling of other vehicle becomes. When the traveling obstruction information received by the communication part 211 includes a time interval from a point of time that the traveling obstruction occurs last time to a present time, the shorter the time interval from the point of time that the traveling obstruction occurs last time to the present time is, the higher a numerical value corresponding to a degree that the first automobile obstructs traveling of other vehicle becomes. When the traveling obstruction information received by the communication part 211 includes an average of time intervals where the traveling obstruction does not occur, the shorter an average of time intervals where the traveling obstruction does not occur is, the higher a numerical value corresponding to a degree that the first automobile obstructs traveling of other vehicle becomes. The above-mentioned numerical values corresponding to the degrees that the first automobile obstructs traveling of other vehicle are exemplified merely as an example, and are not intended to limit this disclosure.

In the above-mentioned example, the standby position is decided using situation information and traveling obstruction information. However, this disclosure is not particularly limited to such a configuration, and the standby position may be decided using only traveling obstruction information.

Next, the movement request generation part 223 generates a movement request for moving the second automobile 2 to the standby position decided by the standby position decision part 222 (step S218). The movement request generation part 223 outputs the generated movement request to the movement control part 22.

Then, the movement control part 22 performs a control for moving the second automobile 2 when the movement control part 22 receives the movement request for moving the second automobile 2 from the movement request generation part 223. That is, the movement control part 22 makes the drive part 23 start an operation of moving the second automobile 2 (step S219). The drive part 23 moves the second automobile 2 to the standby position in accordance with the control from the movement control part 22.

In this manner, the second automobile 2 moves to the standby position where the second automobile 2 does not obstruct other vehicle even when the second automobile 2 is stopped and hence, a user can receive a service in the second automobile 2 being stopped at the standby position. Then, the second automobile 2 moves from the standby position to the destination such that the second automobile 2 arrives at the destination by the arrival time after being stopped at the standby position.

In this embodiment 5, the second automobile 2 is a self-driving vehicle and hence, the second automobile 2 automatically moves to the standby position without being operated by a human. However, this disclosure is not particularly limited to such a configuration, and the second automobile 2 may not be a self-driving vehicle, and may be operated by a human. In this case, the second automobile 2 includes neither the movement control part 22 nor the drive part 23 and hence, the second automobile 2 may not execute processing in step S219. The second automobile 2 may include a display part for displaying a movement request generated by the movement request generation part 223 for moving the second automobile 2 to the standby position. After processing in step S218 is finished, the display part displays the movement request generated by the movement request generation part 223, and the processing is finished. The movement request displayed on the display part indicates an address of the standby position or a route from the present position to the standby position, for example. Then, the actual movement of the second automobile 2 is performed by a human who drives the second automobile 2 while recognizing a movement request displayed on the display part. The above-mentioned movement control is exemplified merely as an example, and is not intended to limit this disclosure.

In executing processing in step S219, even when a human does not perform a driving operation or even when a human performs a driving operation in a limited manner, it is possible to move the second automobile 2 to the standby position decided by the standby position decision part 222. Such an advantageous effect can be particularly increased in the case where the second automobile 2 is a self-driving vehicle or an automobile with a drive assist function.

In this manner, in this embodiment 5, out of positions where one or more first automobiles 10A, 10B, 10C exist, the position which does not obstruct or least obstructs traveling of other vehicle is decided as the position where the second automobile 2 is made to stand by. Accordingly, it is possible to suppress the occurrence of a phenomenon that the second automobile 2 which moves to the standby position obstructs traveling of other vehicle at the standby position.

Embodiment 6

The automobile control system according to the embodiment 5 includes one or more first automobiles and the second automobile. On the other hand, an automobile control system according to an embodiment 6 includes a server in addition to one or more first automobiles and a second automobile.

Hereinafter, the whole configuration and the whole manner of operation of the automobile control system according to the embodiment 6 of this disclosure are described in detail.

Figure 13:
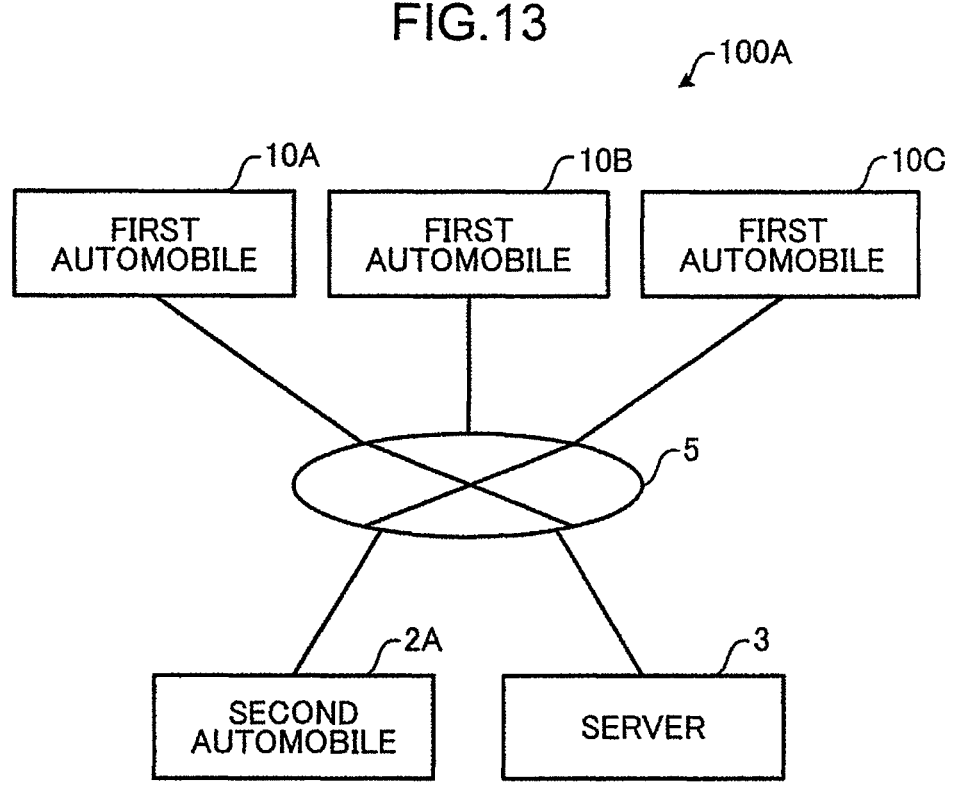
FIG. 13 is a view showing a whole configuration of an automobile control system according to an embodiment 6 of this disclosure.

FIG. 13 is a view showing the whole configuration of the automobile control system according to the embodiment 6 of this disclosure.

An automobile control system 100A shown in FIG. 13 includes first automobiles 10A, 10B, 10C, a second automobile 2A, and a server 3. The server 3 is connected with the first automobiles 10A, 10B, 10C and the second automobile 2A in a communicable manner via a network 5. The network 5 is an internet, for example.

A sensor used for detecting an object is mounted on the first automobiles 10A, 10B, 10C respectively. The first automobiles 10A, 10B, 10C respectively transmit a determination result obtained by determining a mode of other vehicle which travels near the first automobiles 10A, 10B, 10C to the server 3 using respective sensing information indicative of the situations outside the first automobiles 10A, 10B, 10C which the respective sensors output. The first automobiles 10A, 10B, 10C also transmit vehicle position information (moving body position information) indicative of positions of the first automobiles 10A, 10B, 10C to the server 3 respectively.

The second automobile 2A offers a predetermined service to a user. The predetermined service is a service which enables the user to view a visual content in the second automobile 2A, for example.

The server 3 acquires determination results obtained by determining a mode of other vehicle traveling near the first automobiles 10A, 10B, 10C respectively, acquires vehicle position information indicative of the positions of the first automobiles 10A, 10B, 10C respectively, and acquires reference position information indicative of the reference position with respect to the second automobile 2A. The reference position is the destination of the second automobile 2A. The server 3 decides the second position where the second automobile 2A is made to stand by corresponding to the first position specified using the respective determination results and the respective moving body position information and the reference position which the reference position information indicates. The server 3 transmits the decided second position to the second automobile 2A. The second automobile 2A generates a movement request for moving the second automobile 2A to the second position.

In this embodiment 6, the automobile control system 100A includes three first automobiles 10A, 10B, 10C. However, this disclosure is not particularly limited to such a configuration. The automobile control system 100A may include two or less first automobiles, or may include four or more first automobiles.

The first automobiles 10A, 10B, 10C and the second automobile 2A may be respectively operated by a human, or may be respectively formed of a self-driving vehicle which is not operated by a human.

Figure 14:
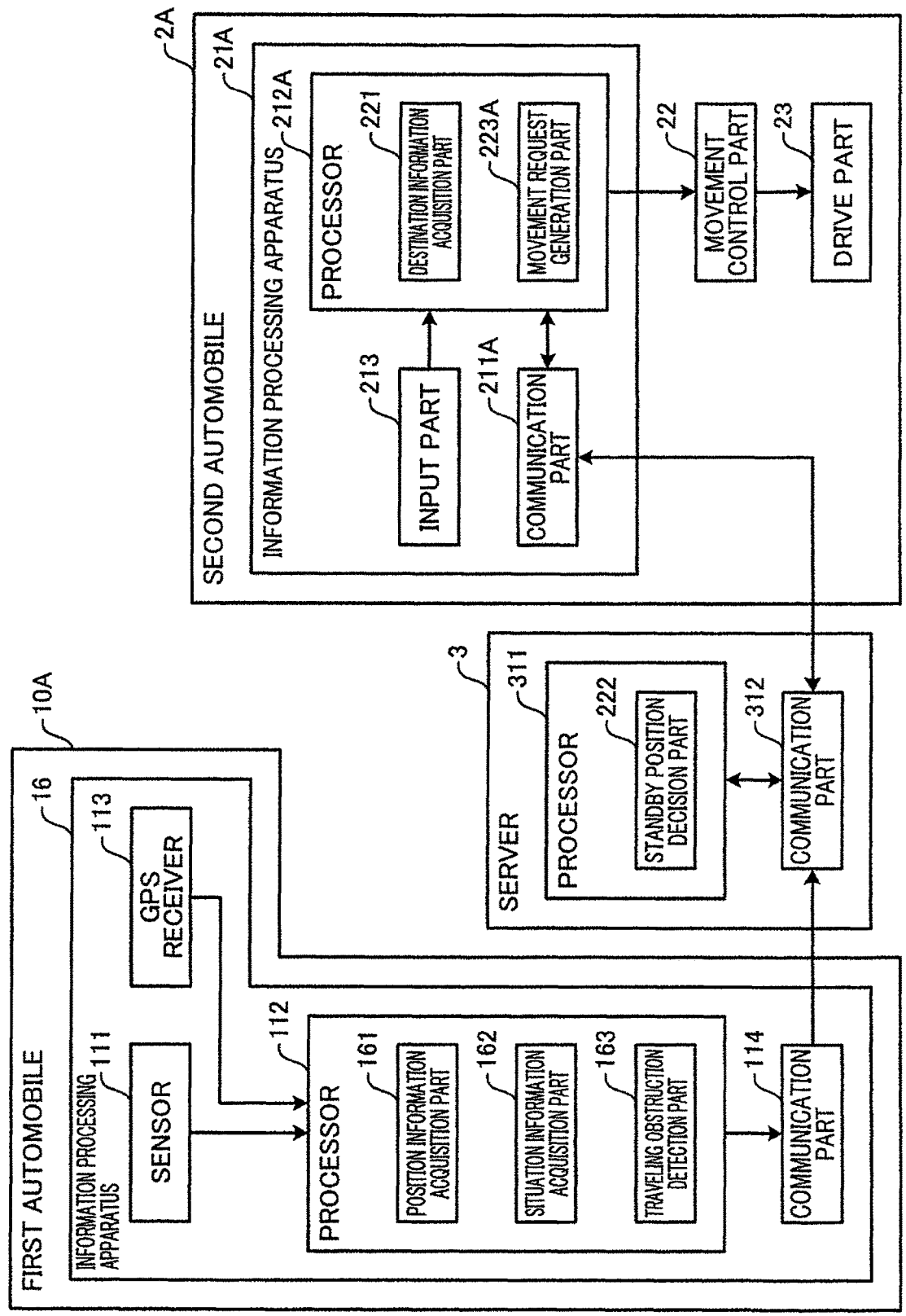
FIG. 14 is a block diagram showing a configuration of a first automobile, a second automobile and a server according to the embodiment 6 of this disclosure.

FIG. 14 is a block diagram showing a configuration of the first automobile, a configuration of the second automobile, and a configuration of the server according to the embodiment 6 of this disclosure. In FIG. 14, constitutional elements identical with the constitutional elements of the first automobile and the second automobile in the embodiment 5 of this disclosure are given the same symbols, and the description of these constitutional elements is omitted.

As shown in FIG. 14, the first automobile 10A includes an information processing apparatus 16. The information processing apparatus 16 includes a sensor 111, a processor 112, a GPS receiver 113, and a communication part 114. The processor 112 includes a position information acquisition part 161, a situation information acquisition part 162, and a traveling obstruction detection part 163. The configurations of the first automobiles 10B, 10C are equal to the configuration of the first automobile 10A.

The communication part 114 transmits vehicle position information acquired by the position information acquisition part 161, situation information acquired by the situation information acquisition part 162, and traveling obstruction information detected by the traveling obstruction detection part 163 to the server 3.

The second automobile 2A includes an information processing apparatus 21A, a movement control part 22, and a drive part 23. The information processing apparatus 21A includes a communication part 211A, a processor 212A, and an input part 213. The processor 212A includes a destination information acquisition part 221, and a movement request generation part 223A.

The communication part 211A transmits destination information indicative of a destination position and an arrival time acquired by the destination information acquisition part 221 to the server 3. The communication part 211A also receives the standby position transmitted by the server 3.

The movement request generation part 223A generates a movement request for moving the second automobile 2A to the standby position received by the communication part 211A, and outputs the movement request to the movement control part 22.

The server 3 includes a processor 311 and a communication part 312. The processor 311 includes a standby position decision part 222.

The communication part 312 receives vehicle position information, situation information, and traveling obstruction information transmitted by the first automobile 10A. The communication part 312 also transmits a standby position decided by the standby position decision part 222 to the second automobile 2A. The communication part 312 also receives destination information transmitted by the second automobile 2A.

Figure 15:
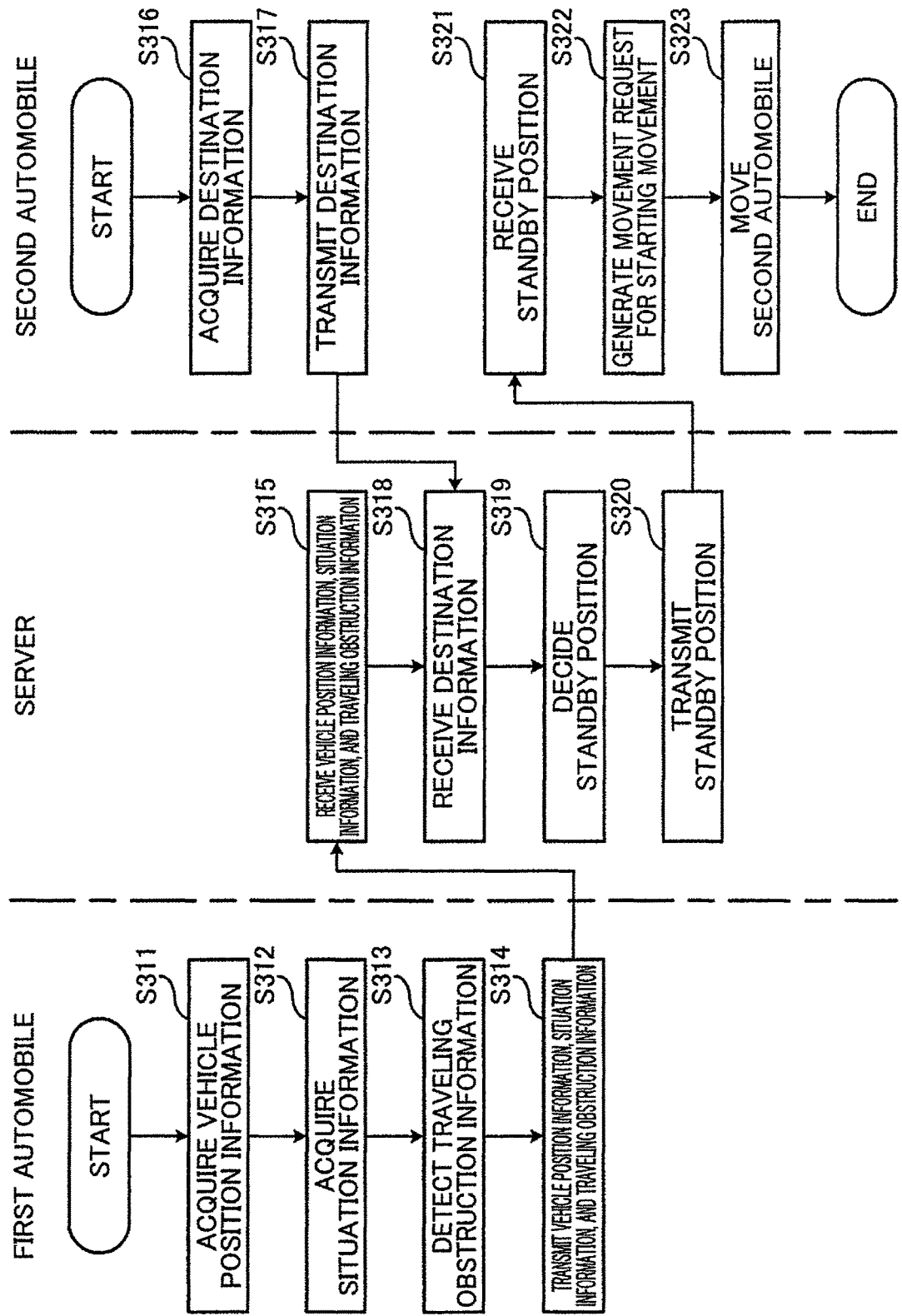
FIG. 15 is a flowchart for describing an operation of a control of an automobile control system according to the embodiment 6 of this disclosure.

FIG. 15 is a flowchart for describing the manner of operation of a control of the automobile control system according to the embodiment 6 of this disclosure. In the description made hereinafter, processing between the first automobile 10A out of the first automobiles 10A, 10B, 10C and the server 3 is described. However, processing between the first automobiles 10B, 10C and the server 3 are also performed in the same manner as the processing between the first automobile 10A and the server 3.

Processing in steps S311 to S313 are equal to processing in steps S211 to S213 shown in FIG. 12.

Next, the communication part 114 of the first automobile 10A transmits vehicle position information acquired by the position information acquisition part 161, situation information acquired by the situation information acquisition part 162, and traveling obstruction information detected by the traveling obstruction detection part 163 to the server 3 (step S314).

Next, the communication part 312 of the server 3 receives vehicle position information, situation information, and traveling obstruction information transmitted by the communication part 114 of the first automobile 10A (step S315).

Next, the destination information acquisition part 221 of the second automobile 2A acquires destination information indicative of the destination position and an arrival time from the input part 213 (step S316).

Next, the communication part 211A transmits the destination information acquired by the destination information acquisition part 221 to the server 3 (step S317).

Next, the communication part 312 of the server 3 receives destination information transmitted by the communication part 211A of the second automobile 2A (step S318).

Next, the standby position decision part 222 decides the vehicle position which least obstructs traveling of other vehicle as the standby position based on vehicle position information, situation information and traveling obstruction information received by the communication part 312 among the vehicle positions of the first automobiles 10A, 10B, 10C existing at the position where the second automobile 2A can reach the destination position received by the communication part 312 by the arrival time received by the communication part 312 after passing the vehicle positions of the first automobiles 10A, 10B, 10C received by the communication part 312 (step S319). The embodiment 6 adopts the same method of deciding the standby position as the embodiment 5.

Next, the communication part 312 transmits the standby position decided by the standby position decision part 222 to the second automobile 2A (step S320).

Next, the communication part 211A of the second automobile 2A receives the standby position transmitted by the communication part 312 of the server 3 (step S321).

Next, the movement request generation part 223A generates a movement request for moving the second automobile 2A to the standby position received by the communication part 211A (step S322). The movement request generation part 223A outputs the generated movement request to the movement control part 22.

Then, the movement control part 22 performs a control for moving the second automobile 2A when the movement control part 22 receives the movement request for moving the second automobile 2A from the movement request generation part 223A. That is, the movement control part 22 makes the drive part 23 start an operation of moving the second automobile 2A (step S323). The drive part 23 moves the second automobile 2A to the standby position in accordance with the control from the movement control part 22.

In this embodiment 6, after processing in steps S311 to S315 shown in FIG. 15 are executed, processing in steps S316 to S318 are executed. However, this disclosure is not particularly limited to such processing. That is, first, processing in steps S316 to S318 are executed. When the server 3 receives destination information from the second automobile 2A, the server 3 may transmit request information for requesting vehicle position information, situation information, and traveling obstruction information to the first automobiles 10A, 10B, 10C. When the first automobiles 10A, 10B, 10C receive the request information from the server 3, the first automobiles 10A, 10B, 10C may execute processing in steps S311 to S314 shown in FIG. 15 so as to transmit vehicle position information, situation information, and traveling obstruction information to the server 3.

In this embodiment 6, the first automobiles 10A, 10B, 10C respectively include the traveling obstruction detection part 163. However, this disclosure is not particularly limited to such a configuration, and the server 3 may include the traveling obstruction detection part 163. In this case, the communication part 114 of the respective first automobiles 10A, 10B, 10C transmits vehicle position information and situation information (sensing information) to the server 3, the communication part 312 of the server 3 acquires vehicle position information and situation information, and the traveling obstruction detection part 163 of the server 3 determines a mode of other vehicle using the situation information thus detecting traveling obstruction information.

In this embodiment 6, the second automobile 2A may include neither the destination information acquisition part 221 nor the input part 213, the communication part 211A may not transmit destination information to the server 3, and the communication part 312 may not receive destination information from the second automobile 2A. In this case, processing in step S316 and processing in step S317 shown in FIG. 15 are not executed, and the communication part 312 receives destination information from an external device which differs from the second automobile 2A in step S318. The external device is a vehicle allocation device which is connected with the server 3 in a communicable manner for allocating a vehicle such as a taxi, for example. The vehicle allocation device decides a second automobile 2A to be allocated, acquires destination information indicative of the destination position and an arrival time of the second automobile 2A, and transmits information for identifying the decided second automobile 2A and destination information to the server 3. In this case, the destination position of the second automobile 2A is the position where a user who requests allocation of a vehicle rides the vehicle, for example. The communication part 312 of the server 3 receives destination information transmitted by the vehicle allocation device. The above-mentioned method of acquiring destination information is exemplified merely as an example, and is not intended to limit this disclosure.

In this embodiment 6, the second automobile 2A includes the movement request generation part 223. However, this disclosure is not particularly limited to such a configuration, and the server 3 may include the movement request generation part 223. In this case, the movement request generation part 223 outputs a movement request for moving the second automobile 2A to the standby position to the second automobile 2A.

In this embodiment 6, the second automobile 2A is a self-driving vehicle and hence, the second automobile 2A automatically moves to the standby position without being operated by a human. However, this disclosure is not particularly limited to such a configuration, and the second automobile 2A may not be a self-driving vehicle, and may be operated by a human. In this case, the second automobile 2A includes neither the movement control part 22 nor the drive part 23 and hence, the second automobile 2A may not execute processing in step S323. The second automobile 2A may include a display part for displaying a movement request generated by the movement request generation part 223A for moving the second automobile 2A to the standby position. After processing in step S322 is finished, the display part displays the movement request generated by the movement request generation part 223A, and the processing is finished. The movement request displayed on the display part indicates an address of the standby position or a route from the present position to the standby position, for example. Then, the actual movement of the second automobile 2A is performed by a human who drives the second automobile 2A while recognizing a movement request displayed on the display part. The above-mentioned movement control is exemplified merely as an example, and is not intended to limit this disclosure.

In executing processing in step S323, even when a human does not perform a driving operation or even when a human performs a driving operation in a limited manner, it is possible to move the second automobile 2A to the standby position decided by the standby position decision part 222. Such an advantageous effect can be particularly increased in the case where the second automobile 2A is a self-driving vehicle or an automobile with a drive assist function.

Embodiment 7

The automobile control system according to the embodiment 6 includes one or more first automobiles, the second automobile, and the server. However, an automobile control system according to an embodiment 7 includes one or more automobiles having a function of the first automobile and a function of the second automobile of the embodiment 6, and a server.

Hereinafter, the whole configuration and the whole manner of operation of the automobile control system according to the embodiment 7 of this disclosure are described in detail.

Figure 16:
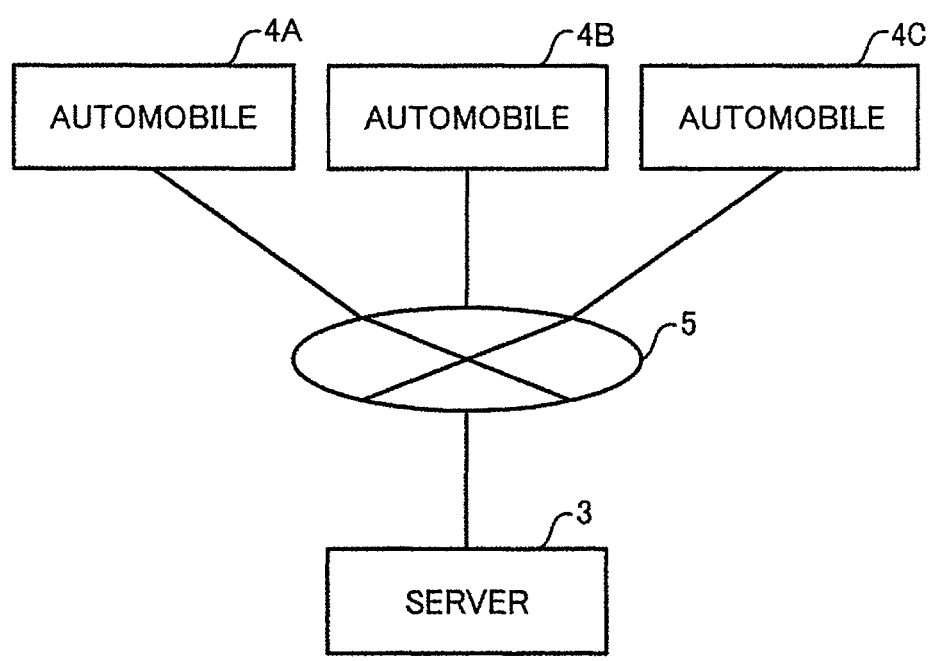
FIG. 16 is a view showing a whole configuration of an automobile control system according to an embodiment 7 of this disclosure.

FIG. 16 is a view showing the whole configuration of the automobile control system according to the embodiment 7 of this disclosure.

An automobile control system 100B shown in FIG. 16 includes automobiles 4A, 4B, 4C, and a server 3. The server 3 is connected with the automobiles 4A, 4B, 4C in a communicable manner via a network 5. The network 5 is an internet, for example.

The automobiles 4A, 4B, 4C respectively have a function of the first automobile 10A and a function of the second automobile 2A of the embodiment 6.

That is, a sensor used for detecting an object is mounted on the automobiles 4A, 4B, 4C respectively. The automobiles 4A, 4B, 4C respectively transmit respective determination results obtained by determining a mode of other vehicle passing near the automobiles 4A, 4B, 4C to the server 3 using respective sensing information indicative of situations outside the automobiles 4A, 4B, 4C which are the sensors output. Further, the automobiles 4A, 4B, 4C respectively transmit vehicle position information (moving body position information) indicative of positions of the automobiles 4A, 4B, 4C to the server 3.

The automobiles 4A, 4B, 4C offer a predetermined service to a user respectively. The predetermined service is a service which enables a user to view a visual content in the automobiles 4A, 4B, 4C, for example.

For example, when the automobile 4A which offers a predetermined service is moved to the standby position, the server 3 acquires respective determination results obtained by determining a mode of other vehicle passing near the automobiles 4B, 4C, acquires respective vehicle position information indicative of positions of the automobiles 4B, 4C, and acquires reference position information indicative of the reference position of the automobile 4A. The reference position is the destination of the automobile 4A. The server 3 decides the second position where the automobile 4A is made to stand by corresponding to the first position specified using the respective determination results and the respective moving body position information and the reference position which the reference position information indicates. The server 3 transmits the decided second position to the automobile 4A. The automobile 4A generates a movement request for moving the automobile 4A to the second position.

In this embodiment 6, the automobile control system 100B includes three automobiles 4A, 4B, 4C. However, this disclosure is not particularly limited to such a configuration, and the automobile control system 100B may include two automobiles, or may include four or more automobiles.

The automobiles 4A, 4B, 4C may be operated by a human, or may be a self-driving vehicle which is not operated by a human.

Figure 17:
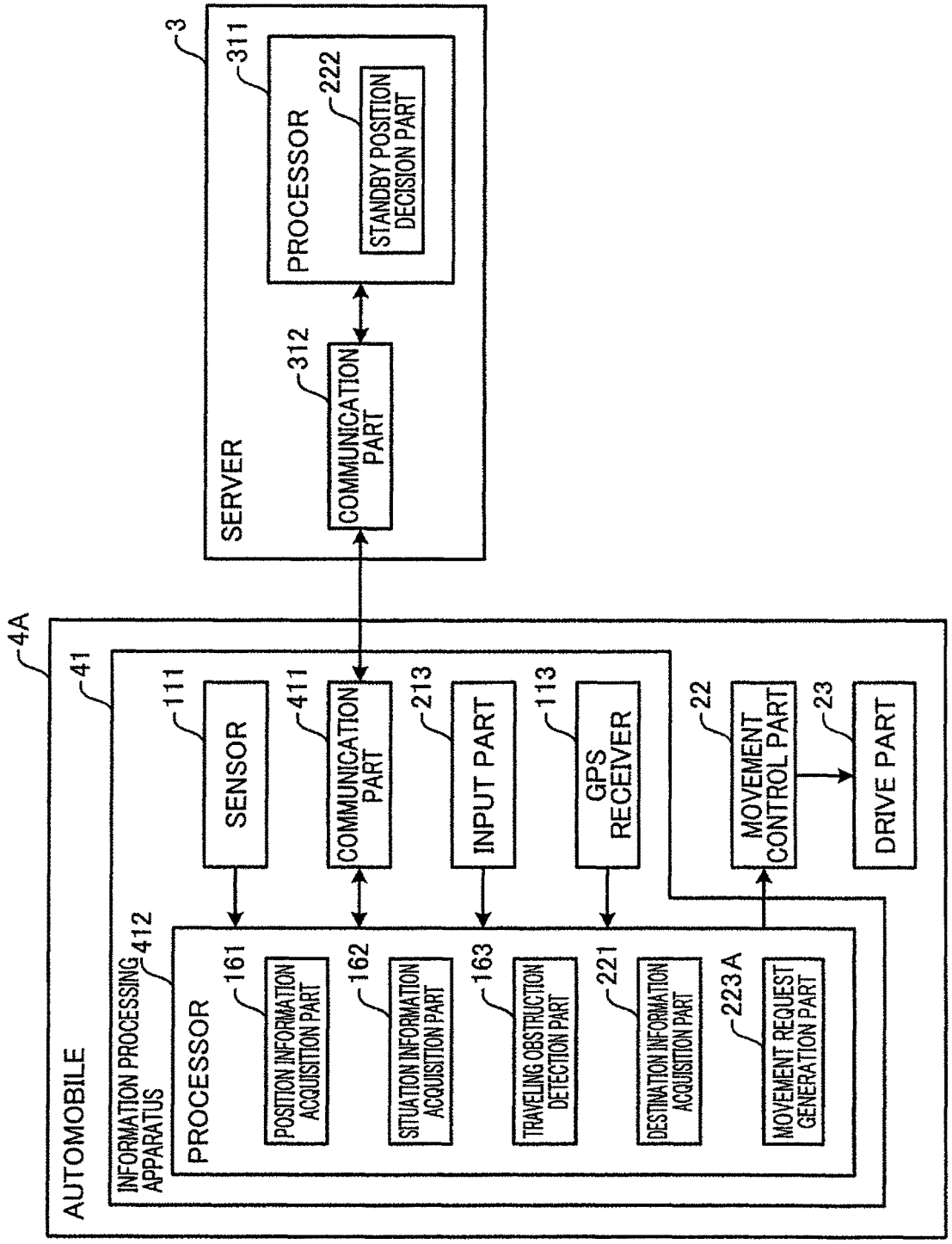
FIG. 17 is a block diagram showing a configurations of an automobile and a server according to the embodiment 7 of this disclosure.

FIG. 17 is a block diagram showing a configuration of the automobile and the server according to the embodiment 7 of this disclosure. In FIG. 17, constitutional elements which are equal to the constitutional elements of the first automobile, the second automobile, and the server according to the embodiment 6 of this disclosure are given the same symbols, and the description of these constitutional elements is omitted.

As shown in FIG. 17, the automobile 4A includes an information processing apparatus 41, a movement control part 22, and a drive part 23. The information processing apparatus 41 includes a sensor 111, an input part 213, a GPS receiver 113, a communication part 411, and a processor 412. The processor 412 includes a position information acquisition part 161, a situation information acquisition part 162, a traveling obstruction detection part 163, a destination information acquisition part 221, and a movement request generation part 223A. The configurations of the automobiles 4B, 4C are equal to the configuration of the automobile 4A.

The communication part 411 transmits vehicle position information acquired by the position information acquisition part 161, situation information acquired by the situation information acquisition part 162, and traveling obstruction information detected by the traveling obstruction detection part 163 to the server 3. The communication part 411 transmits destination information indicative of the destination position and an arrival time acquired by the destination information acquisition part 221 to the server 3. The communication part 411 also receives the standby position transmitted by the server 3.

The server 3 includes a processor 311 and a communication part 312. The processor 311 includes a standby position decision part 222.

The communication part 312 receives vehicle position information, situation information, and traveling obstruction information transmitted by the automobile 4A. The communication part 312 transmits the standby position decided by the standby position decision part 222 to the automobile 4A. The communication part 312 receives destination information transmitted by the automobile 4A.

Figure 18:
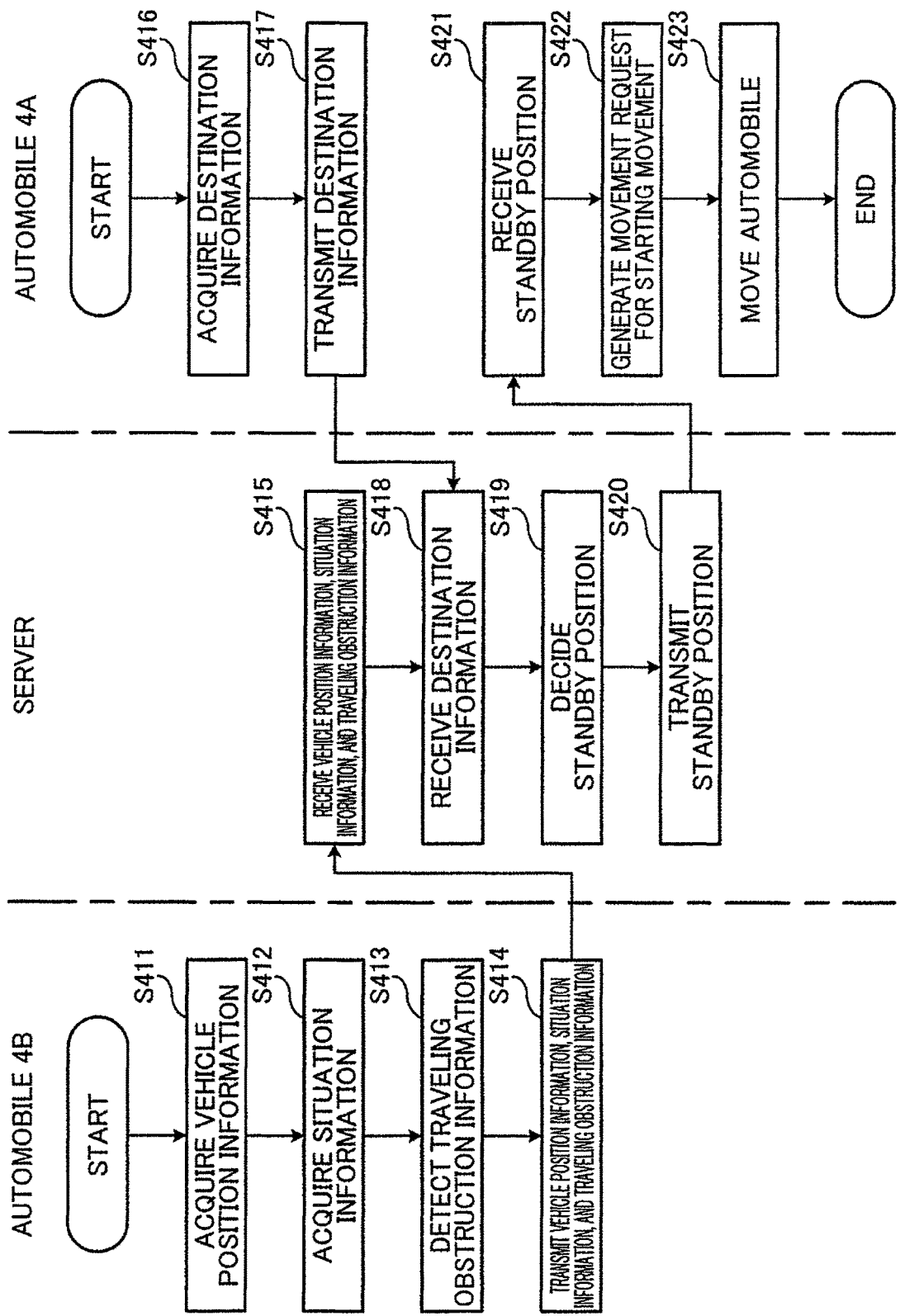
FIG. 18 is a flowchart for describing an operation of a control of the automobile control system according to the embodiment 7 of this disclosure.

FIG. 18 is a flowchart for describing the manner of operation of a control of the automobile control system according to the embodiment 7 of this disclosure. In the description made hereinafter, the case is described where the automobile 4A transmits destination information and, at the same time, moves to the standby position, and the automobile 4B transmits vehicle position information, situation information, and traveling obstruction information.

Processing in steps S411 to S413 are equal to processing in steps S311 to S313 shown in FIG. 15. In this embodiment 7, processing in steps S411 to S413 are executed by the automobile 4B.

Next, the communication part 411 of the automobile 4B transmits vehicle position information acquired by the position information acquisition part 161, situation information acquired by the situation information acquisition part 162, and traveling obstruction information detected by the traveling obstruction detection part 163 to the server 3 (step S414).

Next, the communication part 312 of the server 3 receives vehicle position information, situation information, and traveling obstruction information transmitted by the communication part 114 of the automobile 4B (step S415).

Next, the destination information acquisition part 221 of the automobile 4A acquires destination information indicative of the destination position and an arrival time from the input part 213 (step S416).

Next, the communication part 411 of the automobile 4A transmits destination information acquired by the destination information acquisition part 221 to the server 3 (step S417).

Next, the communication part 312 of the server 3 receives destination information transmitted by the communication part 411 of the automobile 4A (step S418).

Processing in step S419 is equal to processing in step S319 shown in FIG. 15.

Next, the communication part 312 transmits the standby position decided by the standby position decision part 222 to the automobile 4A (step S420).

Next, the communication part 411 of the automobile 4A receives the standby position transmitted by the communication part 312 of the server 3 (step S421).

Processing in steps S422 to S423 are equal to processing in steps S322 to S323 shown in FIG. 15. In this embodiment 7, processing in steps S422 to S423 are executed by the automobile 4A.

In this embodiment 7, after processing in steps S411 to S415 shown in FIG. 18 are executed, processing in steps S416 to S418 are executed. However, this disclosure is not particularly limited to such processing. That is, first, processing in steps S416 to S418 are executed. When the server 3 receives destination information from the automobile 4A, the server 3 may transmit request information for requesting vehicle position information, situation information and traveling obstruction information to the automobiles 4B, 4C. When the automobiles 4B, 4C receive the request information from the server 3, the automobiles 4B, 4C may execute processing in steps S411 to S414 shown in FIG. 18 so as to transmit vehicle position information, situation information, and traveling obstruction information to the server 3.

In this embodiment 7, the automobile 4A may include neither the destination information acquisition part 221 nor the input part 213, the communication part 411 may not transmit destination information to the server 3, and the communication part 312 may not receive destination information from the automobile 4A. In this case, processing in step S416 and processing in step S417 shown in FIG. 18 are not executed, and the communication part 312 receives destination information from an external device which differs from the automobile 4A in step S418. The external device is a vehicle allocation device which is connected with the server 3 in a communicable manner for allocating a vehicle such as a taxi, for example. The vehicle allocation device decides an automobile 4A to be allocated, acquires destination information indicative of a destination position and an arrival time of the automobile 4A, and transmits information for identifying the decided automobile 4A and destination information to the server 3. The communication part 312 of the server 3 receives destination information transmitted by the vehicle allocation device. The above-mentioned method of acquiring destination information is exemplified merely as an example, and is not intended to limit this disclosure.

In this embodiment 7, the automobile 4A includes the movement request generation part 223A. However, this disclosure is not particularly limited to such a configuration, and the server 3 may include the movement request generation part 223A. In this case, the movement request generation part 223A outputs a movement request for moving the automobile 4A to the standby position to the automobile 4A.

In this embodiment 7, the automobile 4A is a self-driving vehicle and hence, the automobile 4A automatically moves to the standby position without being operated by a human. However, this disclosure is not particularly limited to such a configuration, and the automobile 4A may not be a self-driving vehicle, and may be operated by a human. In this case, the automobile 4A includes neither the movement control part 22 nor the drive part 23 and hence, the automobile 4A may not execute processing in step S423. The automobile 4A may include a display part for displaying a movement request generated by the movement request generation part 223A for moving the automobile 4A to the standby position. After processing in step S422 is finished, the display part displays the movement request generated by the movement request generation part 223A, and the processing is finished. The movement request displayed on the display part indicates an address of the standby position or a route from the present position to the standby position, for example. Then, the actual movement of the automobile 4A is performed by a human who drives the automobile 4A while recognizing a movement request displayed on the display part. The above-mentioned movement control is exemplified merely as an example, and is not intended to limit this disclosure.

Embodiment 8

The second automobile in the embodiment 5 decides the standby position using vehicle position information, situation information, and traveling obstruction information which the second automobile receives from the first automobiles 10A, 10B, 10C in real time. However, a second automobile of an embodiment 8 decides a standby position using not only vehicle position information, situation information, and traveling obstruction information which the second automobile receives from the first automobiles 10A, 10B, 10C in real time but also vehicle position information, situation information, and traveling obstruction information which the second automobile received in the past.

Hereinafter, the whole configuration and the whole manner of operation of an automobile control system according to the embodiment 8 of this disclosure are described in detail.

Figure 19:
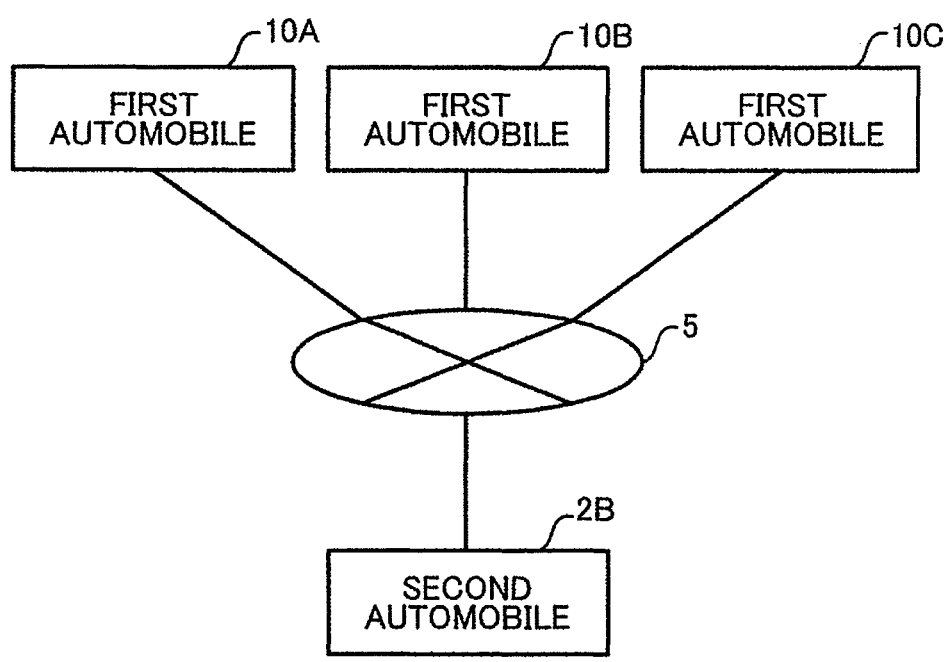
FIG. 19 is a view showing a whole configuration of an automobile control system according to an embodiment 8 of this disclosure.

FIG. 19 is a view showing the whole configuration of the automobile control system according to the embodiment 8 of this disclosure.

An automobile control system 100C shown in FIG. 19 includes first automobiles 10A, 10B, 10C, and a second automobile 2B. The second automobile 2B is connected with the first automobiles 10A, 10B, 10C in a communicable manner via a network 5. The network 5 is an internet, for example.

A sensor used for detecting an object is mounted on the respective first automobiles 10A, 10B, 10C. The first automobiles 10A, 10B, 10C respectively transmit a determination result obtained by determining a mode of other vehicle passing near the first automobiles 10A, 10B, 10C to the second automobile 2B using respective sensing information indicative of situations of the outside of the first automobiles 10A, 10B, 10C which the respective sensors output. On the other hand, the first automobiles 10A, 10B, 10C respectively transmit vehicle position information (moving body position information) indicative of the positions of the first automobiles 10A, 10B, 10C to the second automobile 2B.

The second automobile 2B offers a predetermined service to a user. The predetermined service is a service which enables a user to view a visual content in the second automobile 2B, for example.

The second automobile 2B acquires determination results obtained by determining a mode of other vehicle passing near the first automobiles 10A, 10B, 10C respectively, acquires vehicle position information indicative of the positions of the first automobiles 10A, 10B, 10C respectively, and acquires reference position information indicative of the reference position of the second automobile 2B. The reference position is the destination of the second automobile 2B. The second automobile 2B decides the second position where the second automobile 2B is made to stand by corresponding to the first position specified using the respective determination results and the respective moving body position information and the reference position which the reference position information indicates. The second automobile 2B also generates a movement request for moving the second automobile 2B to the second position.

In this embodiment 8, the automobile control system 100C includes three first automobile 10A, 10B, 10C. However, this disclosure is not particularly limited to such a configuration. The automobile control system 100C may include two or less first automobiles, or may include four or more first automobiles.

The first automobile 10A, 10B, 10C and the second automobile 2B may be operated by a human, or may be respectively formed of a self-driving vehicle which is not operated by a human.

FIG. 20 is a block diagram showing a configuration of the first automobile and the second automobile according to the embodiment 8 of this disclosure. In FIG. 20, constitutional elements identical with the constitutional elements of the first automobile and the second automobile in the embodiment 5 of this disclosure are given the same symbols, and the description of the constitutional elements is omitted.

As shown in FIG. 20, the first automobile 10A includes an information processing apparatus 16. The information processing apparatus 16 includes a sensor 111, a processor 112, a GPS receiver 113, and a communication part 114. The processor 112 includes a position information acquisition part 161, a situation information acquisition part 162, and a traveling obstruction detection part 163. The configurations of the first automobiles 10B, 10C are equal to the configuration of the first automobile 10A.

The second automobile 2B includes an information processing apparatus 21B, a movement control part 22, and a drive part 23. The information processing apparatus 21B includes a communication part 211B, a processor 212B, an input part 213, and a memory part 214. The processor 212B includes a destination information acquisition part 221, a standby position decision part 222B, and a movement request generation part 223.

The communication part 211B receives vehicle position information, situation information, and traveling obstruction information transmitted by the first automobile 10A. The communication part 211B outputs the received vehicle position information, situation information, and traveling obstruction information to the processor 212B and, at the same time, stores the received vehicle position information, the received situation information, and the received traveling obstruction information in the memory part 214.

The memory part 214 stores vehicle position information, situation information, and traveling obstruction information received by the communication part 211B. The memory part 214 stores the vehicle position information, the situation information, and the traveling obstruction information in association with the date and the time at which the communication part 211B receives the vehicle position information, the situation information, and the traveling obstruction information.

The standby position decision part 222B decides the standby position (second position) corresponding to the past specified position (the past first position) specified using the respective past traveling obstruction information (determination results) and the respective past vehicle position information (moving body position information) stored in the memory part 214, present specified position (present first position) specified using respective present traveling obstruction information (determination results) and respective present vehicle position information (moving body position information) received by the communication part 211B, and the position of the destination (reference position).

That is, the standby position decision part 222B specifies the past specified position using the respective past traveling obstruction information and the respective past vehicle position information stored in the memory part 214. Further, the standby position decision part 222B specifies the present specified position using the respective present traveling obstruction information and the respective present vehicle position information received by the communication part 211B. At this stage of processing, traveling obstruction information includes a determination result whether or not the first automobile obstructs traveling of other vehicle.

The standby position decision part 222B specifies the past specified position (the past third position) where the first automobile obstructs traveling of other moving body out of the positions which past vehicle position information decided based on respective past traveling obstruction information respectively indicate. Further, the standby position decision part 222B specifies the present specified position (the present third position) where the first automobile obstructs traveling of other moving body out of the positions which present vehicle position information decided based on present vehicle position information respectively indicate. Then, the standby position decision part 222B decides the position which is the position other than the past specified position (the past third position) where the first automobile obstructs traveling of other moving body and the present specified position (the present third position) where the first automobile obstructs traveling of other moving body, and falls within a predetermined range from the destination position as the standby position.

The standby position decision part 222B may specify the past specified position (the past fourth position) where the first automobile does not obstruct traveling of other moving body out of the positions which past vehicle position information decided based on respective past traveling obstruction information respectively indicate. Further, the standby position decision part 222B may specify the present specified position (the present fourth position) where the first automobile does not obstruct traveling of other moving body out of the positions which present vehicle position information decided based on present traveling obstruction information respectively indicate. Then, the standby position decision part 222B may decide the position which is the past specified position (the past fourth position) where the first automobile does not obstruct traveling of other moving body and the present specified position (the present fourth position) where the first automobile does not obstruct traveling of other moving body, and falls within a predetermined range from the destination position as the standby position.

The standby position decision part 222B acquires a time necessary for the second automobile 2B to reach the destination position. The predetermined range is a range which allows the second automobile 2B to move from the standby position to the destination position within a time necessary for arrival or a range which allows the second automobile 2B to move from the present position of the second automobile 2B to the destination position via the standby position within the time necessary for arrival. The predetermined range may be a range equal to or less than a predetermined distance.

The standby position decision part 222B specifies the position which the vehicle position information indicates as the specified position (first position) based on a degree that the first automobile obstructs traveling of other vehicle.

The standby position decision part 222B may decide the vehicle position which least obstructs traveling of other vehicle as the standby position based on vehicle position information, situation information and traveling obstruction information stored in the memory part 214 and vehicle position information, situation information and traveling obstruction information received by the communication part 211B among the vehicle positions existing at the positions which allow the second automobile 2B to reach the destination position acquired by the destination information acquisition part 221 by the arrival time acquired by the destination information acquisition part 221 after the second automobile 2B passes the vehicle position of the first automobile indicated by the vehicle position information stored in the memory part 214 and the vehicle position of the first automobile indicated by vehicle position information received by the communication part 211B.

In this case, the standby position decision part 222B acquires an estimated arrival time when the second automobile 2B arrives at the destination position acquired by the destination information acquisition part 221 after the second automobile 2B passes the vehicle position received by the communication part 211B from a present point using a car navigation system and the vehicle position stored in the memory part 214, and selects the vehicle position where the estimated arrival time does not exceed the arrival time as the vehicle position existing at the position where the second automobile 2B can reach the destination within the time necessary for arrival. Alternatively, the standby position decision part 222B may acquire an estimated arrival time when the second automobile 2B arrives at the destination position acquired by the destination information acquisition part 221 after the second automobile 2B passes the vehicle position received by the communication part 211B from the present point via wireless communication from the outside and the vehicle position stored in the memory part 214, and may select the vehicle position where the estimated arrival time does not exceed the arrival time as the vehicle position existing at the position where the second automobile 2B can reach the destination within the time necessary for arrival.

Then, the standby position decision part 222B sequentially retrieves the vehicle positions existing at the position where the second automobile 2B can reach the destination by the arrival time among the vehicle positions received by the communication part 211B and the vehicle positions stored in the memory part 214, and decides the vehicle position where traveling obstruction information received and stored together with the respective vehicle positions indicates that the first automobile does not obstruct traveling of other vehicle as the standby position. Alternatively, the standby position decision part 222B may sequentially retrieve vehicle positions existing at the position where the second automobile 2B can reach the destination by the arrival time among the vehicle positions received by the communication part 211B and the vehicle positions stored in the memory part 214, and may acquire sums by adding numerical values corresponding to degrees that the first automobiles obstruct traveling of other vehicle to the respective situation information and the respective traveling obstruction information received and stored together with the respective vehicle positions by weighting, and may decide the vehicle position having the lowest sum as the standby position.

Numerical values corresponding to situation information and traveling obstruction information stored in the memory part 214 may be set such that the longer the time situation information and traveling obstruction information are stored in the memory part 214, the smaller the weighting becomes.

With respect to vehicle position information, situation information and traveling obstruction information stored in the memory part 214, only vehicle position information, situation information and traveling obstruction information which are stored at the same present time on the day before the preceding day may be used. For example, in the case where the present time is 18:30, only vehicle position information, situation information and traveling obstruction information stored at 18:30 on the day before the preceding day are used.

With respect to vehicle position information, situation information and traveling obstruction information stored in the memory part 214, only vehicle position information, situation information and traveling obstruction information stored during a period on the day before the preceding day including the time equal to the present time may be used. For example, in the case where the present time is 18:30, only vehicle position information, situation information and traveling obstruction information during a period from 18:00 to 19:00 on the day before the preceding day are used.

With respect to vehicle position information, situation information and traveling obstruction information stored in the memory part 214, only vehicle position information, situation information and traveling obstruction information stored during a period from a present time by a predetermined time may be used. For example, when the present time is 18:00, only vehicle position information, situation information and traveling obstruction information stored during the period until 17:00 which is the point of time one hour before the present time are used.

FIG. 21 is a flowchart for describing the manner of operation of the control of the automobile control system according to the embodiment 8 of this disclosure. In the description made hereinafter, processing between the first automobile 10A out of the first automobiles 10A, 10B, 10C and the second automobile 2B is described. However, processing between the first automobile 10B, 10C and the second automobile 2B is also performed in the same manner.

Processing in steps S501 to S505 are equal to processing in steps S211 to S215 shown in FIG. 12.

Next, the communication part 211B stores vehicle position information, situation information, traveling obstruction information received from the first automobile 10A in the memory part 214 together with a present time (step S506). With such an operation, the history of vehicle position information, situation information, and traveling obstruction information are stored in the memory part 214.

Next, the destination information acquisition part 221 acquires destination information indicative of the destination position and an arrival time from the input part 213 (step S507).

Next, the standby position decision part 222B decides the vehicle position which least obstructs traveling of other vehicle as the standby position based on vehicle position information, situation information and traveling obstruction information received by the communication part 211B and vehicle position information, situation information and traveling obstruction information stored in the memory part 214 among the vehicle positions of the first automobiles 10A, 10B, 10C existing at the positions which allow the second automobile 2B to reach the destination position acquired by the destination information acquisition part 221 by the arrival time acquired by the destination information acquisition part 221 after the second automobile 2B passes the present vehicle positions of the first automobiles 10A, 10B, 10C received by the communication part 211B and the past vehicle positions of the first automobiles 10A, 10B, 10C stored in the memory part 214 (step S508).

Processing in step S509 and step S510 are equal to processing in step S218 and step S219 shown in FIG. 12.

In this embodiment 8, the second automobile 2B is a self-driving vehicle and hence, the second automobile 2B automatically moves to the standby position without being operated by a human. However, this disclosure is not particularly limited to such a configuration, and the second automobile 2B may not be a self-driving vehicle, and may be operated by a human. In this case, the second automobile 2B includes neither the movement control part 22 nor the drive part 23 and hence, the second automobile 2B may not execute processing in step S510. The second automobile 2B may include a display part for displaying a movement request generated by the movement request generation part 223 for moving the second automobile 2B to the standby position. After processing in step S509 is finished, the display part displays the movement request generated by the movement request generation part 223, and the processing is finished. The movement request displayed on the display part indicates an address of the standby position or a route from the present position to the standby position, for example. Then, the actual movement of the second automobile 2B is performed by a human who drives the second automobile 2B while recognizing a movement request displayed on the display part. The above-mentioned movement control is exemplified merely as an example, and is not intended to limit this disclosure.

In executing processing in step S510, even when a human does not perform a driving operation or even when a human performs a driving operation in a limited manner, it is possible to move the second automobile 2B to the standby position decided by the standby position decision part 222B. Such an advantageous effect can be particularly increased in the case where the second automobile 2B is a self-driving vehicle or an automobile with a drive assist function.

Processing performed by the traveling obstruction detection part 163 and the standby position decision part 222 may use machine learning. As machine learning, for example, supervised learning, unsupervised learning, semi-supervised learning, reinforcement learning and the like are named. In the supervised learning, a relationship between an input and an output is learned using supervised data to which a label (output information) is given in response to input information. In the unsupervised learning, the structure of data is constructed based on only unlabeled input. In the semi-supervised learning, both a labeled input and an unlabeled input are treated. In the reinforcement learning, a feedback (reward) is obtained for a behavior selected from an observation result of a state, and continuous behaviors by which the largest reward can be obtained are learned. As a specific technique of machine learning, a neural network (including deep learning which uses a multilayered neural network), genetic programming, a decision tree, a Bayesian network, a support vector machine (SVM) are known. In this disclosure, any one of the above-mentioned specific examples may be used.

In this disclosure, the whole or a part of the unit, the apparatus, the member or the part, or the whole or a part of the functional blocks in the block diagram shown in the drawings may be carried out by one or a plurality of electronic circuits which include a semiconductor device, a semiconductor integrated circuit (IC) or an LSI (Large Scale Integration). The LSI or the IC may be integrated as one chip, or may be formed by combining a plurality of chips. For example, all functional blocks may be integrated on one chip except a memory element. In this embodiment, although the terms such as LSI or IC are used in this embodiment, the terms may be changed depending of the degree of integration, and this disclosure may use a system LSI, a VLSI (Very Large Scale Integration), or may also use a VLSI (Ultra Large Scale Integration). A Field Programmable Gate Array (FPGA) which is programmed after the manufacture of the LSI or a Reconfigurable Logic Device which can set up the reconstruction of a joining relationship in an LSI or zoning of a circuit in an LSI can be used for the same purpose.

All or some functions and operations of the unit, the apparatus, the members, or the parts can be carried out by software processing. In this case, the software is recorded in one or a plurality of non-volatile recording mediums such as ROMs, optical discs, hard disc drives or the like. When a software is executed by a processing apparatus (processor), a function specified by the software is executed by the processing apparatus (processor) and peripheral equipment. The system or the apparatus may include one or a plurality of non-volatile recording mediums in which software is recorded, a processing apparatus (processor), and a necessary hardware device such as an interface, for example.

The information processing apparatus, the information processing method, and the non-transitory computer readable recording medium which records an information processing program according to this disclosure can autonomously move a moving body without providing equipment to other moving body when the moving body obstructs traveling of other moving body. Accordingly, the present invention is usefully applicable in the form of an information processing apparatus, an information processing method, and a non-transitory computer readable recording medium which records an information processing program for controlling the movement of a moving body.

This application is based on Japanese Patent application No. 2018-135157 and 2018-135158 filed in Japan Patent Office on Jul. 18, 2018, and Japanese Patent application No.

2019-028512 filed in Japan Patent Office on Feb. 20, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An information processing apparatus provided on a vehicle that is capable of an autonomous movement, the information processing apparatus configured to:
   acquire sensing information indicative of a situation outside of the vehicle from a sensor mounted on the vehicle for detecting an object;
   determine, among a plurality of modes, a mode of other vehicle which travels within a predetermined distance range of the vehicle using the sensing information, wherein the mode of the other vehicle is determined based on an operation of the other vehicle;
   control a movement request to the vehicle using a determination result of the mode of the other vehicle; and
   cause a driver part of the vehicle to perform the autonomous movement,
   wherein the information processing apparatus is configured to determine, by processing image information, whether or not the operation of the other vehicle is an operation for avoiding the vehicle,
   the operation of the other vehicle indicating the mode of the other vehicle, and
   the information processing apparatus is configured to
      generate the movement request for moving the vehicle when the information processing apparatus determines that the operation of the other vehicle is the operation for avoiding the vehicle, and
      determine that the movement request for moving the vehicle is unnecessary when the information processing apparatus determines that the operation of the other vehicle is not the operation for avoiding the vehicle.

2. The information processing apparatus according to claim 1, wherein the information processing apparatus is configured to detect a width of a space which allows traveling of the other vehicle when the other vehicle travels within the predetermined distance range of the vehicle and a width of the other vehicle, and to determine the width of the other vehicle with respect to the width of the space which allows traveling of the other vehicle as the mode of the other vehicle.

3. The information processing apparatus according to claim 2, wherein
   the information processing apparatus is configured to determine whether or not the width of the space which allows traveling of the other vehicle is shorter than the width of the other vehicle, and
   the information processing apparatus is configured to generate the movement request for moving the vehicle when the information processing apparatus determines that the width of the space which allows traveling of the other vehicle is shorter than the width of the other vehicle.

4. The information processing apparatus according to claim 2, wherein the information processing apparatus is configured to detect the width of the space which allows traveling of the other vehicle using the sensing information.

5. The information processing apparatus according to claim 2, the information processing apparatus is further configured to:
   acquire present position information indicative of a present position of the vehicle; and
   acquire map information including the present position of the vehicle, wherein
   the information processing apparatus is configured to detect the width of the space which allows traveling of the other vehicle using the map information and the sensing information.

6. The information processing apparatus according to claim 1, wherein the sensor includes an optical sensor.

7. The information processing apparatus according to claim 1, wherein
   the sensor includes an image sensor, and
   the information processing apparatus is configured to determine the operation of the other vehicle as the mode of the other vehicle by processing the image information obtained by the image sensor.

8. The information processing apparatus according to claim 1, wherein the information processing apparatus is configured to determine the operation of the other vehicle or a change in the operation when the other vehicle travels within the predetermined distance range of the vehicle as the mode of the other vehicle.

9. The information processing apparatus according to claim 8, wherein
   the sensing information includes at least one of a position, a speed, an acceleration, and an advancing direction of the other vehicle, and
   the information processing apparatus is configured to determine whether or not the other vehicle performs any one of operations consisting of deceleration, stopping, and changing of an advancing path, and
   the information processing apparatus is configured to generate the movement request for moving the vehicle when the information processing apparatus determines that the other vehicle performs any one of the operations consisting of the deceleration, the stopping, and the changing of the advancing path.

10. The information processing apparatus according to claim 8, wherein
    the sensing information includes at least one of a position, a speed, an acceleration and an advancing direction of the other vehicle,
    the information processing apparatus is configured to determine whether or not at least one of a change amount of the speed, a change amount of the acceleration, and a change amount of an angle of the advancing direction is equal to or more than a predetermined threshold value, and
    the information processing apparatus is configured to generate the movement request for moving the vehicle when the information processing apparatus determines that at least one of the change amount of the speed, the change amount of the acceleration, and the change amount of the angle of the advancing direction is equal to or more than the predetermined threshold value.

11. The information processing apparatus according to claim 1, wherein
    the sensor includes an image sensor, and
    the information processing apparatus is configured to determine a mode of an operator who operates the other vehicle as the mode of the other vehicle by processing an image obtained by the image sensor.

12. The information processing apparatus according to claim 11, wherein
the information processing apparatus is configured to determine whether or not a facial expression of the operator is a facial expression which expresses a predetermined feeling which is preliminarily stored, and
the information processing apparatus is configured to generate the movement request for moving the vehicle when the information processing apparatus determines that the facial expression of the operator is the facial expression which expresses the predetermined feeling which is preliminarily stored.

13. The information processing apparatus according to claim 2, wherein the information processing apparatus is configured to detect a distance from the vehicle to an edge of a road on which the vehicle is positioned, as the width of the space which allows traveling of the other vehicle.

14. An information processing method comprising causing a computer provided on a vehicle that is capable of an autonomous movement to perform operations of:
acquiring sensing information indicative of a situation outside of the vehicle from a sensor mounted on the vehicle for detecting an object;
determining, among a plurality of modes, a mode of other vehicle which travels within a predetermined distance range of the vehicle using the sensing information, wherein the mode of the other vehicle is determined based on an operation of the other vehicle; and
controlling a movement request to the vehicle using a determination result of the mode of the other vehicle, wherein
the computer determines, in the determining and by processing image information, whether or not the operation of the other vehicle is an operation for avoiding the vehicle,
the operation of the other vehicle indicating the mode of the other vehicle,
the computer generates, in the controlling of the movement request, a movement request for moving the vehicle when the operation of the other vehicle is determined to be the operation for avoiding the vehicle, and
the computer determines that the movement request for moving the vehicle is unnecessary when the operation of the other vehicle is determined not to be the operation for avoiding the vehicle.

15. A non-transitory computer readable recording medium which records an information processing program which enables a computer provided on a vehicle that is capable of an autonomous movement to execute processing of:
acquiring sensing information indicative of a situation outside a vehicle by a sensor mounted on the vehicle for detecting an object;
determining, among a plurality of modes, a mode of other vehicle which travels within a predetermined distance range of the vehicle using the sensing information, wherein the mode of the other vehicle is determined based on an operation of the other vehicle; and
controlling a movement request to the vehicle using a determination result of the mode of the other vehicle, wherein
the computer determines, in the determining and by processing image information, whether or not the operation of the other vehicle is an operation for avoiding the vehicle,
the operation of the other vehicle indicating the mode of the other vehicle,
the computer generates, in the controlling of the movement request, a movement request for moving the vehicle when the operation of the other vehicle is determined to be the operation for avoiding the vehicle, and
the computer determines that the movement request for moving the vehicle is unnecessary when the operation of the other vehicle is determined not to be the operation for avoiding the vehicle.

\* \* \* \* \*